US012629816B2

(12) United States Patent
Takagi

(10) Patent No.: US 12,629,816 B2
(45) Date of Patent: May 19, 2026

(54) CONTROL SYSTEM FOR CONTINUUM ROBOT AND CONTROL METHOD FOR SAME

(71) Applicant: CANON KABUSHIKI KAISHA, Tokyo (JP)

(72) Inventor: Kiyoshi Takagi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 136 days.

(21) Appl. No.: 18/443,054

(22) Filed: Feb. 15, 2024

(65) Prior Publication Data

US 2024/0181630 A1     Jun. 6, 2024

Related U.S. Application Data

(63) Continuation of application No. PCT/JP2022/030368, filed on Aug. 9, 2022.

(30) Foreign Application Priority Data

Aug. 19, 2021     (JP) ................................. 2021-134195

(51) Int. Cl.
*B25J 9/06*          (2006.01)
*B25J 9/10*          (2006.01)
*B25J 9/16*          (2006.01)

(52) U.S. Cl.
CPC ............... B25J 9/065 (2013.01); B25J 9/104 (2013.01); B25J 9/1664 (2013.01)

(58) Field of Classification Search
None
See application file for complete search history.

(56) References Cited

U.S. PATENT DOCUMENTS

| 2013/0312564 A1 | 11/2013 | Kim | |
| 2016/0354924 A9* | 12/2016 | Simaan | A61B 34/30 |
| 2021/0369081 A1* | 12/2021 | Kose | B25J 9/1615 |

FOREIGN PATENT DOCUMENTS

| JP | 2013-244595 A | 12/2013 |
| JP | 2016-2414 A | 1/2016 |

(Continued)

OTHER PUBLICATIONS

International Search Report issued Oct. 13, 2022 during prosecution of related international application No. PCT/JP2022/030368.

(Continued)

*Primary Examiner* — Jason Holloway
*Assistant Examiner* — Bryant Tang
(74) *Attorney, Agent, or Firm* — VENABLE LLP

(57)          ABSTRACT

The control system includes: a kinematics computing unit that calculates a drive amount of a wire; a low back-drivability drive control unit that controls the drive amount of the wire based on a result of the kinematics computation; a high back-drivability drive control unit with which the drive unit is more easily driven in a reverse direction than in a case of drive control performed by the drive control unit when the curvable portion is subjected to an external force, the drive control unit being configured to control the drive amount of the wire based on the result of the kinematics computation; and a switching control unit that performs control to switch between the drive control unit and the second drive control unit in accordance with a mode signal indicating a drive control unit to be selected or a result of detecting a force applied to the wire.

14 Claims, 27 Drawing Sheets

(56) References Cited

FOREIGN PATENT DOCUMENTS

| JP | 6169049 B | 1/2016 |
|----|-----------|--------|
| JP | 2018-523508 A | 8/2018 |
| JP | 2018-171701 A | 11/2018 |
| JP | 2019-166307 A | 10/2019 |

OTHER PUBLICATIONS

Japanese Search Report issued Jul. 22, 2025 during the prosecution of related Japanese Patent Application No. 2021-134195 (English translation included).
Extended European Search Report issued Jun. 4, 2025 during prosecution of related European patent application No. 22858377.9.
International Preliminary Report on Patentability issued Feb. 29, 2024 during prosecution of related international application No. PCT/JP2022/030368 (English Translation included).

* cited by examiner

Continuum robot model

Screw-driven mechanism

Continuum robot
With screw-driven mech-
anism

FIG. 5

Bode diagram of PID force controller $K_F$

Bode diagram of Open loop $P_n$ $K_F$

Bode diagram of PID position controller $K_{sv}$

Bode diagram of Open loop $G_{cl}$ $K_{sv}$

Bode diagram of PID position controller $K_{POS}$

Bode diagram of Open loop $G_{cl}$ $K_{POS}$

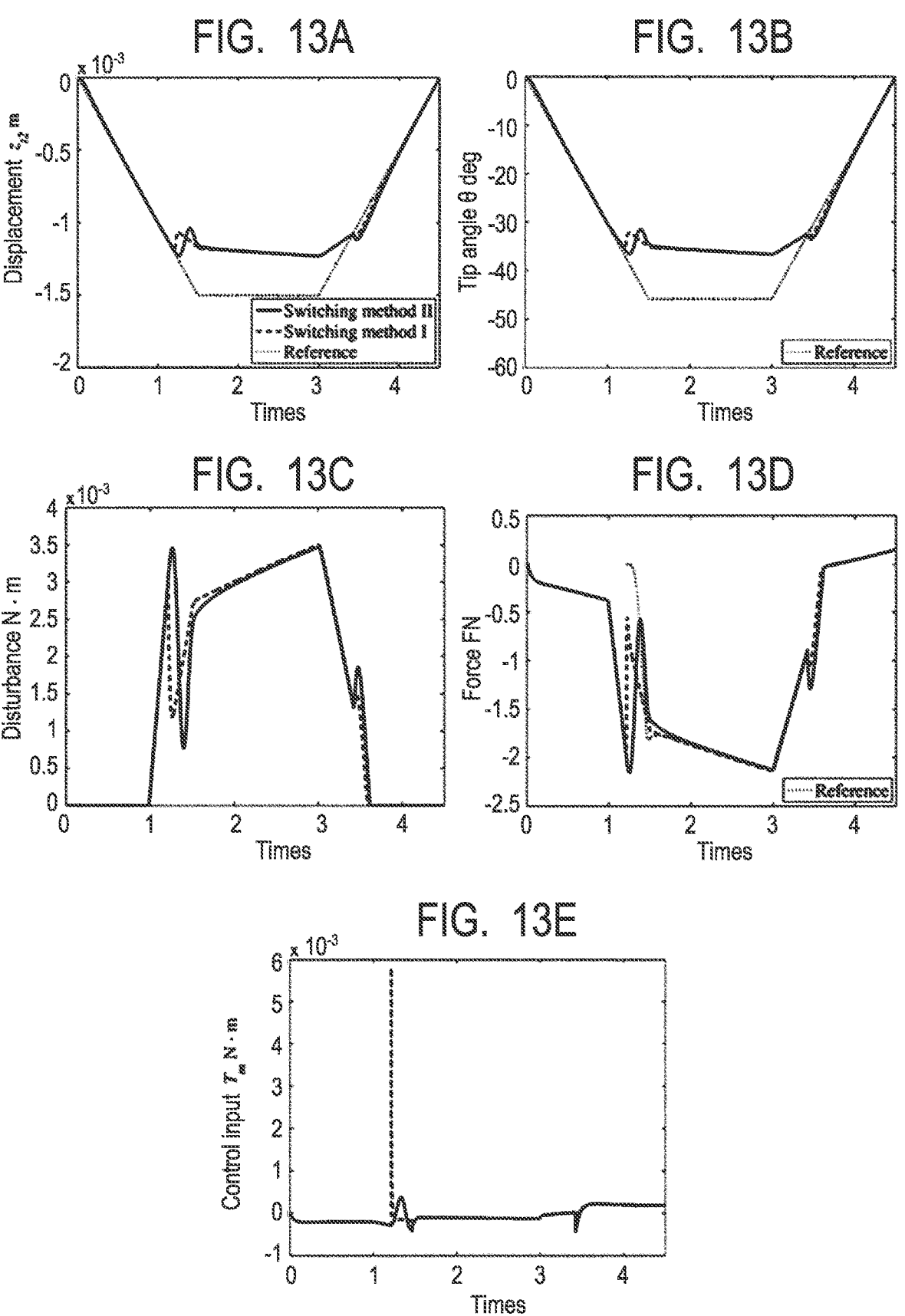

CONTROL SYSTEM FOR CONTINUUM ROBOT AND CONTROL METHOD FOR SAME

CROSS-REFERENCE TO RELATED APPLICATIONS

This application is a Continuation of International Patent Application No. PCT/JP2022/030368, filed Aug. 9, 2022, which claims the benefit of Japanese Patent Application No. 2021-134195, filed Aug. 19, 2021, both of which are hereby incorporated by reference herein in their entirety.

BACKGROUND OF THE INVENTION

Field of the Invention

The present disclosure relates to a control system for a continuum robot and a control method therefor.

Description of the Related Art

A continuum robot is also referred to as "continuum robot," and includes a curvable portion having a flexible structure, and a shape of the continuum robot is controlled by deforming the curvable portion. Such continuum robots have two main advantages over robots formed of rigid links (hereinafter referred to as "rigid-link robots"). The first advantage is that the continuum robot is capable of moving along a curved line of a target object only by manipulating a tip of the continuum robot in a narrow space in which the rigid-link robot may be stuck or under an environment with scattered objects. The second advantage is that the continuum robot is innately supple and thus can be manipulated without damaging a fragile target object, particularly in an open space. As such, the continuum robots do not always require detection of an external force at an end effector which is required by the rigid-link robots.

The continuum robots are expected to make use of the above-mentioned characteristics in medical field applications including a sheath of an endoscope and a catheter and applications to rescue robots and other work robots for extreme environments. Methods of driving the continuum robots include a tendon drive method, a method using a push-pull wire, and a method using a pneumatic actuator.

In Japanese Patent No. 6169049, there is described a control method for a manipulator which involves detecting an amount of load generated in a wire for drive and controlling a drive unit so that the amount of load falls within a range set in advance. With this method, in Japanese Patent No. 6169049, when a manipulator is inserted into a narrow space, it is possible to insert the manipulator without performing a curve manipulation for following a path thereof, thereby facilitating an insertion operation. Incidentally, a state in which the drive unit passively operates in accordance with the amount of load is referred to as a state in which "back-drivability is achieved." In Japanese Patent No. 6169049, a control algorithm and detection of the amount of load generated in a wire are used instead of a mechanism such as a clutch, thereby preventing the drive unit from becoming larger in size. Specifically, the manipulator as described in Japanese Patent No. 6169049 includes a continuum body called a cylindrical portion and a plurality of joint structures at a tip of the continuum body, and is brought into action when a wire coupled to each joint is pulled by a motor provided to a base-end-portion housing.

This manipulator is also applicable to a continuum body in which a plurality of node rings and pivot joints are coupled.

In the manipulator as described in Japanese Patent No. 6169049, there are an "insertion operation mode" and an "action control mode." In the "insertion operation mode," there are disclosed 1) a method of issuing an action command to cause each joint to perform a periodic reciprocating motion and performing control so as to reduce an amount of pivot based on the amount of load generated in the wire, and 2) a method of detecting the amount of load generated in the wire and driving the motor so as to reduce the amount of load. Thus, the "insertion operation mode" is action control in which the back-drivability is higher than in the "action control mode." However, in the manipulator as described in Japanese Patent No. 6169049, an operator performs switching between the "insertion operation mode" and the "action control mode," thereby increasing a burden on the operator and also resulting in insufficiency from the viewpoint of performing appropriate switching.

The present disclosure has been made in view of the above-mentioned problem, and has an object to provide a mechanism in which, when there are a plurality of drive control units having different back-drivability as drive control units for curving a curvable portion, switching therebetween can be appropriately performed with a reduced burden on an operator.

SUMMARY OF THE INVENTION

According to one embodiment of the present disclosure, there is provided a control system for a continuum robot including a curvable portion configured to be curvable when a wire is driven and a drive unit that drives the wire, the control system including: a kinematics computing unit configured to perform a kinematics computation for calculating a drive amount of the wire from a bending angle of the curvable portion with respect to a reference axis; a first drive control unit configured to control the drive amount of the wire being driven by the drive unit based on a result of the kinematics computation; a second drive control unit with which the drive unit is more easily driven in a reverse direction than in a case of drive control performed by the first drive control unit when the curvable portion is subjected to an external force, the second drive control unit being configured to control the drive amount of the wire being driven by the drive unit based on the result of the kinematics computation; and a switching control unit configured to perform control to switch between the first drive control unit and the second drive control unit in accordance with a mode signal indicating a drive control unit to be selected or a result of detecting a force applied to the wire.

Further, the present disclosure includes a control method for a continuum robot which is performed by the above-mentioned control system for a continuum robot.

Further features of the present disclosure will become apparent from the following description of exemplary embodiments with reference to the attached drawings.

BRIEF DESCRIPTION OF THE DRAWINGS

FIG. 5 is a diagram for illustrating an example of a functional configuration of a high back-drivability drive control unit ($K_{BKD}$) illustrated in FIG. 1.

FIG. 13A, FIG. 13B, FIG. 13C, FIG. 13D, and FIG. 13E are graphs for showing response characteristics of a simulation in the second embodiment of the present disclosure.

FIG. 14 is a diagram for illustrating an example of a schematic configuration of a continuum robot in a third embodiment of the present disclosure.

FIG. 18 is a diagram for illustrating an example of a schematic configuration of a control system for a continuum robot according to the third embodiment of the present disclosure.

FIG. 25 is a diagram for illustrating an example of a schematic configuration of a control system for a continuum robot according to the fifth embodiment of the present disclosure.

DESCRIPTION OF THE EMBODIMENTS

Now, modes for carrying out the present disclosure (embodiments) are described with reference to the drawings.

First Embodiment

First, a first embodiment of the present disclosure is described.

In the first embodiment, a dynamic model of a continuum robot including a drive unit for a wire which can detect a tensile force of the wire is derived. Then, a control system capable of switching back-drivability is designed.

Figure 1:
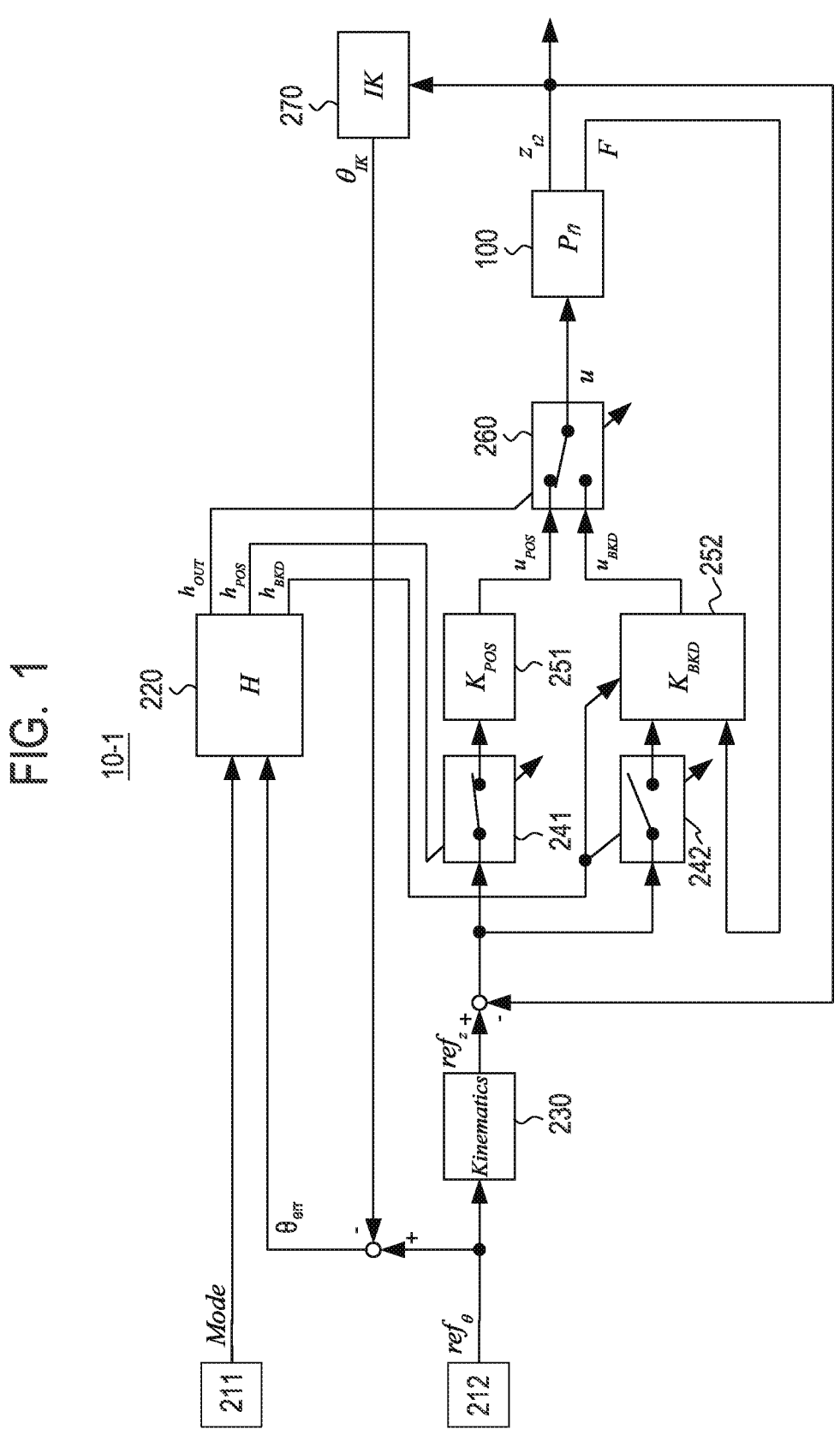
FIG. 1 is a diagram for illustrating an example of a schematic configuration of a control system for a continuum robot according to a first embodiment of the present disclosure.

FIG. 1 is a diagram for illustrating an example of a schematic configuration of a control system 10 for a continuum robot according to the first embodiment of the present disclosure. The control system 10 for a continuum robot illustrated in FIG. 1 is hereinafter referred to as "control system 10-1 for a continuum robot."

As illustrated in FIG. 1, the control system 10-1 for a continuum robot includes a continuum robot ($P_n$) 100, input units 211 and 212, a switching control unit (H) 220, a kinematics computing unit (Kinematics) 230, and blocking units 241 and 242. The control system 10-1 for a continuum robot further includes a low back-drivability drive control unit ($K_{POS}$) 251, a high back-drivability drive control unit ($K_{BKD}$) 252, a selection unit 260, and an inverse kinematics computing unit (IK) 270.

The continuum robot ($P_n$) 100 includes a curvable portion configured to be curvable when a wire is driven and a drive unit that drives the wire. The input unit 211 is a component unit that inputs a mode signal indicating a drive control unit to be selected to the switching control unit (H) 220. The input unit 212 is a component unit that inputs a target command value $ref_\theta$ of a bending angle of the curvable portion with respect to a reference axis to the kinematics computing unit (Kinematics) 230 and the like. The kinematics computing unit (Kinematics) 230 performs a kinematics computation for calculating a drive amount of a wire (target displacement $ref_z$ of a wire gripping mechanism) from the bending angle (target command value $ref_\theta$) of the curvable portion with respect to the reference axis. The low back-drivability drive control unit ($K_{POS}$) 251 is a drive control unit that has lower back-drivability than that of the high back-drivability drive control unit ($K_{BKD}$) 252. The low back-drivability drive control unit ($K_{POS}$) 251 is a first drive control unit that controls the drive amount of the wire being driven by the drive unit based on a result of the kinematics computation described above. The high back-drivability drive control unit ($K_{BKD}$) 252 is a drive control unit that has higher back-drivability than that of the low back-drivability drive control unit ($K_{POS}$) 251. That is, the high back-drivability drive control unit ($K_{BKD}$) 252 is a second drive control unit with which the drive unit is more easily driven in a reverse direction than in a case of the drive control performed by the low back-drivability drive control unit ($K_{POS}$) 251 when the curvable portion is subjected to an external force. The high back-drivability drive control unit ($K_{BKD}$) 252 also controls the drive amount of the wire being driven by the drive unit based on the result of the kinematics computation described above. The blocking unit 241 is provided at a stage preceding the low back-drivability drive control unit ($K_{POS}$) 251. The blocking unit 242 is provided at a stage preceding the high back-drivability drive control unit ($K_{BKD}$) 252. The selection unit 260 selects output ($u_{POS}$) of the low back-drivability drive control unit ($K_{POS}$) 251 or output ($u_{BKD}$) of the high back-drivability drive control unit ($K_{BKD}$) 252 based on control (signal $H_{OUT}$) of the switching control unit (H) 220. Then, the selection unit 260 outputs the selected output to the continuum robot ($P_n$) 100. The inverse kinematics computing unit (IK) 270 performs an inverse kinematics computation for calculating the bending angle of the curvable portion from the drive amount of the wire, the inverse kinematics computation being a computation reverse to the kinematics computation performed by the kinematics computing unit (Kinematics) 230. The switching control unit (H) 220 performs control to switch between the low back-drivability drive control unit ($K_{POS}$) 251 and the high back-drivability drive control unit ($K_{BKD}$) 252 in accordance with the mode signal indicating the drive control unit to be selected or a result of detecting a force applied to the wire.

Specifically, to enable the low back-drivability drive control unit ($K_{POS}$) 251, the switching control unit (H) 220 turns on a signal $h_{POS}$ and turns off a signal $h_{BKD}$. This causes the blocking unit 242 to block control error input to the high back-drivability drive control unit ($K_{BKD}$) 252. Meanwhile, to enable the high back-drivability drive control unit ($K_{BKD}$) 252, the switching control unit (H) 220 turns off the signal $h_{POS}$ and turns on the signal $h_{BKD}$. This causes the blocking unit 241 to block control error input to the low back-drivability drive control unit ($K_{POS}$) 251.

First, switching from the high back-drivability drive control unit ($K_{BKD}$) 252 to the low back-drivability drive control unit ($K_{POS}$) 251 which is performed by the switching control unit (H) 220 is described. This is a case in which a signal indicating the low back-drivability drive control unit ($K_{POS}$) 251 has been input as the mode signal from the input unit 211 to the switching control unit (H) 220 while the drive control is being performed by the high back-drivability drive control unit ($K_{BKD}$) 252. In this case, the switching control unit (H) 220 performs the switching when a difference $\theta_{err}$ between the bending angle of the curvable portion input to the kinematics computing unit (Kinematics) 230 and the bending angle of the curvable portion output from the inverse kinematics computing unit (IK) 270 is equal to or smaller than a threshold value. This suppresses a rapid follow-up to a target value at a time of the switching, and prevention of damage to the continuum robot itself and a fragile target object can be achieved.

Subsequently, switching from the low back-drivability drive control unit ($K_{POS}$) 251 to the high back-drivability drive control unit ($K_{BKD}$) 252 which is performed by the switching control unit (H) 220 is described. In the switching from the low back-drivability drive control unit ($K_{POS}$) 251 to the high back-drivability drive control unit ($K_{BKD}$) 252, the switching control unit (H) 220 performs this switching irrespective of a value of the difference $\theta_{err}$. Specifically, this is a case in which a signal indicating the high back-drivability drive control unit ($K_{BKD}$) 252 has been input as the mode signal from the input unit 211 to the switching control unit (H) 220 while the drive control is being performed by the low back-drivability drive control unit ($K_{POS}$) 251. With this configuration, it is possible to achieve a continuum robot having back-drivability that can be made variable as required.

Derivation of a dynamic model $P_n$ of the continuum robot 100 and a control algorithm are described below in detail.

1.1) Modeling

Figure 2:
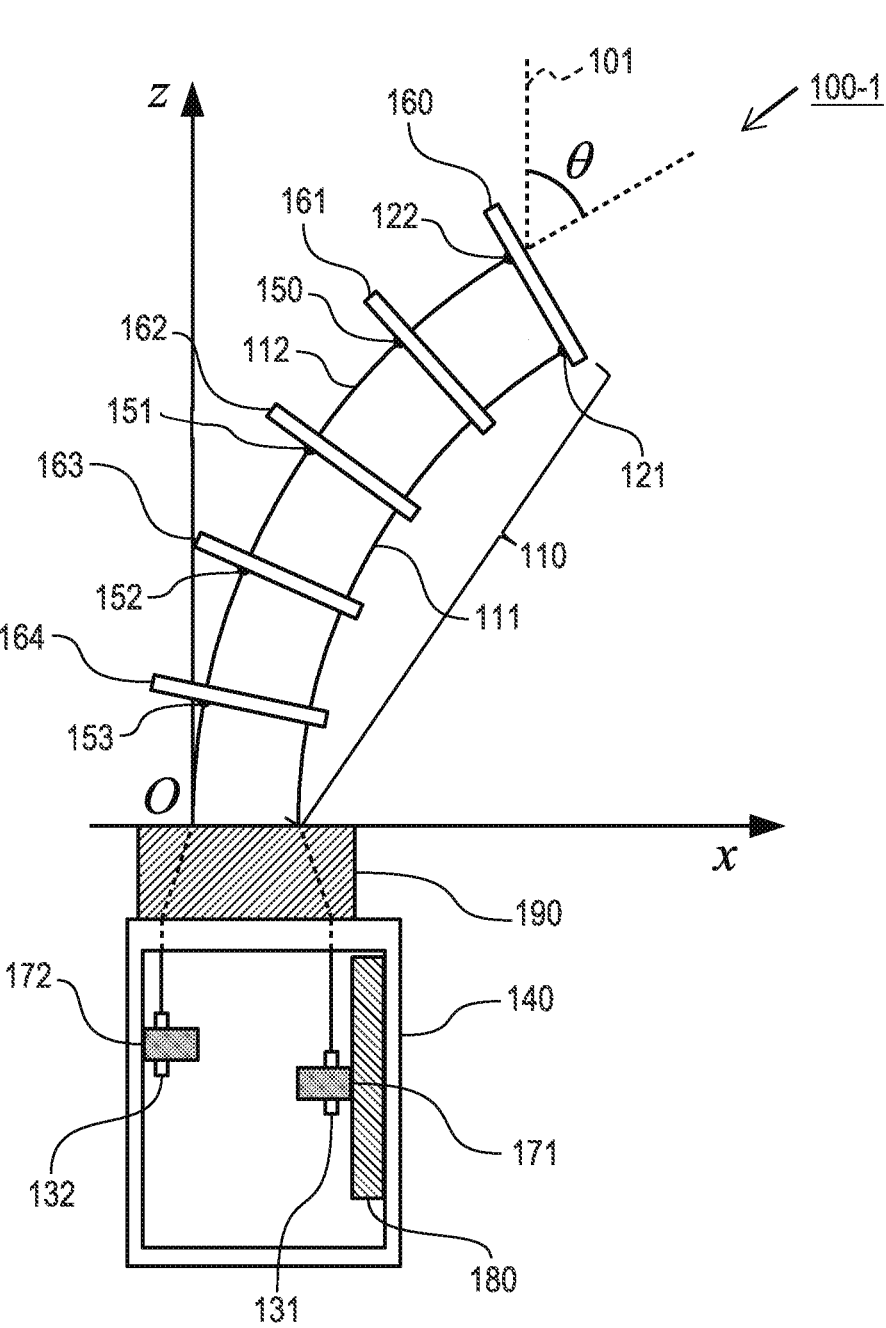
FIG. 2 is a diagram for illustrating an example of a schematic configuration of the continuum robot in the first embodiment of the present disclosure.

FIG. 2 is a diagram for illustrating an example of a schematic configuration of the continuum robot 100 in the first embodiment of the present disclosure. The continuum robot 100 illustrated in FIG. 2 is hereinafter referred to as "continuum robot 100-1."

In the continuum robot 100-1, a wire 111 and a wire 112 are connected to a fixing portion 121 and a fixing portion 122, respectively, at a distal end 160 of a curvable portion 110. Further, proximal ends of the wire 111 and the wire 112 are connected to a wire gripping pipe 131 and a wire gripping pipe 132, respectively, in a robot base 140. In the robot base 140, a wire gripping mechanism 171 that supports the wire gripping pipe 131, a wire gripping mechanism 172 that supports the wire gripping pipe 132, and an actuator 180 that corresponds to the drive unit are arranged. In this case, the wire gripping mechanism 172 is fixed to the robot base 140. Further, the wire gripping mechanism 171 is connected to the actuator 180 being the drive unit through a wire gripping mechanism base (not shown), and is capable of moving up and down. The wire gripping pipe 131 is connected to the wire gripping mechanism 171 so as to be capable of being supported, and is pushed or pulled by the actuator 180 to control an attitude of the curvable portion 110. The continuum robot 100-1 also includes wire guides 161 to 164 that are members for guiding the wire 111 and the wire 112. In addition to a method of discretely arranging a plurality of members, a continuum member having a bellows shape or a mesh shape may be used as the wire guide. The wire guides 161 to 164 are fixed to the wire 112 at fixing portions 150 to 153, respectively. Further, a spacing between the wire 111 and the wire 112 and a spacing between the wire gripping mechanism 171 and the wire gripping mechanism 172 may be different from each other. At that time, a diameter conversion unit 190 is connected to the robot base 140.

In this embodiment, a mechanism formed of the wire 111, the wire 112, and the wire guides 161 to 164 is referred to as "curvable portion 110 being a continuum portion." In this embodiment, as illustrated in FIG. 2, $\theta$ is set as a bending angle of the curvable portion 110 with respect to a reference axis 101 parallel to a z-axis at the distal end 160 of the curvable portion 110. Further, it is assumed that an actuator unit formed of a rotation motor and a rotation-linear motion conversion mechanism is used as the actuator 180. It is also assumed that the wire gripping mechanism 171 (or actuator 180) has a function of detecting the tensile force of the wire 111. To that end, the above-mentioned wire gripping mechanism base (not shown) is provided between the wire gripping mechanism 171 and the actuator 180, and is connected to the actuator 180, and a spring is used to connect the wire gripping mechanism base and the wire gripping mechanism 171 to each other. At this time, it is preferred to provide a linear guide or use a parallel spring as the spring so that the wire gripping mechanism 171 is displaced only in a z-axis direction. Then, the tensile force of the wire 111 can be detected by measuring a displacement of the spring.

Figures 3A, 3B, 3C:
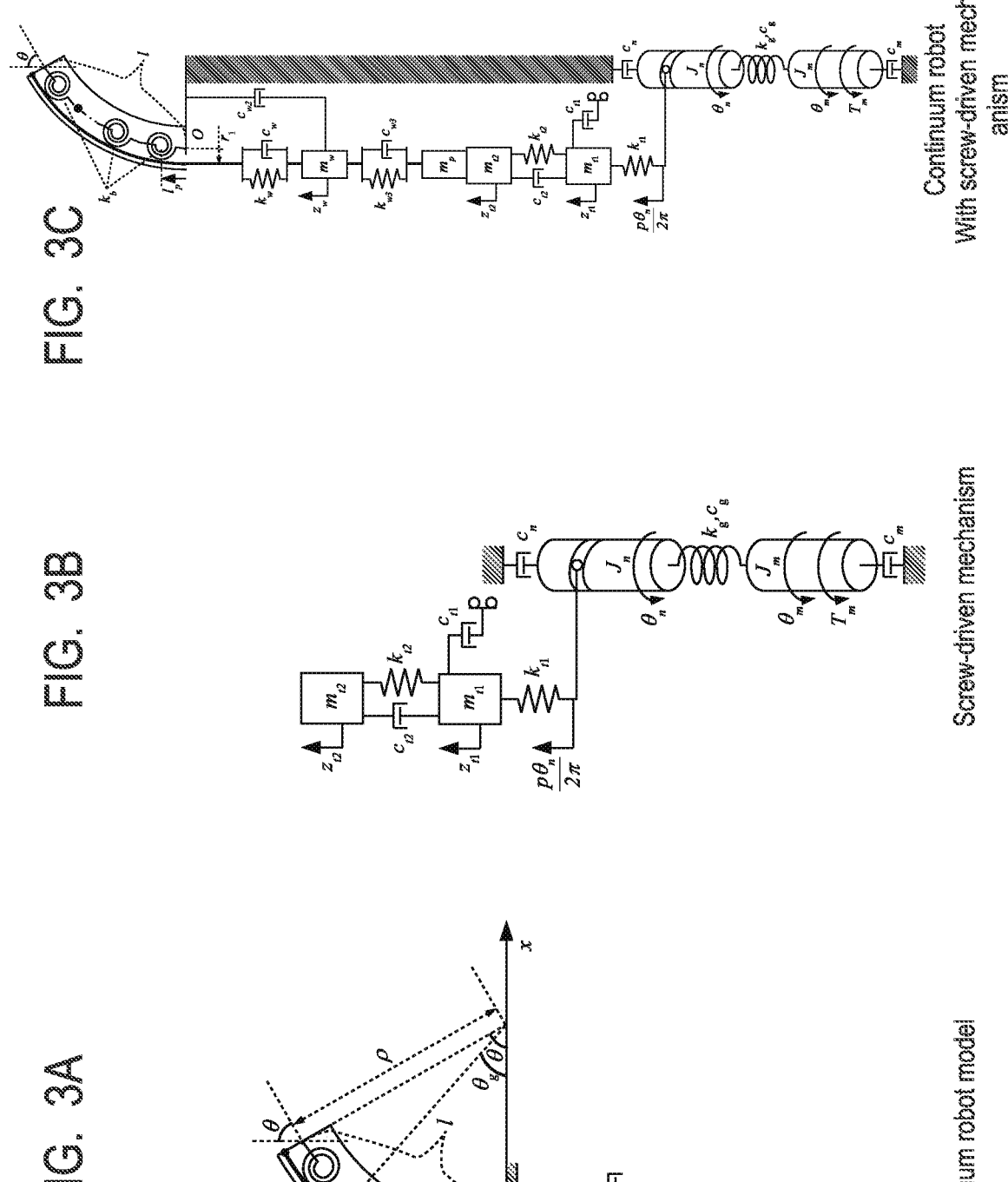
FIG. 3A, FIG. 3B, and FIG. 3C are diagrams for illustrating an example of a dynamic model of the continuum robot in the first embodiment of the present disclosure.

FIG. 3A to FIG. 3C are diagrams for illustrating an example of the dynamic model $P_n$ of the continuum robot 100 in the first embodiment of the present disclosure. Specifically, FIG. 3A is an illustration of an example of a dynamic model of the curvable portion 110 being a continuum portion, and FIG. 3B is an illustration of an example of a dynamic model formed of the rotation motor and the rotation-linear motion conversion mechanism that are included in the actuator 180, the wire gripping mechanism 171, and the like.

1.1.1) Dynamic Model of Curvable Portion 110 being Continuum Portion

Definitions of reference symbols in the dynamic model of the curvable portion 110 being a continuum portion illustrated in FIG. 3A are described below.

θ: Bending angle of the curvable portion 110 with respect to the reference axis 101

ρ: Curvature radius of the curvable portion 110 l: Length of the curvable portion 110

$r_i$: Distance from a central axis of the curvable portion 110 to the wire $l_p$: Drive amount of the wire $m_s$: Mass of the curvable portion 110

$k_b$: Spring coefficient with respect to the bending angle of the curvable portion 110

$z_w$: Displacement of a wire equivalent mass $z_p$: Displacement of a wire gripping pipe $m_w$: Mass of the wire $m_p$: Mass of the wire gripping pipe $k_w$, $k_{w3}$: Spring coefficient of the wire $c_w$, $c_{w3}$: Damping coefficient of the wire $c_{w2}$: Coefficient of damping caused by friction of the wire with respect to the diameter conversion unit and the wire guide.

Next, an equation of motion of the continuum robot 100-1 is derived. In this embodiment, the following premises are assumed.

[1] Only motion in a two-dimensional plane is taken into consideration.

[2] The curvable portion 110 is set to have a constant curvature, and is assumed to have a uniform spring coefficient.

[3] The wire is approximated as a lumped mass system, and a reaction force caused by deformation in a longitudinal direction is assumed to act on a tip of the curvable portion 110. Lateral vibration and lateral deformation of the wire are not taken into consideration.

[4] The friction between the wire and the wire guide and between the wire and the diameter conversion unit is forced into the damping coefficient $c_{w2}$ as viscous damping including non-linear friction such as Coulomb friction.

First, kinetic energy of the curvable portion 110 is obtained. When displacements $x_g$ and $z_g$ are assumed along the central axis of the curvable portion 110, the displacements $x_g$ and $z_g$ are expressed by Equation (1) and Equation (2), respectively.

$$x_y = \frac{l_g}{\theta_g}(1 - \cos \theta_g) \tag{1}$$

-continued $$z_g = \frac{l_g}{\theta_g}\sin \theta_g \tag{2}$$

Further, there is provided Equation (3):

$$\theta_g = \frac{l_g}{l}\theta \tag{3}$$

and hence the displacement $x_g$ and $z_g$ are expressed by Equation (4) and Equation (5), respectively.

$$x_g = \frac{l}{\theta}\left(1 - \cos \frac{l_g}{l}\theta\right) \tag{4}$$

$$z_g = \frac{l}{\theta}\sin \frac{l_g}{l}\theta \tag{5}$$

Through use thereof, kinetic energy $T_a$ of the curvable portion 110 is expressed by Equation (6).

$$\begin{aligned} T_a &= \frac{m_s}{2l}\int_0^l \left(\dot{x}_y^2 + \dot{z}_g^2\right)dl_y \\ &= \frac{m_s\left(12l^3 \sin \theta - 6l^3\theta \cos \theta - l^3\theta^3 - 6l^3\theta\right)\dot{\theta}^2}{6l\theta^5} \end{aligned} \tag{6}$$

Further, potential energy $U_a$ of the curvable portion 110 is expressed by Equation (7).

$$U_a = \frac{1}{2}k_b\theta^2 \tag{7}$$

Next, kinetic energy $T_w$ and potential energy $U_w$ of the wire and the wire gripping pipe have a wire drive amount of $l_p = r_1\theta$, and are accordingly expressed by Equation (8) and Equation (9), respectively.

$$T_w = \frac{1}{2}m_w\dot{z}_w^2 + \frac{1}{2}m_p\dot{z}_p^2 \tag{8}$$

$$U_w = \frac{1}{2}k_w(r_1\theta - z_w)^2 + \frac{1}{2}k_{w3}(z_w - z_p)^2 \tag{9}$$

Then, as a result of obtaining the equation of motion from Equation (10) that represents a Lagrangian equation:

$$\frac{d}{dl}\left(\frac{\partial T}{\partial \dot{q}_i}\right) - \frac{\partial T}{\partial q_i} + \frac{\partial U}{\partial q_i} = Q_i \; i = 1.2 \tag{10}$$

$$T = T_a + T_w, \; U = U_a + U_w$$

$$q = [q_1, q_2, q_3]^T = [z_p, z_w, \theta]^T$$

$$Q = [Q_1, Q_2, Q_3]^T = [0, 0, 0]^T$$

a non-linear differential equation expressed by Equation (11) is obtained. In Equation (11), φ represents a non-linear term that cannot be substituted into $M_c$, $C_c$, and $K_c$.

$$M_c\ddot{q} + K_c q + C_c\dot{q} + \Phi = \tag{11}$$

$$\begin{bmatrix} m_p & 0 & 0 \\ 0 & m_w & 0 \\ 0 & 0 & M_{c22} \end{bmatrix}\begin{bmatrix} \ddot{z}_p \\ \ddot{z}_w \\ \ddot{\theta} \end{bmatrix} + \begin{bmatrix} k_{w3} & -k_{w3} & 0 \\ -k_{w3} & k_{w3}+k_w & -k_w r \\ 0 & -k_w r & k_w r^2 + k_b \end{bmatrix}\begin{bmatrix} z_p \\ z_w \\ \theta \end{bmatrix} + $$

$$\begin{bmatrix} c_{w3} & -c_{w3} & 0 \\ -c_{w3} & c_{w3}+c_w+c_{w2} & -c_w r \\ 0 & -c_w r & c_w r^2 + c_b \end{bmatrix}\begin{bmatrix} \dot{z}_p \\ \dot{z}_w \\ \dot{\theta} \end{bmatrix} + \begin{bmatrix} 0 \\ 0 \\ \Phi_3 \end{bmatrix} = \begin{bmatrix} 0 \\ 0 \\ 0 \end{bmatrix}$$

Further, $M_{c22}$ and $\varphi_3$ in Equation (11) are expressed by Equation (12) and Equation (13), respectively.

$$M_{c22} = -\frac{l^2 m_s(12\sin\theta - 6\theta\cos\theta - \theta^3 - 6\theta)}{3\theta^5} \tag{12}$$

$$\Phi_3 = -\frac{\dot{\theta}^2 l^2 m_s(3\theta^2\sin\theta - 30\sin\theta + 18\theta\cos\theta + \theta^3 + 12\theta)}{3\theta^5} \tag{13}$$

However, when the bending angle of the curvable portion 110 is in a vicinity of 0 degrees, Equation (12) and Equation (13) have an indeterminate form, and values thereof cannot be obtained. In view of this, a 0-degree neighborhood linearization model that does not take large deformation into consideration is obtained. Equation (14) is obtained from Equation (4) and Equation (5).

$$x_{g0} = \lim_{\theta\to 0} x_g = \frac{l_g^2\theta}{2l}, z_{g0} = \lim_{\theta\to 0} z_g = l_g \tag{14}$$

Then, kinetic energy $T_{a0}$ in the vicinity of 0 degrees of the curvable portion 110 is expressed by Equation (15).

$$T_{a0} = \frac{m_s}{2l}\int_0^l (\dot{x}_{g0}^2 + \dot{z}_{g0}^2)dl_g = \frac{m_s}{40}l^2\dot{\theta}^2 \tag{15}$$

Then, as a result of obtaining the equation of motion from the Lagrangian equation assuming that $T=T_{a0}+T_w$, Equation (16) is obtained.

$$M_{c0}\ddot{q} + K_{c0}q + C_{c0}\dot{q} = \tag{16}$$

$$\begin{bmatrix} m_p & 0 & 0 \\ 0 & m_w & 0 \\ 0 & 0 & \dfrac{l^2 m_s}{20} \end{bmatrix}\begin{bmatrix} \ddot{z}_p \\ \ddot{z}_w \\ \ddot{\theta} \end{bmatrix} + \begin{bmatrix} k_{w3} & -k_{w3} & 0 \\ -k_{w3} & k_{w3}+k_w & -k_w r \\ 0 & -k_w r & k_w r^2 + k_b \end{bmatrix}\begin{bmatrix} z_p \\ z_w \\ \theta \end{bmatrix} + $$

$$\begin{bmatrix} c_{w3} & -c_{w3} & 0 \\ -c_{w3} & c_{w3}+c_w+c_{w2} & -c_w r \\ 0 & -c_w r & c_w r^2 + c_b \end{bmatrix}\begin{bmatrix} \dot{z}_p \\ \dot{z}_w \\ \dot{\theta} \end{bmatrix} = \begin{bmatrix} 0 \\ 0 \\ 0 \end{bmatrix}$$

1.1.2) Dynamic Model formed of Rotation Motor, Rotation-Linear Motion Conversion Mechanism, and Wire Gripping Mechanism FIG. 3B is a diagram for illustrating an example of the dynamic model formed of the rotation motor, the rotation-linear motion conversion mechanism, and the wire gripping mechanism. The wire gripping mechanism has the function of detecting the tensile force of the wire, the wire gripping mechanism base is provided between the wire gripping mechanism and the actuator 180, the wire gripping mechanism base is connected to the actuator 180, and a spring is used to connect the wire gripping mechanism base and the wire gripping mechanism to each other. The tensile force is detected by detecting the displacement of the spring. Definitions of reference symbols in the dynamic model illustrated in FIG. 3B are described below.

$J_m$: Inertia of the motor $\theta_m$: Rotation angle of the motor $T_m$: Motor torque command value $c_m$: Damping coefficient of a motor shaft $k_g$, $c_g$: Spring coefficient and damping coefficient of a coupling $J_n$: Inertia of a drive shaft $\theta_n$: Rotation angle of the drive shaft $c_n$: Damping coefficient of the drive shaft p: Screw pitch of the drive shaft R: Conversion coefficient of a linear motion-rotation conversion mechanism, the conversion coefficient being an equivalent speed increasing ratio $m_{t1}$: Mass of the wire gripping mechanism base $k_{t1}$: Spring coefficient of the drive shaft in a z-direction $c_{t1}$: Damping coefficient of a linear slider of the wire gripping mechanism base $z_{t1}$: Displacement of the wire gripping mechanism base $m_{t2}$: Mass of the wire gripping mechanism $k_{t2}$, $c_{t2}$: Spring coefficient of a tensile force detecting mechanism $z_{t2}$: Displacement of the wire gripping mechanism The equations of motion are expressed by Equation (17) to Equation (20).

$$J_m\ddot{\theta}_m = T_m + k_g(\theta_n - \theta_m) + c_g(\dot{\theta}_n - \dot{\theta}_m) - c_m\dot{\theta}_m \tag{17}$$

$$J_n\ddot{\theta}_n = -k_g(\theta_n - \theta_m) - c_g(\dot{\theta}_n - \dot{\theta}_m) + Rk_{t1}(z_{t1} - R\theta_n) - c_n\dot{\theta}_n \tag{18}$$

$$m_{t1}\ddot{z}_{t1} = -k_{t1}(z_{t1} - R\theta_n) + k_{t2}(z_{t2} - z_{t1}) - c_{t1}\dot{z}_{t1} + c_{t2}(\dot{z}_{t2} - \dot{z}_{t1}) \tag{19}$$

$$m_{t2}\ddot{z}_{t2} = -k_{t2}(z_{t2} - z_{t1}) - c_{t2}(\dot{z}_{t2} - \dot{z}_{t1}) \tag{20}$$

In the equations, it is assumed that $R=p/2\pi$. When a matrix representation of $$q_1 = [\theta_m, \theta_n, z_{t1}, z_{t2}]^T$$

is given, Equation (21) is obtained.

$$M_l\ddot{q}_l + K_l q_l + C_l\dot{q}_l = \begin{bmatrix} J_m & & & 0 \\ & J_n & & \\ & & m_{t1} & \\ 0 & & & m_{t2} \end{bmatrix}\begin{bmatrix} \ddot{\theta}_m \\ \ddot{\theta}_n \\ \ddot{z}_{t1} \\ \ddot{z}_{t2} \end{bmatrix} + \tag{21}$$

$$\begin{bmatrix} k_g & -k_g & 0 & 0 \\ -k_g & k_g + R^2 k_{t1} & -Rk_{t1} & 0 \\ 0 & -Rk_{t1} & k_{t1}+k_{t2} & -k_{t2} \\ 0 & 0 & -k_{t2} & k_{t2} \end{bmatrix}\begin{bmatrix} \theta_m \\ \theta_n \\ z_{t1} \\ z_{t2} \end{bmatrix} + $$

$$\begin{bmatrix} c_m+c_g & -c_g & 0 & 0 \\ -c_g & c_n+c_g & 0 & 0 \\ 0 & 0 & c_{t1}+c_{t2} & -c_{t2} \\ 0 & 0 & -c_{t2} & c_{t2} \end{bmatrix}\begin{bmatrix} \dot{\theta}_m \\ \dot{\theta}_n \\ \dot{z}_{t1} \\ \dot{z}_{t2} \end{bmatrix} = \begin{bmatrix} T_m \\ 0 \\ 0 \\ 0 \end{bmatrix}$$

1.1.3) Configuration of Augmented System

As illustrated in FIG. 3C, an augmented system in which the dynamic model of the curvable portion 110 illustrated in FIG. 3A is coupled to the dynamic model formed of the rotation motor, the rotation-linear motion conversion mechanism, and the wire gripping mechanism illustrated in FIG. 3B is set as the dynamic model $P_n$ of the continuum robot 100. When the displacement $z_{t2}$ of the wire gripping mechanism and the displacement $z_b$ of the wire gripping pipe are set to be the same and the augmented system is configured by Equation (11) and Equation (21), the equation of motion is expressed by Equation (22). In the equation, it is assumed that $$q_g = \left[ q_1^T, z_w, \theta \right]^T.$$

$$M_g \ddot{q}_g + K_g q_g + C_g \dot{q}_g + \Phi_g = \begin{bmatrix} J_m & & & & & 0 \\ & J_n & & & & \\ & & m_{t1} & & & \\ & & & m_{t2}+m_p & & \\ & & & & m_w & \\ 0 & & & & & M_{c22} \end{bmatrix} \begin{bmatrix} \ddot{\theta}_m \\ \ddot{\theta}_n \\ \ddot{z}_{t1} \\ \ddot{z}_{t2} \\ \ddot{z}_w \\ \ddot{\theta} \end{bmatrix} + \tag{22}$$

$$\begin{bmatrix} k_g & -k_g & 0 & 0 & 0 & 0 \\ -k_g & k_g+R^2 k_{t1} & -Rk_{t1} & 0 & 0 & 0 \\ 0 & -Rk_{t1} & k_{t1}+k_{t2} & -k_{t2} & 0 & 0 \\ 0 & 0 & -k_{t2} & k_{t2}+k_{w3} & -k_{w3} & 0 \\ 0 & 0 & 0 & -k_{w3} & k_{w3}+k_w & -k_w r \\ 0 & 0 & 0 & 0 & -k_w r & k_w r^2 + k_b \end{bmatrix} \begin{bmatrix} \theta_m \\ \theta_n \\ z_{t1} \\ z_{t2} \\ z_w \\ \theta \end{bmatrix} +$$

$$\begin{bmatrix} c_m+c_g & -c_g & 0 & 0 & 0 & 0 \\ -c_g & c_n+c_g & 0 & 0 & 0 & 0 \\ 0 & 0 & c_{t1}+c_{t2} & -c_{t2} & 0 & 0 \\ 0 & 0 & -c_{t2} & c_{t2}+c_{w3} & -c_{w3} & 0 \\ 0 & 0 & 0 & -c_{w3} & c_{w3}+c_w+c_{w2} & -c_w r \\ 0 & 0 & 0 & 0 & -c_w r & c_w r^2 + c_b \end{bmatrix} \begin{bmatrix} \dot{\theta}_m \\ \dot{\theta}_n \\ \dot{z}_{t1} \\ \dot{z}_{t2} \\ \dot{z}_w \\ \dot{\theta} \end{bmatrix} + \begin{bmatrix} 0 \\ 0 \\ 0 \\ 0 \\ 0 \\ \Phi_3 \end{bmatrix} = \begin{bmatrix} 1 \\ 0 \\ 0 \\ 0 \\ 0 \\ 0 \end{bmatrix} T_m$$

Next, an equation of state is obtained. When the bending angle of the curvable portion 110 is not in the vicinity of 0 degrees, an extended linearization method expressed by Equation (23) in which a non-linear term $\varphi_g$ is forced into a matrix $K_g$ to perform linearization is applied.

$$\Phi_3 = \frac{\Phi_3}{\theta} \theta \tag{23}$$

Thus, $\varphi_3$ becomes an element of $K_g(6, 6)$. The equations of state are expressed by Equation (24) and Equation (25).

$$\dot{x}_g = A_g(\theta, \dot{\theta}) x_g + B_g(\theta, \dot{\theta}) T_m \tag{24}$$

$$x_g = [\theta_m, \theta_n, z_{t1}, z_{t2}, z_w, \theta, \dot{\theta}_m, \dot{\theta}_n, \dot{z}_{t1}, \dot{z}_{t2}, \dot{z}_w, \dot{\theta}]^T \tag{25}$$

In this embodiment, the displacement $z_{t1}$ of the wire gripping mechanism base and a displacement $z_{t2}$ of the wire gripping mechanism can be measured, and a force (hereinafter referred to as "generated force") F exerted on the wire gripping mechanism by a spring $k_{t2}$ and the displacement $z_{t2}$ of the wire gripping mechanism are set as observation amounts. Here, the generated force F is expressed by Equation (26).

$$F = -k_t 2(z_{t2} - z_{t1}) \tag{26}$$

At this time, an observation amount $y_g$ is expressed by an output equation expressed by Equation (27).

$$y_g = [-k_{t2}(z_{t2}-z_{t1}) \quad z_{t2}]^T \tag{27}$$

$$= \begin{bmatrix} 0 & 0 & k_{t2} & -k_{t2} & 0 & 0 & 0 & 0 & 0 & 0 & 0 & 0 \\ 0 & 0 & 0 & 1 & 0 & 0 & 0 & 0 & 0 & 0 & 0 & 0 \end{bmatrix} x_g$$

$$= C_g x_g$$

When the bending angle of the curvable portion 110 is in the vicinity of 0 degrees, the augmented system is similarly configured by Equation (16) that represents the equation of motion of the curvable portion 110 in the vicinity of 0 degrees and Equation (21) that represents the equation of motion of the dynamic model formed of the rotation motor, the rotation-linear motion conversion mechanism, and the wire gripping mechanism. This is a linear model, and may thus be directly converted into an equation of state.

Figure 4:
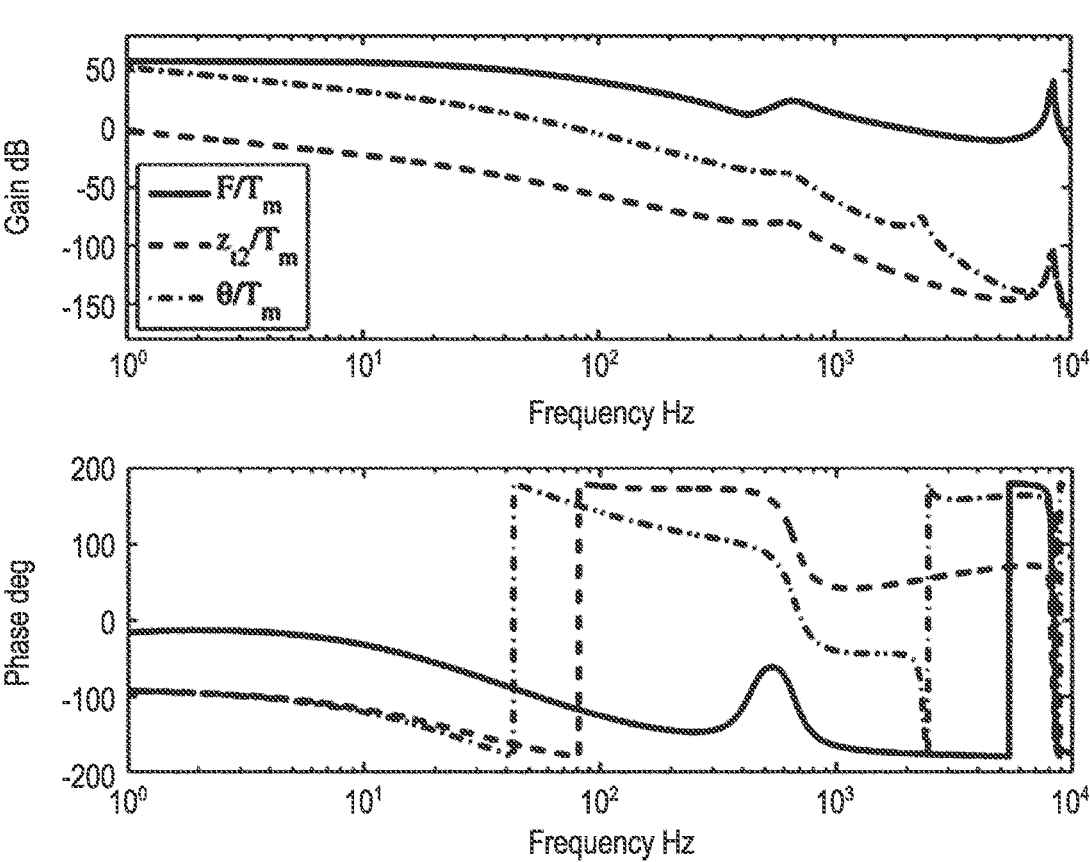
FIG. 4 is a Bode diagram of a dynamic model (augmented system) of the continuum robot in the first embodiment of the present disclosure.

FIG. 4 is a Bode diagram of the dynamic model $P_n$ (augmented system) of the continuum robot 100 in the first embodiment of the present disclosure. In FIG. 4, a transfer function from the motor torque command value $T_m$ to the generated force F is indicated by the solid lines, a transfer function to the displacement $z_{t2}$ of the wire gripping mechanism is indicated by the broken lines, and a transfer function to the bending angle $\theta$ of the curvable portion 110 is indicated by the one-dot chain lines. In a high-frequency region, there appears higher-order vibration caused by the spring of the wire tensile force detecting mechanism, the wire, and the rotation-linear motion conversion mechanism.

1.2) Control System Design 1.2.1) Back-drivability Switching Control System

As illustrated in FIG. 1, this embodiment relates to a system including the low back-drivability drive control unit ($K_{POS}$) 251 having high positioning performance and low back-drivability and the high back-drivability drive control unit ($K_{BKD}$) 252 having high back-drivability. Here, the switching from the low back-drivability drive control unit ($K_{POS}$) 251 to the high back-drivability drive control unit ($K_{BKD}$) 252 is automatically enabled in accordance with the mode signal. However, the switching from the high back-drivability drive control unit ($K_{BKD}$) 252 to the low back-drivability drive control unit ($K_{POS}$) 251 is not automatically enabled in accordance with the mode signal. A further
constraint for this switching is a constraint under which the
difference $\theta_{err}$ between the bending angle of the curvable
portion input to the kinematics computing unit (Kinematics)
230 and the bending angle of the curvable portion output
from the inverse kinematics computing unit (IK) 270 is
equal to or smaller than the threshold value. A reason why
the above-mentioned further constraint has been imposed on
the switching from the high back-drivability drive control
unit ($K_{BKD}$) 252 to the low back-drivability drive control
unit ($K_{POS}$) 251 is as follows. That is, the high back-
drivability drive control unit ($K_{BKD}$) 252 exhibits a large
error between the target command value $ref_\theta$ of the bending
angle and the bending angle of the curvable portion output
from the inverse kinematics computing unit (IK) 270. When
unconstrained switching is performed from this state to the
low back-drivability drive control unit ($K_{POS}$) 251, the
continuum robot ($P_n$) 100 is rapidly brought into action in
order to follow the target value, thereby raising a fear that
damage may be caused to the continuum robot itself or
surroundings thereof.

Now, description is given with reference to FIG. 1 and
FIG. 2.

Assuming that the curvable portion 110 being a con-
tinuum portion has a constant curvature, a relationship
between a drive amount $l_p$ of the wire and the bending angle
$\theta$ is given by Equation (28).

$$l_p = r_1 \cdot \theta \qquad (28)$$

Here, assuming that an amount of expansion or contrac-
tion of the wire is regarded as minute and is not taken into
consideration in derivation of a kinematics computation,
Equation (29) is obtained by the kinematics computing unit
(Kinematics) 230 from the target command value $ref_\theta$ of the
bending angle of the curvable portion 110 and the target
displacement $ref_z$ of the wire gripping mechanism.

$$ref_z = r_1 \cdot ref_\theta \qquad (29)$$

Further, the inverse kinematics computing unit (IK) 270
obtains the bending angle $\theta_{IK}$ of the curvable portion 110
from the displacement $z_{t2}$ of the wire gripping mechanism
by Equation (30).

$$\theta_{IK} = \frac{z_{t2}}{r_1} \qquad (30)$$

Then, the difference $\theta_{err}$ between the bending angle $\theta_{IK}$ of
the curvable portion 110 and the target command value $ref_\theta$
of the bending angle of the curvable portion 110 obtained
due to this inverse kinematics is expressed by Equation (31).

$$\theta_{err} = ref_\theta - \theta_{IK} \qquad (31)$$

This difference $\theta_{err}$ is input to the switching control unit
(H) 220. The switching control unit (H) 220 outputs the
signal $h_{OUT}$, the signal $h_{POS}$, and the signal $h_{BKD}$ in order to
switch the drive control unit. The signal $h_{OUT}$ is input to the
selection unit 260. The selection unit 260 selects the output
($u_{POS}$) of the low back-drivability drive control unit ($K_{POS}$)
251 or the output ($u_{BKD}$) of the high back-drivability drive
control unit ($K_{BKD}$) 252 in accordance with the signal $h_{OUT}$,
and outputs the selected output to the continuum robot ($P_n$)
100.

Further, to enable the low back-drivability drive control
unit ($K_{POS}$) 251, the switching control unit (H) 220 turns on
the signal $h_{POS}$ and turns off the signal $h_{BKD}$. This causes the
blocking unit 242 to block the control error input to the high back-drivability drive control unit ($K_{BKD}$) 252. Meanwhile,
to enable the high back-drivability drive control unit ($K_{BKD}$)
252, the switching control unit (H) 220 turns off the signal
$h_{POS}$ and turns on the signal $h_{BKD}$. This causes the blocking
unit 241 to block the control error input to the low back-
drivability drive control unit ($K_{POS}$) 251.

In the switching from the high back-drivability drive
control unit ($K_{BKD}$) 252 to the low back-drivability drive
control unit ($K_{POS}$) 251, first, the mode signal indicating the
low back-drivability drive control unit ($K_{POS}$) 251 is input
from the input unit 211. In this case, when the above-
mentioned difference $\theta_{err}$ is equal to or smaller than the
threshold value set in advance, the switching control unit (H)
220 enables the low back-drivability drive control unit
($K_{POS}$) 251 and disables the high back-drivability drive
control unit ($K_{BKD}$) 252.

Meanwhile, in the switching from the low back-drivabil-
ity drive control unit ($K_{POS}$) 251 to the high back-drivability
drive control unit ($K_{BKD}$) 252, the switching control unit (H)
220 performs this switching irrespective of the value of the
above-mentioned difference $\theta_{err}$. That is, when the mode
signal indicating the high back-drivability drive control unit
($K_{BKD}$) 252 is input from the input unit 211, the switching
control unit (H) 220 enables the high back-drivability drive
control unit ($K_{BKD}$) 252 and disables the low back-drivabil-
ity drive control unit ($K_{POS}$) 251.

1.2.2) High Back-drivability Drive Control Unit ($K_{BKD}$)

Figure 5:
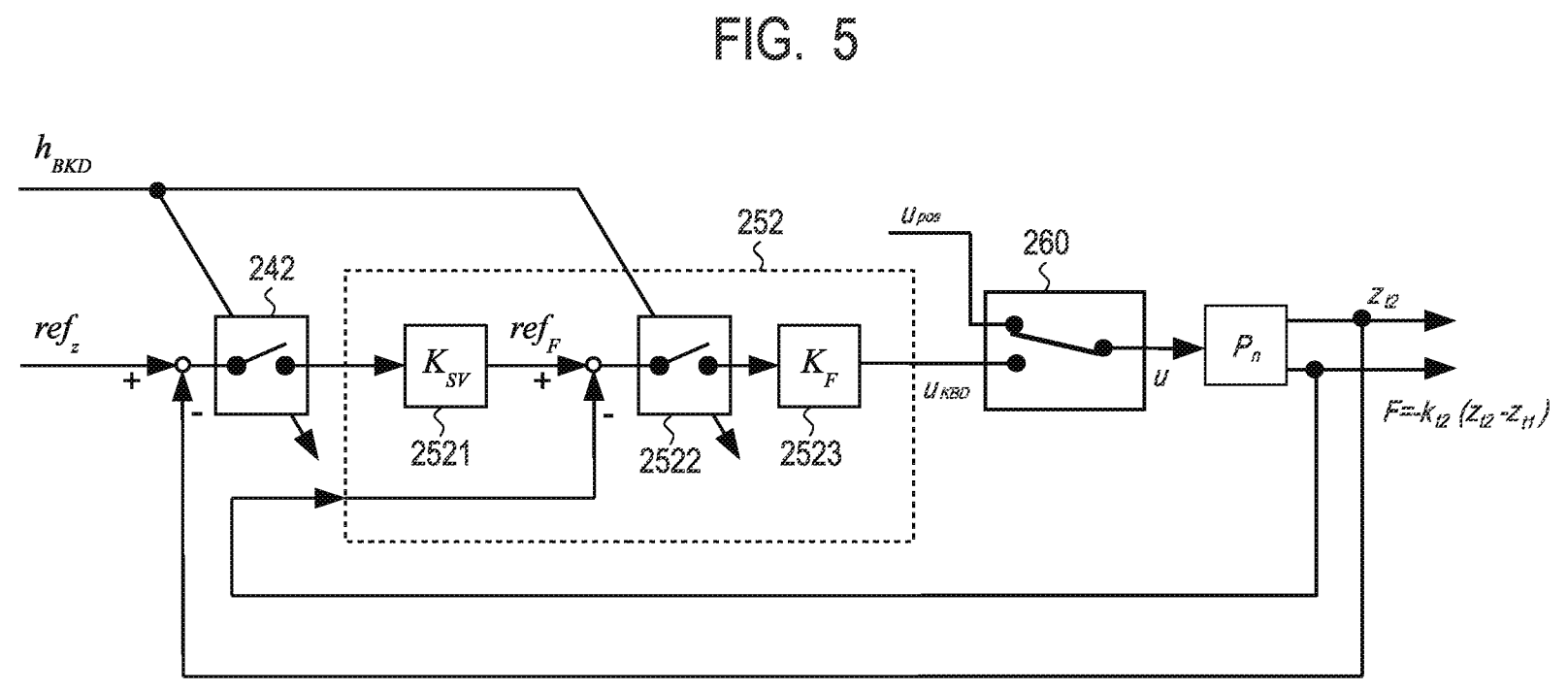

In this section, details of a high back-drivability drive
control unit ($K_{BKD}$) are described. FIG. 5 is a diagram for
illustrating an example of a functional configuration of the
high back-drivability drive control unit ($K_{BKD}$) 252 illus-
trated in FIG. 1. In FIG. 5, the same components as those
illustrated in FIG. 1 are denoted by the same reference
symbols, and detailed description thereof is omitted.

The high back-drivability drive control unit ($K_{BKD}$) 252
illustrated in FIG. 5 is configured as a double-loop system
for performing force control through an inner loop and
performing position control through an outer loop. The
configuration illustrated in FIG. 5 forms a control system
that enables the continuum robot ($P_n$) 100 to have high
back-drivability and to be positioned at the same time.

The high back-drivability drive control unit ($K_{BKD}$) 252
illustrated in FIG. 5 includes a position controller ($K_{SV}$)
2521, a blocking unit 2522, and a force controller ($K_F$) 2523.
In addition, $P_n$ illustrated in FIG. 5 represents the dynamic
model $P_n$ (augmented system) of the continuum robot 100
expressed by Equation (24) and Equation (27).

In an inner loop formed of the dynamic model $P_n$ (aug-
mented system) of the continuum robot 100 and the force
controller ($K_F$) 2523, an error is computed by taking a
difference between a target value $ref_F$ of the generated force
and the generated force F. The force controller ($K_F$) 2523
outputs the motor torque $T_m$ as control input for compen-
sating for the error. That is, the high back-drivability drive
control unit ($K_{BKD}$) 252 illustrated in FIG. 5 has a function
of compensating for an error between a target value of a
force to be applied to the wire and a detected value of a force
applied to the wire. This feedback loop is equivalent to
compensating for an equivalent inertia of the rotation-linear
motion conversion mechanism, thereby enabling the back-
drivability of the continuum robot ($P_n$) 100 to be improved.
In this embodiment, a closed-loop system based on this
feedback is referred to as "$G_{cl}$". In an outer loop formed of
this $G_{cl}$ and the position controller ($K_{SV}$) 2521, an error is
computed by taking a difference between a target value $ref_z$
of the position and the displacement $z_{t2}$. The position
controller ($K_{SV}$) 2521 outputs the target value $ref_F$ of the generated force as control input for compensating for the error. In this embodiment, as the force controller (K$_F$) 2523, a PID control system expressed by Equation (32) is used.

$$K_F(s) = K_{p1}\left(1 + \frac{K_{i1}}{s} + \frac{s}{K_{d1}}\right), \quad K_{i1} = 2\pi F_{zi1}, \quad K_{d1} = 2\pi F_{zd1} \tag{32}$$

In Equation (32), F$_{zi1}$ and F$_{zd1}$ represent zero-crossing frequencies of an integral controller and a differential controller, respectively. Further, in order to stabilize the higher-order mode described in the previous chapter, a second-order low-pass filter having a break frequency of 200 Hz is coupled to the PID control system. In order to design the force controller (K$_F$) 2523 that is stable against variation of poles and zero points of the curvable portion 110 being a continuum portion due to use of the rotation-linear motion conversion mechanism and against phase characteristics varied by the damping coefficient c$_{w2}$ in vicinities of the zero points, the design is performed as follows. Specifically, an open-loop transfer function P$_n$K$_F$ is derived, and a response thereof is used to perform the design so that a gain margin and a phase margin are sufficient.

Figure 6A:
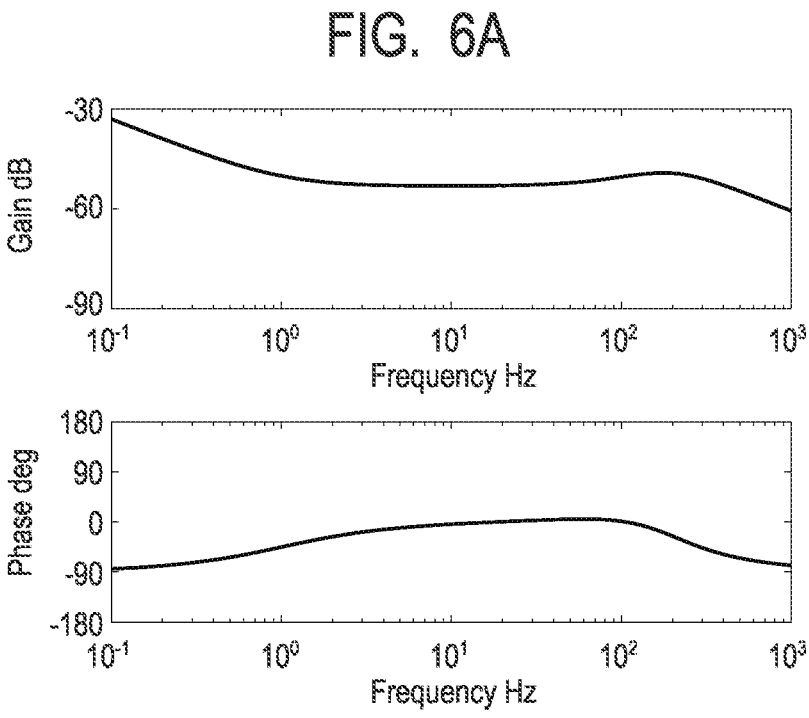
FIG. 6A and FIG. 6B are a Bode diagram of a force controller ($K_F$) illustrated in FIG. 5 and a Bode diagram of an open-loop transfer function illustrated in FIG. 5, respectively.
Figure 6B:
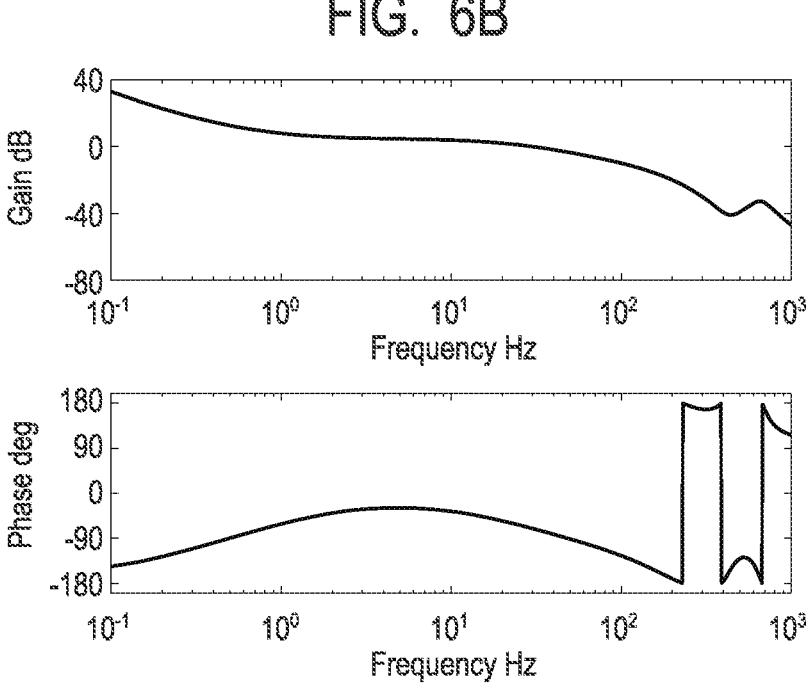

FIG. 6A and FIG. 6B are a Bode diagram of the force controller (K$_F$) 2523 illustrated in FIG. 5 and a Bode diagram of the open-loop transfer function P$_n$K$_F$ illustrated in FIG. 5, respectively. Specifically, assuming that K$_p$, F$_{zi}$, and F$_{zd}$ are set to 2.2×10E-3, 1.0, and 95, respectively, the Bode diagram of the force controller (K$_F$) 2523 having a control bandwidth of about 30 Hz is shown in FIG. 6A, and the Bode diagram of the open-loop transfer function P$_n$K$_F$ is shown in FIG. 6B.

Further, as the position controller (K$_{SV}$) 2521, a PID control system expressed by Equation (33) is used.

$$K_{SV}(s) = K_{p2}\left(1 + \frac{K_{i2}}{s} + \frac{s}{K_{d2}}\right), \quad K_{i2} = 2\pi F_{zi2}, \quad K_{d2} = 2\pi F_{zd2} \tag{33}$$

In Equation (33), F$_{zi2}$ and F$_{zd2}$ represent zero-crossing frequencies of the integral controller and the differential controller, respectively. In this embodiment, an open-loop transfer function G$_{cl}$K$_{SV}$ is derived through use of a closed-loop transfer function G$_{cl}$ between the dynamic model P$_n$ (augmented system) of the continuum robot 100 and the force controller (K$_F$) 2523, and a response thereof is used to perform the design so that a gain margin and a phase margin are sufficient. Further, a first-order low-pass filter having a break angular frequency of 50 Hz is coupled to the PID control system.

Figure 7A:
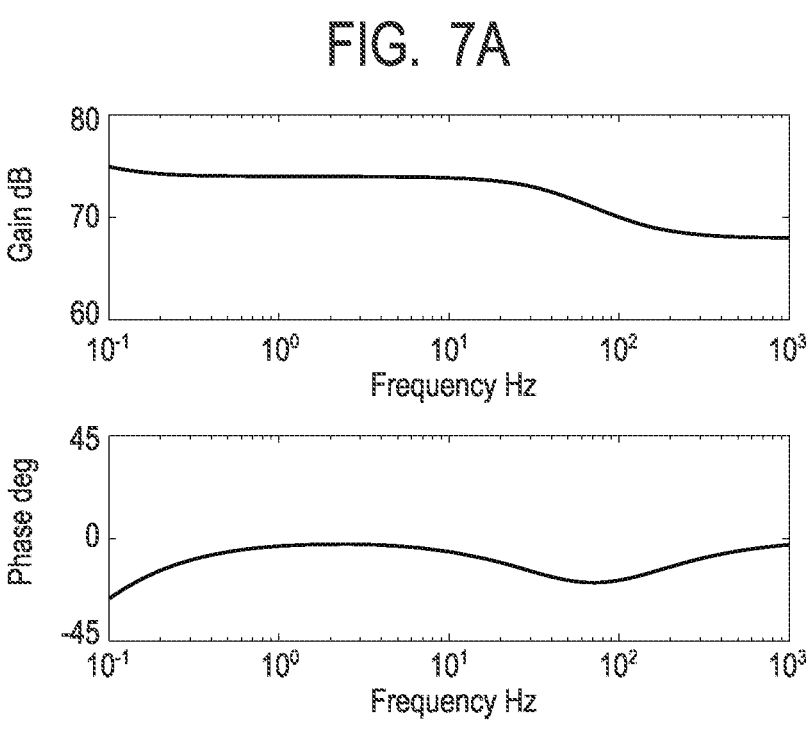
FIG. 7A and FIG. 7B are a Bode diagram of a position controller ($K_{SV}$) illustrated in FIG. 5 and a Bode diagram of an open-loop transfer function illustrated in FIG. 5, respectively.
Figure 7B:
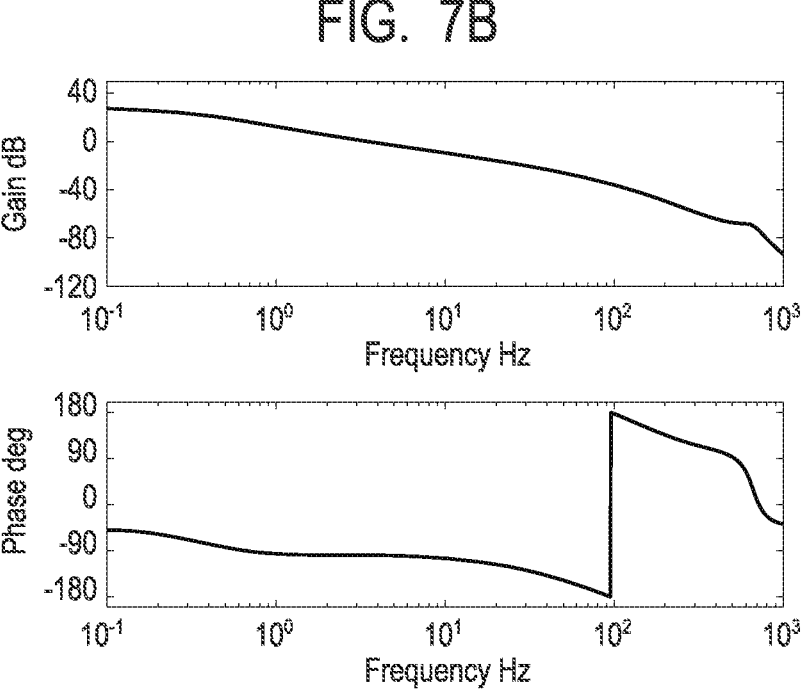

FIG. 7A and FIG. 7B are a Bode diagram of the position controller (K$_{SV}$) 2521 illustrated in FIG. 5 and a Bode diagram of the open-loop transfer function G$_{cl}$K$_{SV}$ illustrated in FIG. 5, respectively. Specifically, assuming that K$_{ps}$, F$_{zis}$, and F$_{zds}$ are set to 5×10E3, 0.05, and 100, respectively, the Bode diagram of the position controller (K$_{SV}$) 2521 having a control bandwidth of about 3.5 Hz is shown in FIG. 7A, and the Bode diagram of the open-loop transfer function G$_{cl}$K$_{SV}$ is shown in FIG. 7B.

1.2.3) Low Back-drivability Drive Control Unit (K$_{POS}$)

The high back-drivability drive control unit (K$_{BKD}$) 252 can be improved in back-drivability while deterioration in positioning performance is suppressed by a double-loop control system. However, the double-loop control system includes noise and higher-order vibration of the force controller (K$_F$) 2523 in the inner loop. In view of this, in a situation in which necessity for the back-drivability is low, a position control system that uses the displacement z$_{t2}$ of the wire gripping mechanism as the control amount is used as the low back-drivability drive control unit (K$_{POS}$) 251. Specifically, a PID control system expressed by Equation (34) is used.

$$K_{POS}(s) = K_{p3}\left(1 + \frac{K_{i3}}{s} + \frac{s}{K_{d3}}\right), \quad K_{i3} = 2\pi F_{zi3}, \quad K_{d3} = 2\pi F_{zd3} \tag{34}$$

In Equation (34), F$_{zi3}$ and F$_{zd3}$ represent zero-crossing frequencies of an integral controller and a differential controller, respectively.

Figure 8A:
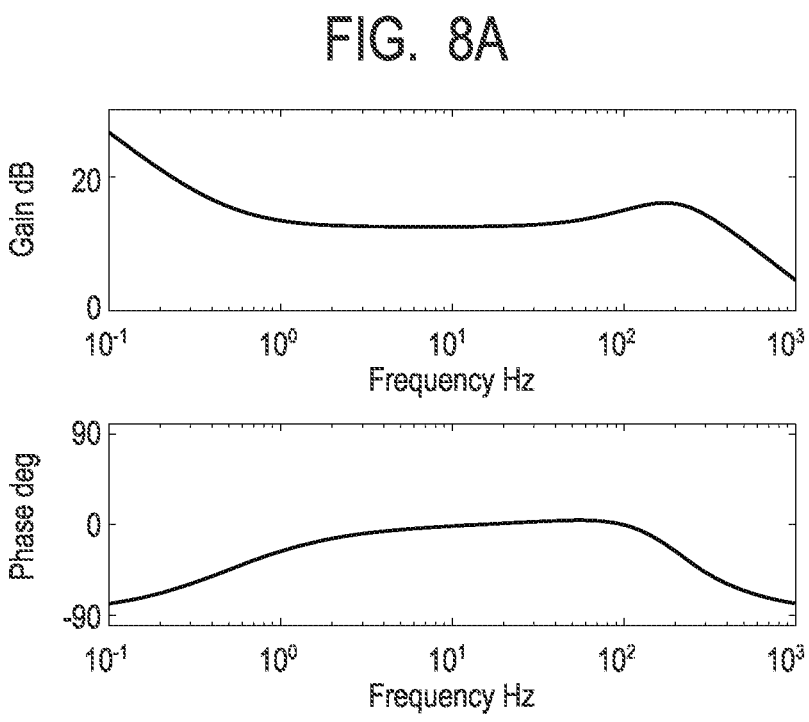
FIG. 8A and FIG. 8B are a Bode diagram of a low back-drivability drive control unit ($K_{POS}$) illustrated in FIG. 1 and a Bode diagram of an open-loop transfer function with respect to a closed-loop system, respectively.
Figure 8B:
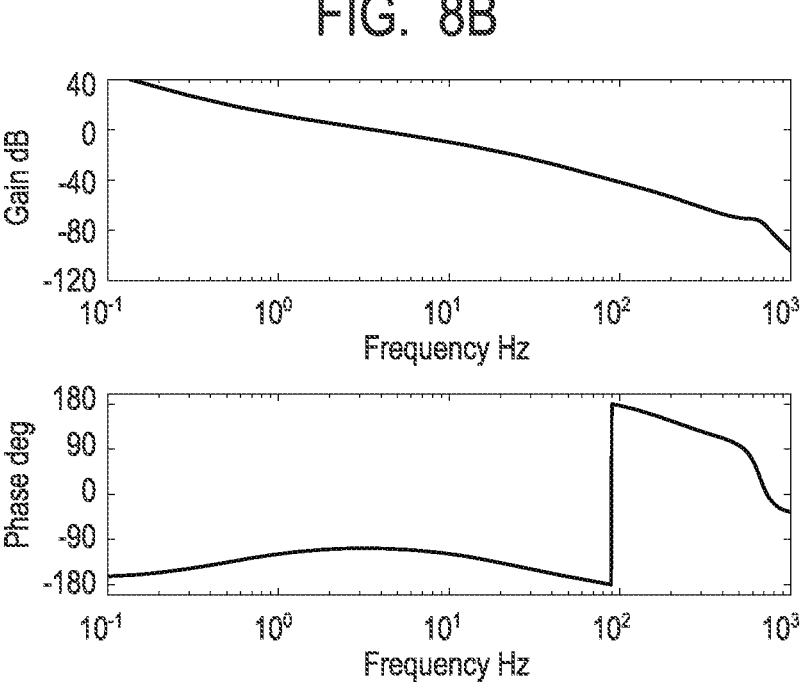

FIG. 8A and FIG. 8B are a Bode diagram of the low back-drivability drive control unit (K$_{POS}$) 251 illustrated in FIG. 1 and a Bode diagram of an open-loop transfer function G$_{cl}$K$_{POS}$ for the closed-loop system G$_{cl}$, respectively. Specifically, assuming that K$_{p3}$, F$_{zi3}$, and F$_{zd3}$ are set to 2.35× 10E-4, 0.5, and 100, respectively, the Bode diagram of the low back-drivability drive control unit (K$_{POS}$) 251 having a control bandwidth of about 3.5 Hz is shown in FIG. 8A, and the Bode diagram of the open-loop transfer function G$_{cl}$K$_{POS}$ is shown in FIG. 8B.

1.3) Simulation

A simulation is performed through use of the drive control unit described in the previous chapter and the dynamic model P$_n$ (augmented system) of the continuum robot 100 expressed by Equation (24) and Equation (27).

Figure 9:
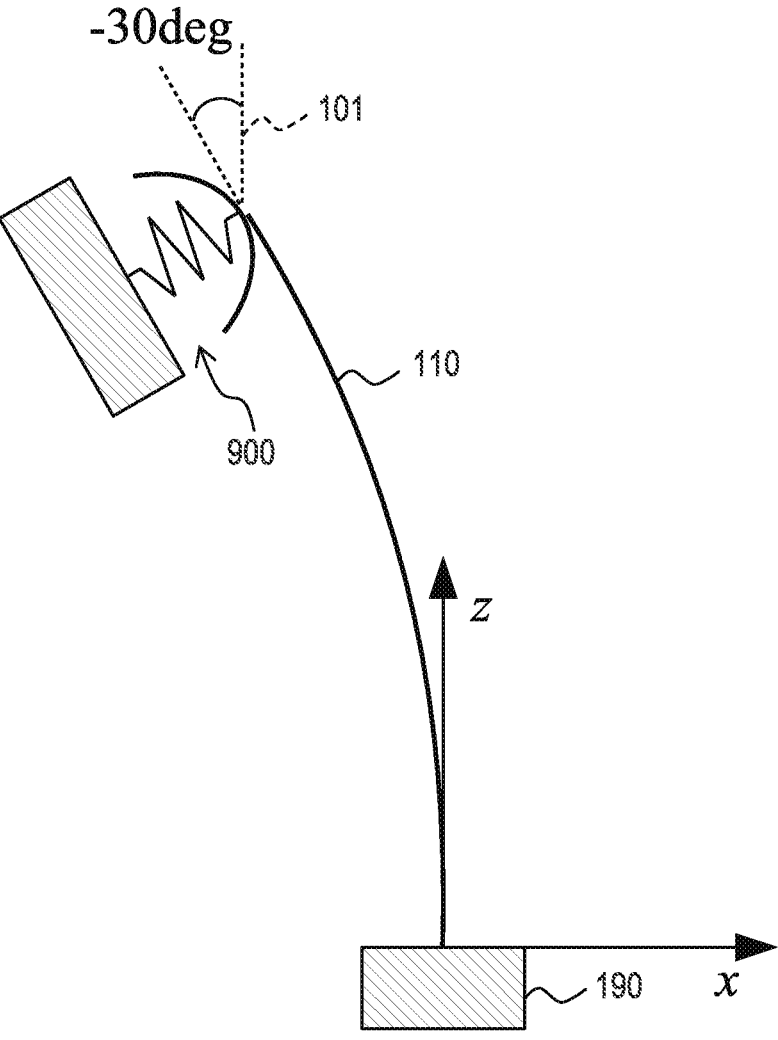
FIG. 9 is a schematic diagram of a simulation in the first embodiment of the present disclosure.

FIG. 9 is a schematic diagram of a simulation in the first embodiment of the present disclosure. In FIG. 9, the same components as those illustrated in FIG. 2 are denoted by the same reference symbols, and detailed description thereof is omitted.

An operator gives a trapezoidal target trajectory to cause the curvable portion 110 to curve to −45 degrees in 1.5 seconds, stop until a lapse of 3 seconds, and then return to 0 degrees. At this time, as illustrated in FIG. 9, a simulation in which the tip of the curvable portion 110 and an obstacle 900 being an elastic body are brought into contact with each other at an angle at which the bending angle of the curvable portion 110 is −30 degrees is performed. In this case, a manipulation is assumed to be started through use of the low back-drivability drive control unit (K$_{POS}$) 251, and the generated force F is also assumed to be able to be monitored. Thus, the operator is assumed to determine that a load is applied to the wire being driven when the generated force F has fallen out of ±2 N (predetermined range), and perform switching to the high back-drivability drive control unit (K$_{BKD}$) 252 based on the mode signal from the input unit 211. Further, in the manipulation for the return to 0 degrees, the operator is assumed to perform switching to the low back-drivability drive control unit (K$_{POS}$) 251 based on the mode signal from the input unit 211 when the generated force F falls within ±2 N (within the predetermined range). In this embodiment, an example in which the operator determines whether or not the generated force F has fallen out of ±2 N (predetermined range) is described, but the present disclosure is not limited to this mode. For example, a mode in which the continuum robot (P$_n$) 100 illustrated in FIG. 3C detects the generated force F and the control system 10-1 for a continuum robot generates a mode signal from the input unit 211 based on a result of detecting the generated force F can also be applied to the present disclosure.

Figure 10:
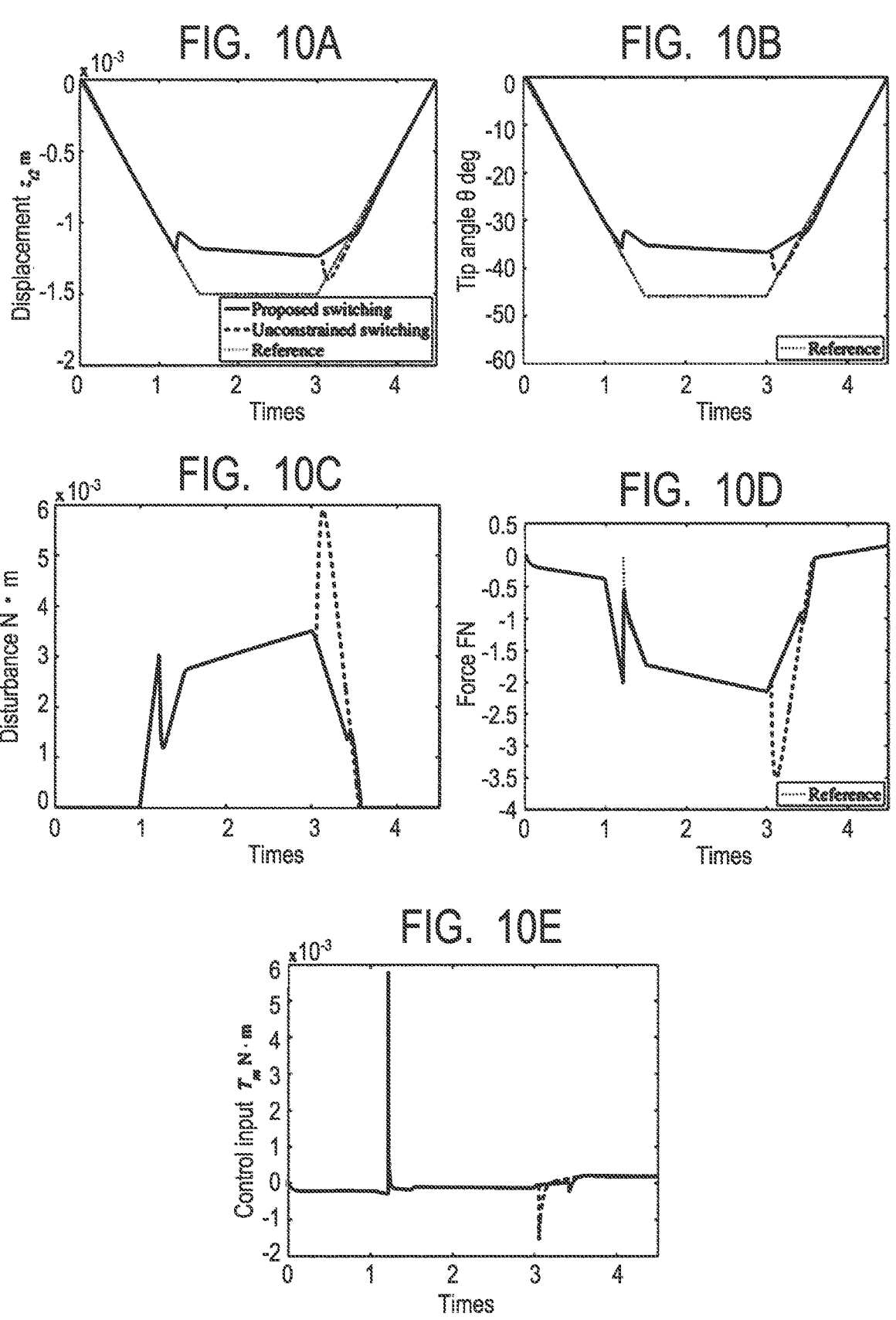
FIG. 10A, FIG. 10B, FIG. 10C, FIG. 10D, and FIG. 10E are graphs for showing response characteristics of the simulation in the first embodiment of the present disclosure.

FIG. 10A to FIG. 10E are graphs for showing response characteristics of the simulation in the first embodiment of the present disclosure. Specifically, FIG. 10A shows the displacement $z_{t2}$ of the wire gripping mechanism, FIG. 10B shows the bending angle θ of the curvable portion 110, FIG. 10C shows a disturbance torque applied to the tip of the curvable portion 110, FIG. 10D shows the generated force F, and FIG. 10E shows the control input $T_m$.

In each of FIG. 10A to FIG. 10E, the response of the control system in this embodiment described in the previous chapter is indicated by the solid line, and as a comparative example, a response of a control system that does not impose any constraint on the switching of the back-drivability (hereinafter abbreviated as "unconstrained switching control system") is indicated by the broken line. In addition, in FIG. 10A, the target displacement $ref_z$ of the wire gripping mechanism to be applied to the outer loop is indicated by the dotted line, and in FIG. 10D, the target value $ref_F$ of the generated force which is the control input to be output from the position controller ($K_{SV}$) 2521 is indicated by the dotted line.

As shown in FIG. 10B, one second after a start of the simulation, the bending angle θ of the curvable portion 110 reaches −30 degrees to bring the tip of the curvable portion 110 into contact with the obstacle 900, and hence the disturbance torque starts to be applied as shown in FIG. 10C. At this time, the spring of the wire tensile force detecting mechanism described with reference to FIG. 2 is stretched to detect a disturbance. In this embodiment, a force generated by the spring $k_{t2}$ and exerted on the wire gripping mechanism is defined as the generated force F, and thus appears as a negative force as shown in FIG. 10D. As in FIG. 10D, the generated force reaches −2 N in about 1.2 seconds, and the operator performs switching to the high back-drivability drive control unit ($K_{BKD}$) 252 through the input unit 211.

Further, as indicated by the dotted line in FIG. 10D, an initial target value for the force controller ($K_F$) 2523 of the high back-drivability drive control unit ($K_{BKD}$) 252 is 0. In order to follow this target value, as shown in FIG. 10E, the force controller ($K_F$) 2523 provides positive control input to the motor to cause the motor to rotate in a positive direction. Thus, as shown in FIG. 10A, the wire gripping mechanism is displaced in a z-axis positive direction. As a result, as shown in FIG. 10B, the tip of the curvable portion 110 being a continuum portion is curved in the same direction as that of the disturbance torque, thereby achieving control in which the continuum robot ($P_n$) 100 performs back-driving in accordance with the disturbance torque.

Next, a response of the position control system being the outer loop having a bandwidth lower than that of a force control system being the inner loop rises. As indicated by the dotted line in FIG. 10D, a target value of the generated force being the control input of the position control system becomes larger, to thereby follow the command value of the operator. However, the equivalent inertia of the rotation-linear motion conversion mechanism is compensated for and reduced by the inner loop, and hence the back-drivability is high, thereby causing a gentle follow-up as shown in FIG. 10A. This enables the generated force, that is, a load on the wire to be suppressed to a low level, and can prevent the continuum robot from being damaged. When an action of the return to 0 degrees is started after the lapse of 3 seconds, the generated force F falls below 2 N at a lapse of about 3.1 seconds as shown in FIG. 10D.

In view of this, the operator issues a switching command to the low back-drivability drive control unit ($K_{POS}$) 251 through the input unit 211. However, as in FIG. 10B, a difference between the bending angle of the curvable portion 110 and the target angle is large, and hence the switching control unit (H) 220 does not perform the switching. Then, at a lapse of about 3.3 seconds, the difference falls within 0.5 degrees (threshold value), and hence the switching control unit (H) 220 performs switching to the low back-drivability drive control unit ($K_{POS}$) 251. Thus, it is understood from FIG. 10B that the bending angle θ of the curvable portion 110 has returned to 0 degrees while converging smoothly to the command value. It is also understood from FIG. 10D that a large variation has not occurred in the generated force F at the time of the switching.

Meanwhile, in the unconstrained switching control system indicated by the broken line in FIG. 10B, on the other hand, the switching to the low back-drivability drive control unit ($K_{POS}$) 251 is permitted at the lapse of about 3.1 seconds, and the low back-drivability drive control unit ($K_{POS}$) 251 exhibits a rapid follow-up toward the target angle. The target angle at this time is an angle at which a contact with the obstacle 900 still occurs. Thus, as shown in FIG. 10C, a large disturbance torque is applied from the obstacle 900. This exerts a large force on the wire as shown in FIG. 10D, and is highly liable to damage the continuum robot. In this embodiment, the bending angle of the curvable portion 110 to be used for the switching is obtained by the inverse kinematics computation expressed by Equation (30) instead of by a direct observation amount.

Figure 11:
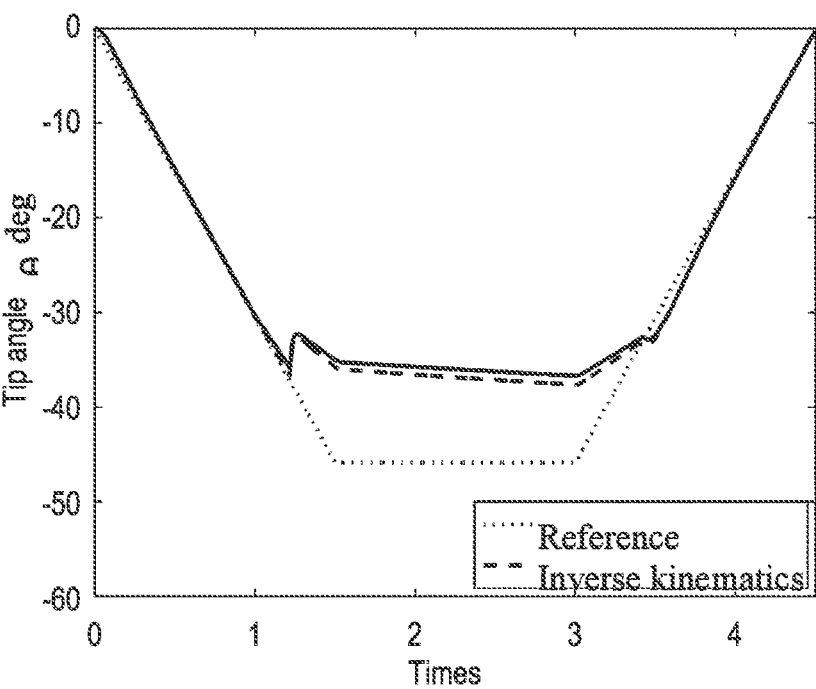
FIG. 11 is a graph for showing the response characteristics of the simulation in the first embodiment of the present disclosure.

FIG. 11 is a graph for showing the response characteristics of the simulation in the first embodiment of the present disclosure. Specifically, in FIG. 11, the bending angle of the curvable portion 110 is indicated by the solid line, and the bending angle obtained by the inverse kinematics computation is indicated by the broken line. The inverse kinematics computation in this embodiment does not take the expansion or contraction of the wire or the like into consideration, and includes an error, but is understood to have no effect on securing the stability at the time of the switching.

The control system 10-1 for a continuum robot according to the first embodiment includes the continuum robot 100-1 including the curvable portion 110 configured to be curvable when the wire 111 is driven and the actuator 180 being the drive unit that drives the wire 111. The control system 10-1 for a continuum robot further includes the kinematics computing unit (Kinematics) 230 that performs a kinematics computation for calculating the drive amount of the wire 111 from the bending angle of the curvable portion 110 with respect to the reference axis 101. The control system 10-1 for a continuum robot also includes the low back-drivability drive control unit ($K_{POS}$) 251 being the first drive control unit that controls the drive amount of the wire 111 being driven by the drive unit based on the result of the kinematics computation described above. The control system 10-1 for a continuum robot also includes the high back-drivability drive control unit ($K_{BKD}$) 252 being the second drive control unit with which the drive unit is more easily driven in the reverse direction than in the case of the drive control performed by the low back-drivability drive control unit ($K_{POS}$) 251 when the curvable portion 110 is subjected to an external force. The high back-drivability drive control unit ($K_{BKD}$) 252 controls the drive amount of the wire 111 being driven by the drive unit based on the result of the kinematics computation described above. The control system 10-1 for a continuum robot further includes the switching control unit (H) 220 that performs control to switch between the low back-drivability drive control unit ($K_{POS}$) 251 and the high back-drivability drive control unit ($K_{BKD}$) 252 in accordance with the mode signal indicating the drive control unit to be selected, the mode signal having been input from the input unit 211. According to the configuration of the control system 10-1 for a continuum robot, when there are a plurality of drive control units having different back-drivability as the drive control units for curving the curvable portion, switching therebetween can be appropriately performed with a reduced burden on an operator.

In addition, the control system 10-1 for a continuum robot further includes the inverse kinematics computing unit (IK) 270 that performs the inverse kinematics computation for calculating the bending angle of the curvable portion 110 from the drive amount of the wire 111, the inverse kinematics computation being the computation reverse to the kinematics computation described above. Further, in the case in which the mode signal indicating the low back-drivability drive control unit ($K_{POS}$) 251 has been input from the input unit 211 while the drive control is being performed by the high back-drivability drive control unit ($K_{BKD}$) 252, the switching control unit (H) 220 performs control to switch from the high back-drivability drive control unit ($K_{BKD}$) 252 to the low back-drivability drive control unit ($K_{POS}$) 251 when the difference $\theta_{err}$ between the bending angle of the curvable portion input to the kinematics computing unit (Kinematics) 230 and the bending angle of the curvable portion output from the inverse kinematics computing unit (IK) 270 is equal to or smaller than the threshold value. According to the configuration of the control system 10-1 for a continuum robot, a rapid follow-up to the target value at the time of the switching is suppressed, and the prevention of damage to the continuum robot itself and a fragile target object can be achieved.

According to the present disclosure, when there are a plurality of drive control units having different back-drivability as the drive control units for curving the curvable portion, switching therebetween can be appropriately performed with a reduced burden on the operator.

Second Embodiment

Next, a second embodiment of the present disclosure is described. In the following description of the second embodiment, description of matters common to the first embodiment described above is omitted, and matters different from those of the first embodiment described above are described.

In the above-mentioned first embodiment, the switching from the high back-drivability drive control unit ($K_{BKD}$) 252 to the low back-drivability drive control unit ($K_{POS}$) 251 is performed under a constraint that the difference $\theta_{err}$ between the bending angles of the curvable portion is sufficiently small to be equal to or smaller than the threshold value. It has been described that this configuration suppresses a rapid follow-up to the target value at the time of the switching to the low back-drivability drive control unit ($K_{POS}$) 251, and can prevent damage to the continuum robot itself or surroundings thereof. However, in the first embodiment, as in FIG. 10D and FIG. 10E for showing the response characteristics of the simulation, at the time of the switching from the low back-drivability drive control unit ($K_{POS}$) 251 to the high back-drivability drive control unit ($K_{BKD}$) 252, the initial target value for the force controller ($K_F$) 2523 is 0, and hence a peak has occurred in the control input to the motor. In view of this, in the second embodiment, a control system that suppresses the peak of the control input at the time of the switching is described.

2.1) Control System Design

Figures 12A, 12B:
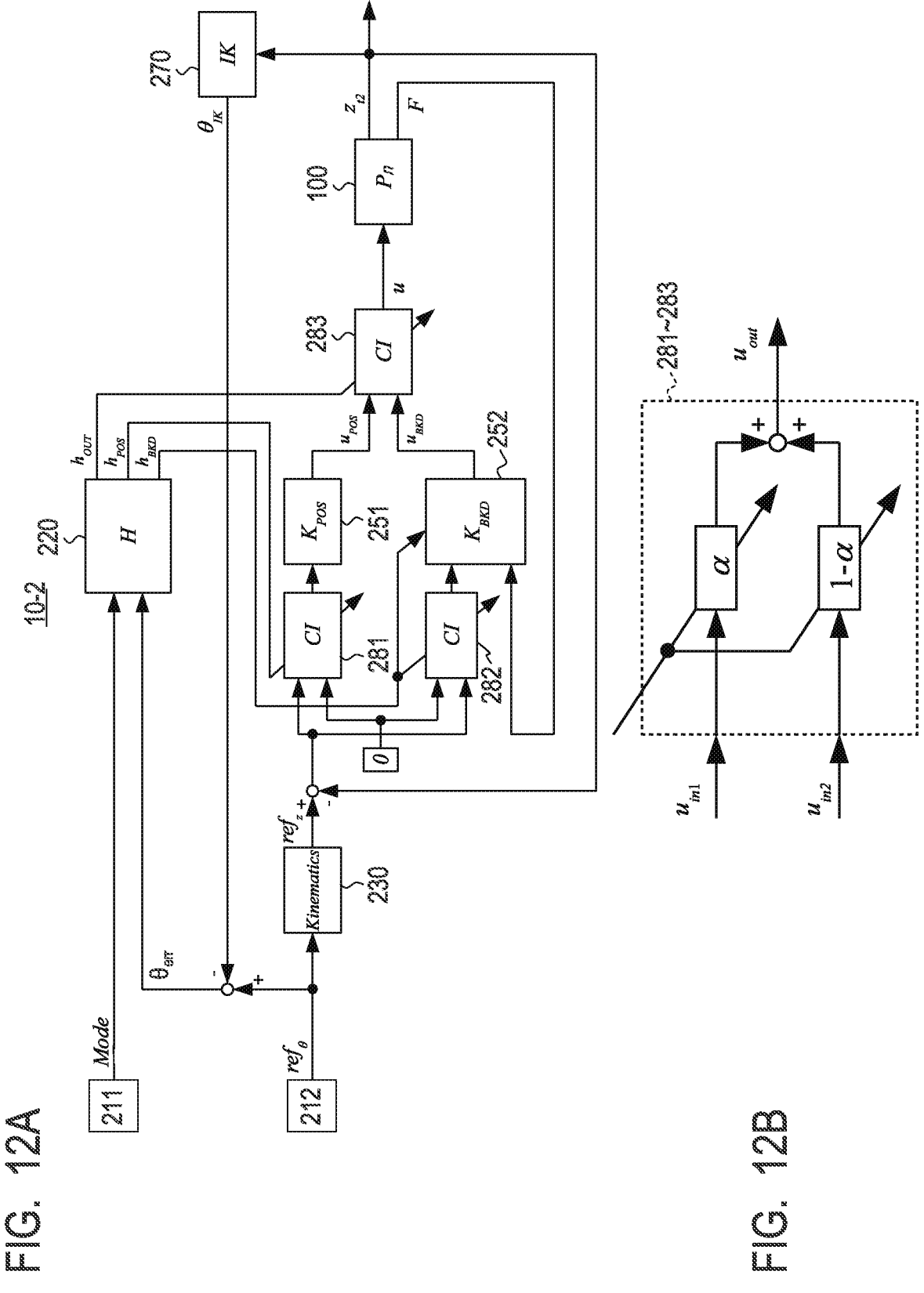
FIG. 12A and FIG. 12B are diagrams for illustrating an example of a schematic configuration of a control system for a continuum robot according to a second embodiment of the present disclosure.

FIG. 12A and FIG. 12B are diagrams for illustrating an example of a schematic configuration of the control system 10 for a continuum robot according to the second embodiment of the present disclosure. The control system 10 for a continuum robot illustrated in FIG. 12A is hereinafter referred to as "control system 10-2 for a continuum robot." In FIG. 12A, the same components as those illustrated in FIG. 1 are denoted by the same reference symbols, and detailed description thereof is omitted.

In the control system 10-2 for a continuum robot illustrated in FIG. 12A, convex interpolation units (CIs) 281 to 283 are used in place of the blocking units 241 and 242 and the selection unit 260 of the control system 10-1 for a continuum robot illustrated in FIG. 1. FIG. 12B is an illustration of an example of an internal configuration of each of the convex interpolation units (CI) 281 to 283 illustrated in FIG. 12A.

As illustrated in FIG. 12B, the convex interpolation units (CI) 281 to 283 are blocks that continuously interpolates two inputs $u_{in1}$ and $u_{in2}$ through use of a parameter $\alpha$ to compute an output $u_{OUT}$. The convex interpolators (CI) 281 to 283 each perform a computation expressed by Equation (35).

$$u_{OUT} = \alpha \cdot u_{in1} + (1-\alpha) \cdot u_{in2} \qquad (35)$$

In this embodiment, at the time of the switching from the low back-drivability drive control unit ($K_{POS}$) 251 to the high back-drivability drive control unit ($K_{BKD}$) 252, the switching control unit (H) 220 causes the parameter $\alpha$ to vary from 1 to 0 in 0.25 second. At the time of this switching, the convex interpolation unit (CI) 283 of FIG. 12A corresponding to the selection unit 260 of FIG. 1 continuously interpolates the output of the low back-drivability drive control unit ($K_{POS}$) 251 and the output of the high back-drivability drive control unit ($K_{BKD}$) 252. That is, the control input of the low back-drivability drive control unit ($K_{POS}$) 251 and the control input of the high back-drivability drive control unit ($K_{BKD}$) 252 are interpolated to perform a continuous transition, thereby being able to suppress a response of sudden back-driving.

Meanwhile, at the time of the switching from the high back-drivability drive control unit ($K_{BKD}$) 252 to the low back-drivability drive control unit ($K_{POS}$) 251, the constraint that the difference $\theta_{err}$ between the bending angles of the curvable portion is equal to or smaller than the threshold value is set in the same manner as in the first embodiment. Thus, the switching control unit (H) 220 may immediately cause the parameter $\alpha$ to vary from 0 to 1.

2.2) Simulation

A simulation is performed in the same manner as in the above-mentioned first embodiment shown in FIG. 10A to FIG. 10E. FIG. 13A to FIG. 13E are graphs for showing response characteristics of the simulation in the second embodiment of the present disclosure. In each of FIG. 13A to FIG. 13E, the response of the control system in the second embodiment (hereinafter abbreviated as "switching control system II") is indicated by the solid line, and as a comparative example, the response of the control system in the first embodiment (hereinafter abbreviated as "switching control system I") is indicated by the broken line.

As in FIG. 13D, the generated force reaches −2 N in about 1.2 seconds, and the switching to the high back-drivability drive control unit ($K_{BKD}$) 252 is performed by the operator through the input unit 211. In this embodiment, the example in which the operator determines whether or not the generated force F has fallen out of ±2 N (predetermined range) is described, but the present disclosure is not limited to this mode. For example, a mode in which the continuum robot ($P_n$) 100 illustrated in FIG. 3C detects the generated force F and the control system 10-2 for a continuum robot generates a mode signal from the input unit 211 based on the result of detecting the generated force F can also be applied to the present disclosure.

In addition, as indicated by the dotted line in FIG. 13D, the initial target value for the force controller ($K_F$) 2523 of the double-loop control system is 0. The switching from the low back-drivability drive control unit ($K_{POS}$) 251 to the high back-drivability drive control unit ($K_{BKD}$) 252 is continuously performed, and hence it is understood that such a peak of the control input that has occurred in the switching control system I is suppressed as shown in FIG. 13E. Further, as shown in FIG. 13B, responsiveness of the back-driving with respect to the disturbance torque of the switching control system II is slightly lower than that of the switching control system I, but as shown in FIG. 13D, the generated force, that is, the load on the wire can be suppressed to a low level. It has been found that the switching control system II described in this embodiment can suppress a rapid response when the low back-drivability drive control unit ($K_{POS}$) 251 and the high back-drivability drive control unit ($K_{BKD}$) 252 are switched in both directions, and can prevent the continuum robot from being damaged.

In the second embodiment as well, in the same manner as in the first embodiment, when there are a plurality of drive control units having different back-drivability as the drive control units for curving the curvable portion, switching therebetween can be appropriately performed with a reduced burden on the operator.

In addition, in the control system 10-2 for a continuum robot according to the second embodiment, the convex interpolation unit (CI) 283 is provided as a component corresponding to the selection unit 260 of FIG. 1. The convex interpolation unit (CI) 283 has a function of continuously interpolating the output of the low back-drivability drive control unit ($K_{POS}$) 251 and the output of the high back-drivability drive control unit ($K_{BKD}$) 252 when the output of the drive control unit to be selected is switched between the output of the low back-drivability drive control unit ($K_{POS}$) 251 and the output of the high back-drivability drive control unit ($K_{BKD}$) 252. According to the convex interpolation unit (CI) 283, a rapid response can be suppressed, and the continuum robot can be prevented from being damaged.

Third Embodiment

Next, a third embodiment of the present disclosure is described. In the following description of the third embodiment, description of matters common to the first and second embodiments described above is omitted, and matters different from those of the first and second embodiments described above are described.

In the first and second embodiments described above, the mode of switching between the low back-drivability drive control unit ($K_{POS}$) 251 and the high back-drivability drive control unit ($K_{BKD}$) 252 while suppressing a rapid response has been described. In the third embodiment, an algorithm for follow-the-leader control that takes into consideration switching of a control system for the continuum robot 100 including a plurality of curvable portions 110 is described.

First, derivation of a kinematic model of the continuum robot 100 including the plurality of curvable portions 110 is described, and then, derivation of the control system is described in detail.

1) Modeling

Figure 14:
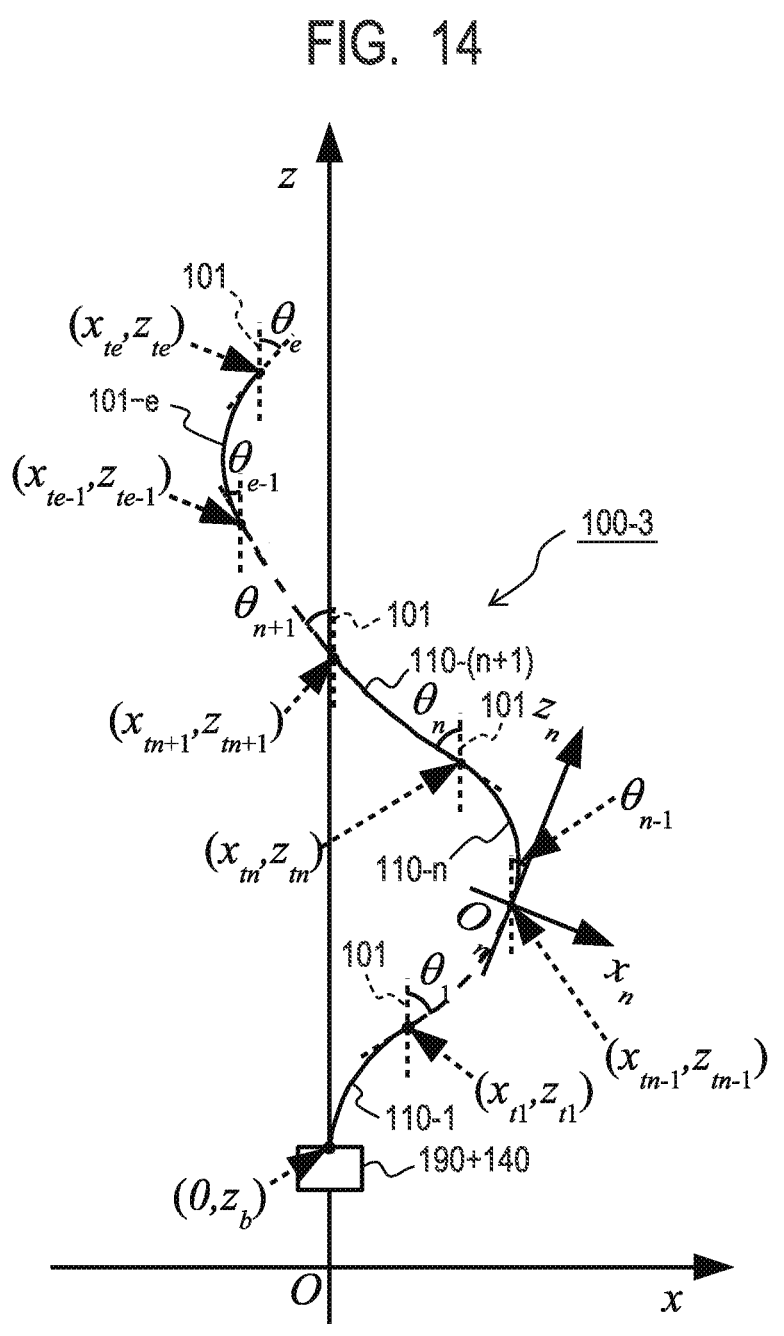

FIG. 14 is a diagram for illustrating an example of a schematic configuration of the continuum robot 100 in the third embodiment of the present disclosure. In FIG. 14, the same components as those illustrated in FIG. 2 are denoted by the same reference symbols, and detailed description thereof is omitted. The continuum robot 100 thus illustrated in FIG. 14 is hereinafter referred to as "continuum robot 100-3."

In this chapter, a kinematics in an x-z plane of the continuum robot 100-3 including a plurality of curvable portions 110-1 to 110-e illustrated in FIG. 14 is derived. Definitions of reference symbols in a dynamic model of the continuum robot 100-3 including the plurality of curvable portions 110-1 to 110-e illustrated in FIG. 14 are described below.

$l_n$: Length of the n-th curvable portion 110-n
$r_n$: Distance from the wire passing through the wire guide of the n-th curvable portion 110-n to a center of the wire guide
e: Number (total number) of curvable portions 110
$\theta_n$: Bending angle of the n-th curvable portion 110-n
$\rho_n$: Curvature radius of the n-th curvable portion 110-n
$\theta_{refn}$: Target bending angle (target value of the bending angle) of the n-th curvable portion 110-n
$l_{pn}$: Drive displacement (drive amount) of the wire of the n-th curvable portion 110-n
$x_{tn}, z_{tn}$: Coordinates of a distal end of the n-th curvable portion 110-n
$z_b$: Displacement of the robot base 140
$l_{nv}$: Virtual length of the n-th curvable portion 110-n to be used for the follow-the-leader control.

Next, the kinematics of the continuum robot 100-3 including the plurality of curvable portions 110-1 to 110-e illustrated in FIG. 14 is derived. First, a relationship between a drive amount $l_{p1}$ of the wire of the first curvable portion 110-1 and the bending angle $\theta_1$ of the first curvable portion 110-1 is expressed by Equation (36).

$$l_{p1} = r_1 \theta_1 \tag{36}$$

Next, a relationship between a drive amount $l_{pn}$ of the wire of the n-th curvable portion 110-n and the bending angle $\theta_n$ of the n-th curvable portion 110-n is derived. However, n is set to a value equal to or larger than 2.

A relative bending angle $\tilde{\theta}_n$ of the n-th curvable portion 110-n is defined as Equation (37).

$$\tilde{\theta}_n = \theta_n - \theta_{n-1} \tag{37}$$

Figure 15:
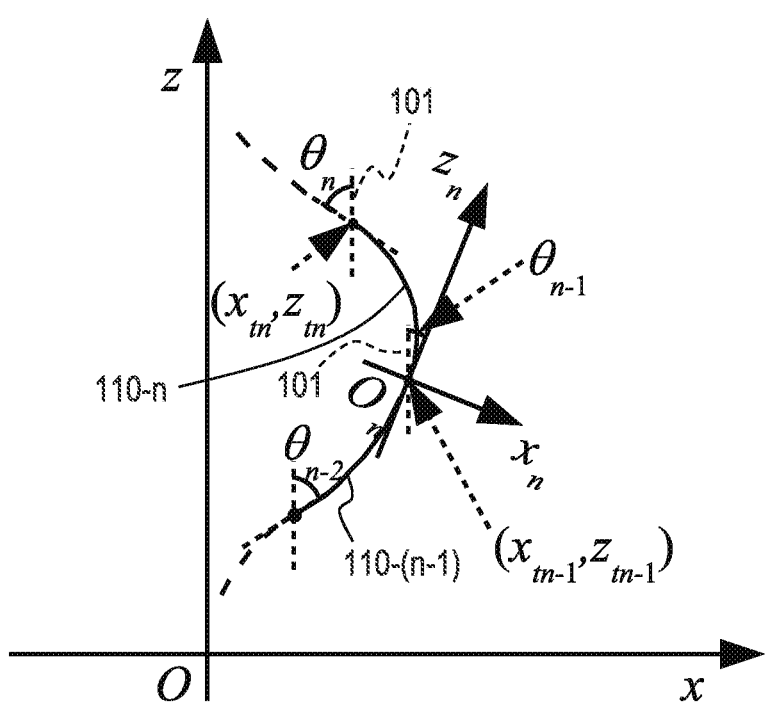
FIG. 15 is a diagram of an extracted part of an n-th curvable portion illustrated in FIG. 14.

FIG. 15 is a diagram of an extracted part of the n-th curvable portion 110-n illustrated in FIG. 14. As illustrated in FIG. 15, an origin O of the n-th curvable portion 110-n is set as $(x_{tn-1}, z_{tn-1})$, and a relative coordinate system $x_n$-$z_n$ formed of a $\theta_{n-1}$ direction and a direction perpendicular thereto is set.

A relationship between the drive displacement (drive amount) $\tilde{l}_{pn}$ of the wire in the relative coordinate system $x_n$-$z_n$ and the bending angle $\tilde{\theta}_n$ of the n-th curvable portion 110-n is expressed by Equation (38).

$$\tilde{l}_{pn} = r_n \tilde{\theta}_n \tag{38}$$

The drive displacement (drive amount) $l_{pn}$ of the wire of the n-th curvable portion 110-n is a total sum of displacements of the wire for driving the n-th curvable portion 110-n in the relative coordinate system from the first curvable portion 110-1 to the (n−1)th curvable portion 110-(n-1), and is expressed by Equation (39).

$$l_{pn} = r_n(\tilde{\theta}_n + \tilde{\theta}_{n-1} + \ldots + \theta_1) = r_n \theta_n \tag{39}$$

It is understood from the above that the bending angle $\theta_n$ of the n-th curvable portion 110-n is determined only by the drive displacement $1_{pn}$ of the wire, and is independent of the bending angle of the curvable portion 110 at some midpoint.

Next, a finite element model for simulating a contact with a path is derived. The continuum robot is divided into "m" elements, and is simplified into a one-dimensional spring system to be modeled. When an overall stiffness matrix is set as KFE and a nodal force vector and a nodal displacement vector are set as f and δ and are considered to correspond to a disturbance torque and an angular displacement, respectively, a stiffness equation of the entire system is expressed by Equation (40).

$$f = K_{FE}\delta \qquad (40)$$

Here, a bending stiffness of an i-th element of the continuum robot is set as $k_i$, and a stiffness matrix $K_i$ of the element is expressed by Equation (41).

$$\begin{bmatrix} k_i & -k_i \\ -k_i & k_i \end{bmatrix} \quad (i = 1, \ldots, m) \qquad (41)$$

In this embodiment, an element of the finite element model that corresponds to a most distal end of the curvable portion 110 is 1) considered as a constrained node when the low back-drivability drive control unit ($K_{POS}$) 251 is selected, and 2) considered as an unconstrained node when the high back-drivability drive control unit ($K_{BKD}$) 252 is selected. When the low back-drivability drive control unit ($K_{POS}$) 251 is selected, the target bending angle is given as a constrained displacement $\delta_B$. The stiffness matrix is rearranged into Equation (42).

$$\begin{bmatrix} f_A \\ f_B \end{bmatrix} = \begin{bmatrix} K_{AA} & K_{AB} \\ K_{BA} & K_{BB} \end{bmatrix} \begin{bmatrix} \delta_A \\ \delta_B \end{bmatrix} \qquad (42)$$

Then, a shape at a time of contact is simulated by obtaining, by a penalty method, an external force exerted on the continuum robot from the path and performing convergence calculation for repeatedly updating a nodal force vector $f_A$ and a nodal displacement vector $\delta_A$.

2) Control System Design 2.1) Follow-the-leader Control

Figure 16:
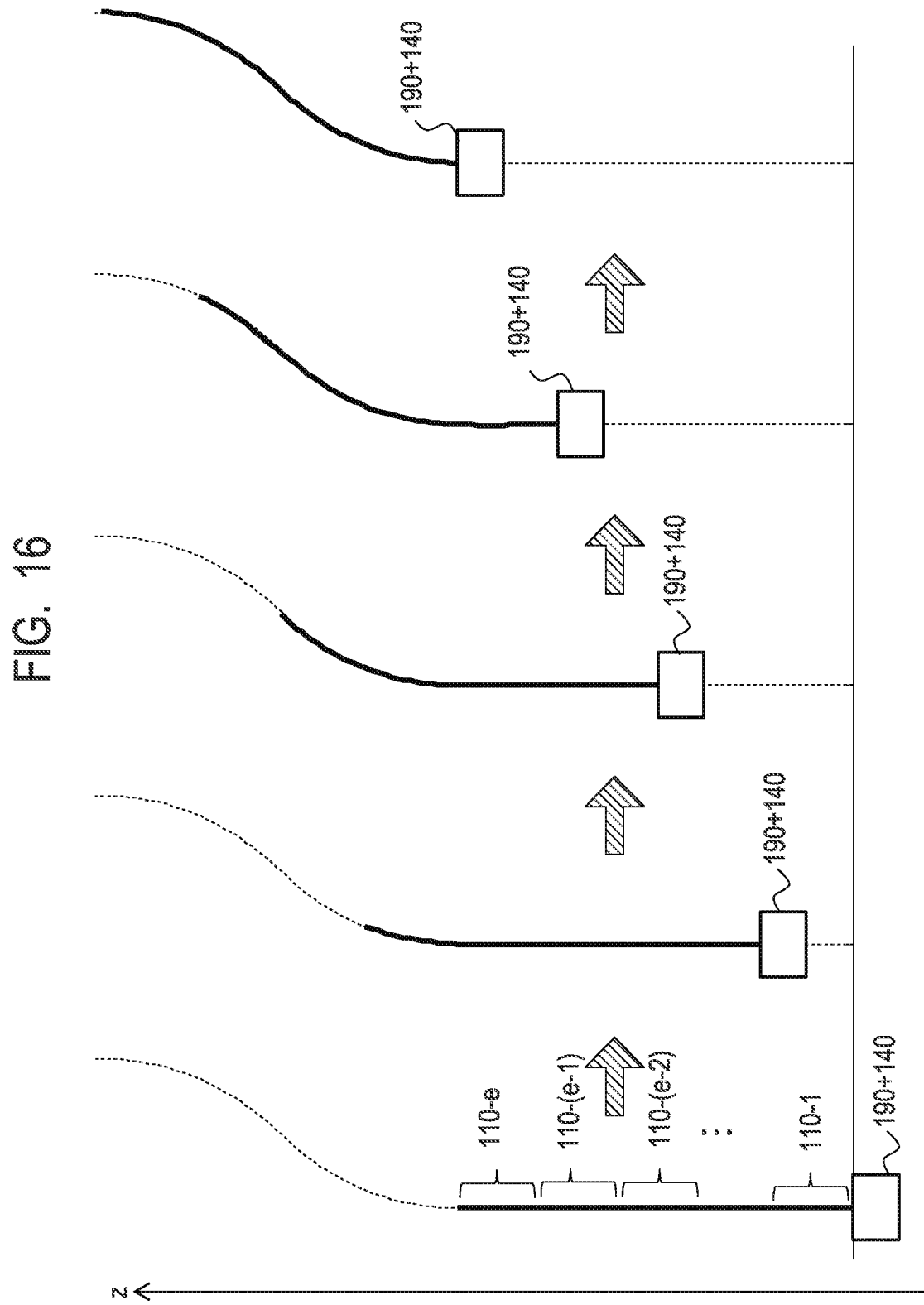
FIG. 16 is a diagram for illustrating follow-the-leader control for the continuum robot illustrated in FIG. 14.

FIG. 16 is a diagram for illustrating follow-the-leader control for the continuum robot 100-3 illustrated in FIG. 14. In FIG. 16, a state in which the continuum robot 100-3 is advanced toward a +z direction is illustrated. Further, in FIG. 16, as the plurality of curvable portions 110, the first curvable portion 110-1, . . . , an (e−2)th curvable portion 110-(e-2), an (e−1)th curvable portion 110-(e-1), and an e-th curvable portion 110-e are illustrated.

Here, the follow-the-leader control refers to a method of performing control so that the follower curvable portion located between the robot base 140 and the e-th curvable portion 110-e passes through the same path as a path through which the e-th curvable portion 110-e at the most distal end (distal curvable portion) passes as illustrated in FIG. 16. This enables the continuum robot 100-3 to be advanced so as to slip out through a narrow space. The follow-the-leader control does not require the path to be determined in advance, and it suffices that, for example, the bending angle of the e-th curvable portion 110-e at the most distal end is continuously propagated to the follower curvable portion with the length of the curvable portion. Through use of this method, the operator can give a command only for the bending angle of the curvable portion at the most distal end and a travel amount of the robot base 140 through, for example, a joystick, thereby enabling the continuum robot 100-3 to be controlled in a follow-the-leader manner in real time.

Figure 17:
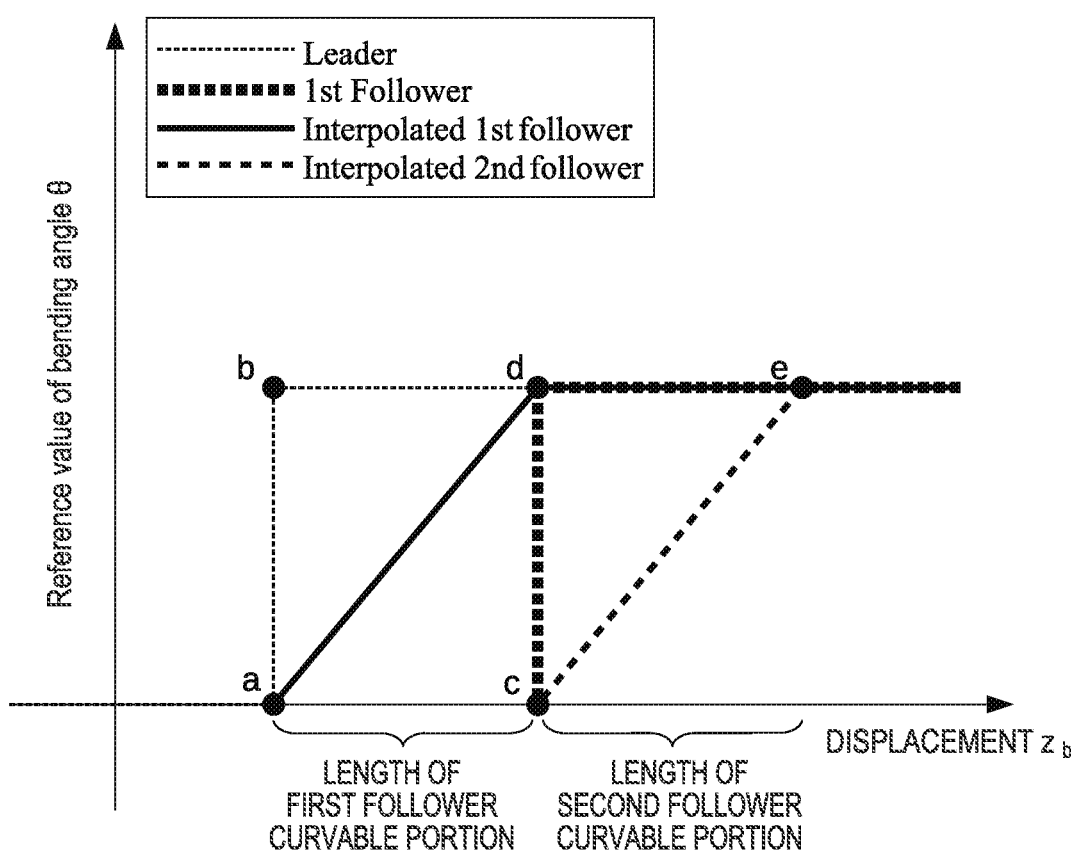
FIG. 17 is a graph for showing an example of the follow-the-leader control for the continuum robot illustrated in FIG. 16.

FIG. 17 is a graph for showing an example of the follow-the-leader control for the continuum robot 100-3 illustrated in FIG. 16. In the graph of the follow-the-leader control shown in FIG. 17, the horizontal axis represents the displacement $z_b$ of the robot base 140, and the vertical axis represents the bending angle θ. In FIG. 17, "Leader" indicates the most distal curvable portion 110-e illustrated in FIG. 16. Further, in FIG. 17, "1st follower" indicates a first follower curvable portion 110-(e-1) illustrated in FIG. 16, and "2nd follower" indicates a second follower curvable portion 110-(e-2) illustrated in FIG. 16.

In FIG. 17, a bending angle command issued to the most distal curvable portion 110-e by the operator is indicated by the dotted line, and a bending angle command issued to the first follower curvable portion 110-(e-1) is indicated by the thick broken line. When a bending angle command ab is given by the operator at a displacement "a" of the robot base 140, the bending angle of the first follower curvable portion 110-(e-1) may be automatically generated so as to become cd at a displacement "c" of the robot base 140. Here, the displacement "c" of the robot base 140 is determined so that a distance ac becomes the length "l" of the first follower curvable portion 110-(e-1), but may be set to be shorter than the actual length. Then, the bending angle command for the first follower curvable portion 110-(e-1) is stored in a storage unit of a control computing device included in the control system 10 for a continuum robot, and is extracted in accordance with the displacement of the robot base 140. However, in this command value, when the displacement of the robot base 140 falls between "a" and "c", the bending angle of the first follower curvable portion 110-(e-1) does not change, and a bending angle command for a succeeding curvable portion rises at the displacement "c" of the robot base 140, and hence the continuum robot exhibits a rapid behavior. In view of this, in this embodiment, a bending angle command for the first follower curvable portion 110-(e-1) is interpolated so as to connect the point "a" and the point "d". The interpolated target bending angle of the first follower curvable portion 110-(e-1) is indicated by the solid line in FIG. 17. In a case in which the number of follower curvable portions is 2 or more, when this processing is continuously performed while the first follower curvable portion 110-(e-1) in the above description is replaced by the most distal curvable portion 110-e, it is possible to obtain bending angle command values for all the curvable portions 110. As an example, in FIG. 17, a bending angle command for the second follower curvable portion 110-(e-2) is indicated by the thin broken line.

2.2) Block Diagram of Control System

In this embodiment, a control system that switches between the low back-drivability drive control unit ($K_{POS}$) 251 and the high back-drivability drive control unit ($K_{BKD}$) 252 during the above-mentioned follow-the-leader control is designed. In this embodiment as well, in the same manner as in the first embodiment, the switching from the low back-drivability drive control unit ($K_{POS}$) 251 to the high back-drivability drive control unit ($K_{BKD}$) 252 can be performed at discretion by inputting the mode signal from the input unit 211. In this embodiment as well, in the same manner as in the first embodiment, the switching from the high back-drivability drive control unit ($K_{BKD}$) 252 to the low back-drivability drive control unit ($K_{POS}$) 251 is performed under the constraint that the difference $\theta_{err}$ between the bending angles of the curvable portion is equal to or smaller than the threshold value.

Figure 18:
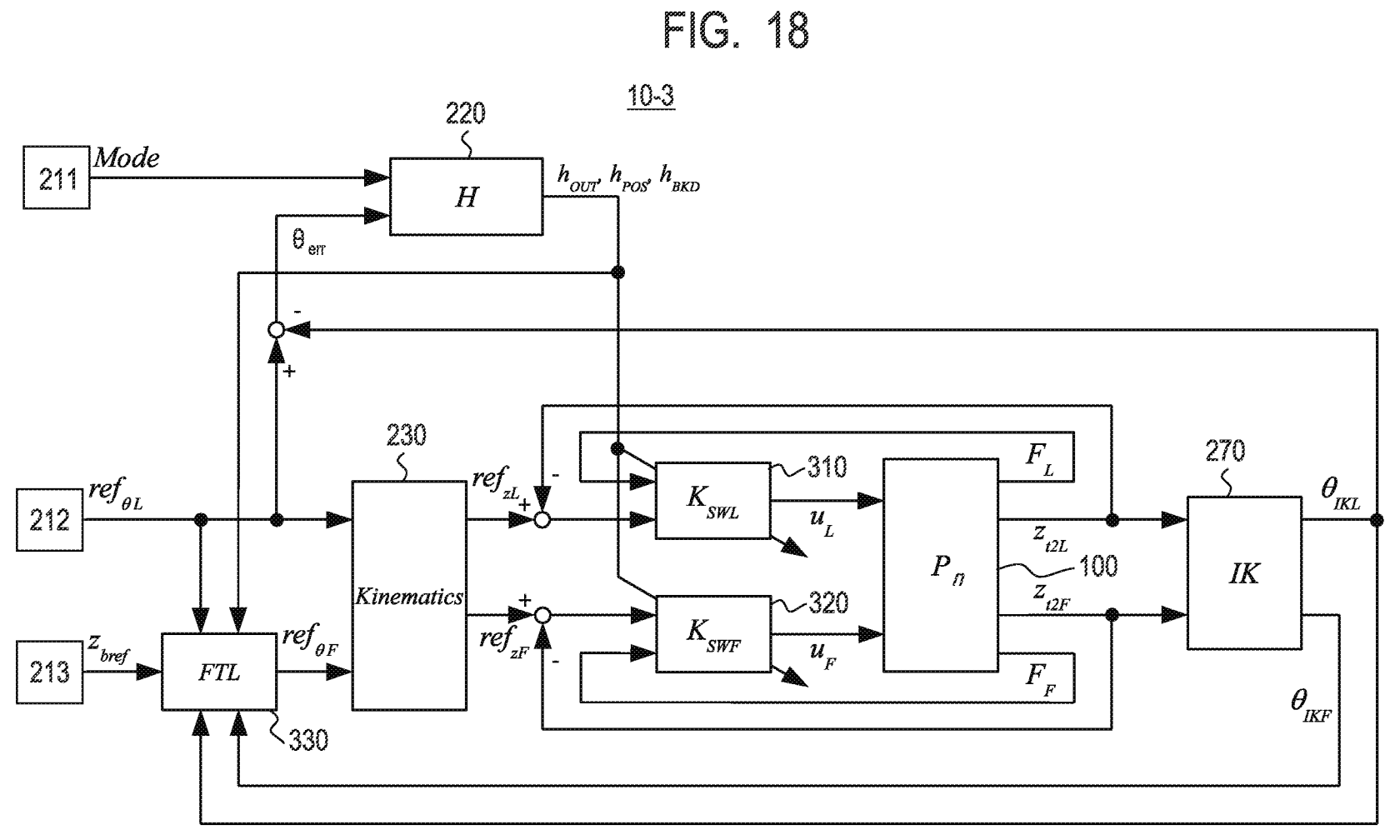

FIG. 18 is a diagram for illustrating an example of a schematic configuration of the control system 10 for a continuum robot according to the third embodiment of the present disclosure. The control system 10 for a continuum robot illustrated in FIG. 18 is hereinafter referred to as "control system 10-3 for a continuum robot." In FIG. 18, the same components as those illustrated in FIG. 1, FIG. 12A, and FIG. 12B are denoted by the same reference symbols, and detailed description thereof is omitted.

The control system 10-3 for a continuum robot includes, as the same components as those of FIG. 1, the continuum robot ($P_n$) 100, the input units 211 and 212, the switching control unit (H) 220, the kinematics computing unit (Kinematics) 230, and the inverse kinematics computing unit (IK) 270. It is assumed here that the continuum robot ($P_n$) 100 illustrated in FIG. 18 is the continuum robot 100-3 including the plurality of curvable portions 110 illustrated in FIG. 14. In addition, the control system 10-3 for a continuum robot includes an input unit 213, a most distal drive control mechanism ($K_{SWL}$) 310, a follow-up drive control mechanism ($K_{SWF}$) 320, and a follow-up control unit (FTL) 330.

In the same manner as in the first embodiment, the input unit 211 inputs the mode signal indicating the drive control unit to be selected to the switching control unit (H) 220. The input unit 212 inputs the target command value $\text{ref}_{\theta L}$ of the bending angle of the most distal curvable portion with respect to the reference axis 101 to the kinematics computing unit (Kinematics) 230, the follow-up control unit (FTL) 330, and the like. The input unit 213 inputs a target displacement $z_{bref}$ of the robot base 140 to the follow-up control unit (FTL) 330.

The most distal drive control mechanism ($K_{SWL}$) 310 includes the blocking units 241 and 242, the low back-drivability drive control unit ($K_{POS}$) 251, the high back-drivability drive control unit ($K_{BKD}$) 252, and the selection unit 260 that are illustrated in FIG. 1. The most distal drive control mechanism ($K_{SWL}$) 310 is a component unit that controls drive of the most distal curvable portion 110-*e*.

The follow-up drive control mechanism ($K_{SWF}$) 320 includes the blocking units 241 and 242, the low back-drivability drive control unit ($K_{POS}$) 251, the high back-drivability drive control unit ($K_{BKD}$) 252, and the selection unit 260 that are illustrated in FIG. 1. The follow-up drive control mechanism ($K_{SWF}$) 320 is a component unit that controls drive of the follower curvable portion 110 (for example, follower curvable portion 110-(*e*-1))

The follow-up control unit (FTL) 330 is a component unit that performs the follow-the-leader control described in the previous section. The follow-up control unit (FTL) 330 generates a target command value $\text{ref}_{\theta F}$ of the bending angle of the follower curvable portion from the target command value $\text{ref}_{\theta L}$ of the bending angle of the most distal curvable portion and the target displacement $z_{bref}$ of the robot base 140. In addition, the follow-up control unit (FTL) 330 receives input of the signals $h_{POS}$ and $h_{BKD}$ from the switching control unit (H) 220 and the bending angles $\theta_{IK}$ of the most distal curvable portion and the follower curvable portion that are described later, but a detailed operation thereof is described in the next section. Further, the kinematics computing unit (Kinematics) 230 uses Equation (43) to output target displacements $\text{ref}_{zL}$ and $\text{ref}_{zF}$ f the wire gripping mechanisms of the most distal curvable portion and the follower curvable portion from the target command values $\text{ref}_{\theta L}$ and $\text{ref}_{\theta F}$ of the bending angles of the most distal curvable portion and the follower curvable portion.

$$\text{ref}_{zL} = r_L \cdot \text{ref}_{\theta L}$$

$$\text{ref}_{zF} = r_F \cdot \text{ref}_{\theta F} \tag{43}$$

The inverse kinematics computing unit (IK) 270 uses Equation (44) and Equation (45) to output the bending angles $\theta_{IKL}$ and $\theta_{IKF}$ of the most distal curvable portion and the follower curvable portion from displacements $z_{t2L}$ and $z_{t2F}$ of the wire gripping mechanisms of the most distal curvable portion and the follower curvable portion, respectively.

$$\theta_{IKL} = \frac{z_{t2L}}{r_L} \tag{44}$$

$$\theta_{IKF} = \frac{z_{t2F}}{r_F} \tag{45}$$

In this embodiment, the difference $\theta_{err}$ between the target command value $\text{ref}_{\theta L}$ of the bending angle of the most distal curvable portion and the bending angle $\theta_{IKL}$ of the most distal curvable portion, which is expressed by Equation (46), is input to the switching control unit (H) 220.

$$\theta_{err} = \text{ref}_{\theta L} - \theta_{IKL} \tag{46}$$

In the same manner as in the first embodiment, in the switching from the high back-drivability drive control unit ($K_{BKD}$) 252 to the low back-drivability drive control unit ($K_{POS}$) 251, the switching control unit (H) 220 switches the control system based on the signal $h_{OUT}$, the signal $h_{POS}$, and the signal $h_{BKD}$ when the difference $\theta_{err}$ between the bending angles of the most distal curvable portion is equal to or smaller than the threshold value. Meanwhile, in the switching from the low back-drivability drive control unit ($K_{POS}$) 251 to the high back-drivability drive control unit ($K_{BKD}$) 252, the switching control unit (H) 220 switches the control system irrespective of the value of the difference $\theta_{err}$ between the bending angles of the most distal curvable portion.

In FIG. 18, the follower curvable portion is representatively indicated by the subscript "F". When there are a plurality of follower curvable portions, the same block structures may be arranged in parallel.

2.3) Follow-the-leader Control Involving Switching of Back-drivability

Figure 19A:
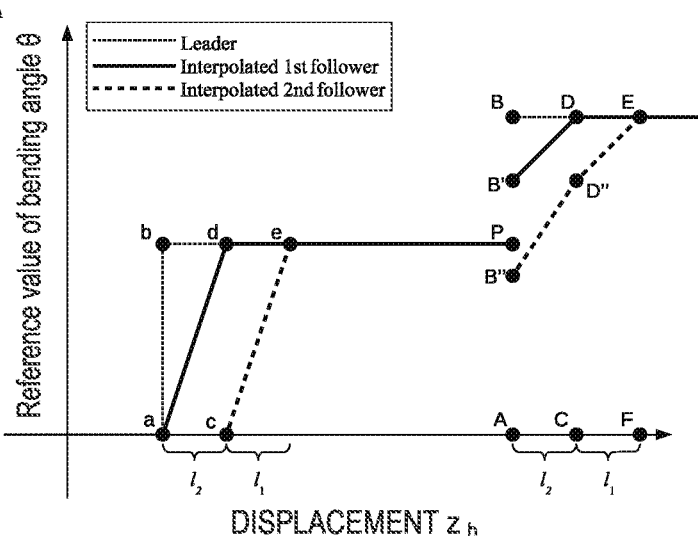
FIG. 19A, FIG. 19B, and FIG. 19C are graphs for showing the third embodiment of the present disclosure and showing an example of the follow-the-leader control for the continuum robot illustrated in FIG. 16.
Figure 19B:
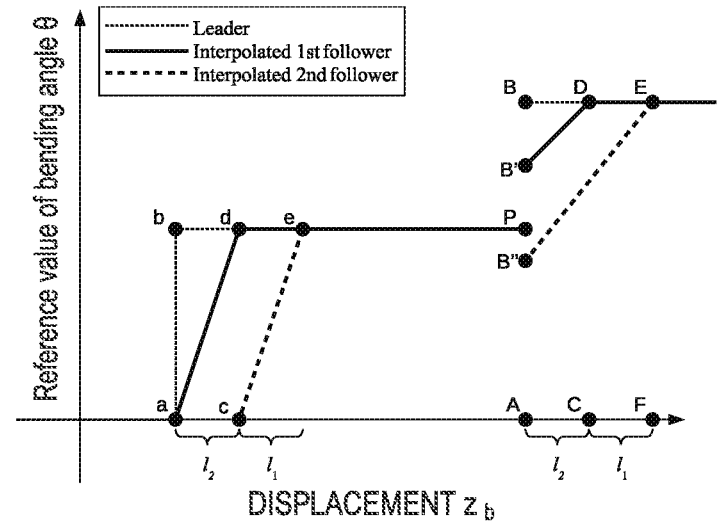
Figure 19C:
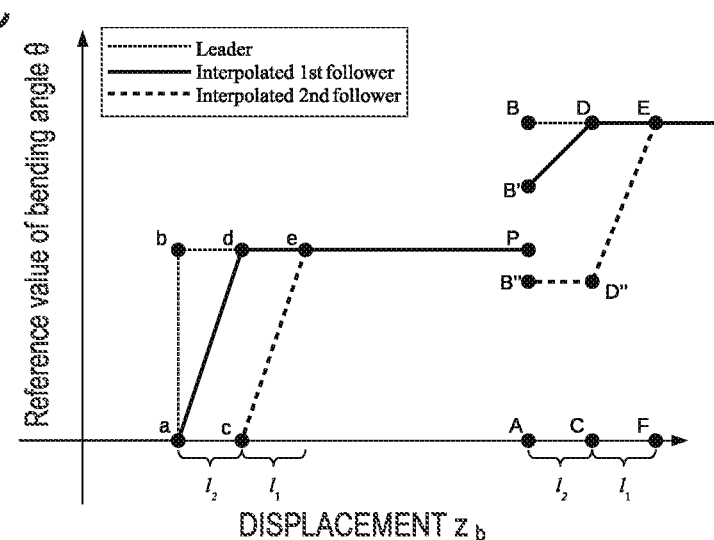

FIG. 19A to FIG. 19C are graphs for showing the third embodiment of the present disclosure and showing an example of the follow-the-leader control of the continuum robot 100-3 illustrated in FIG. 16. Specifically, FIG. 19A to FIG. 19C are graphs for showing three algorithms for the follow-up control unit (FTL) 330 corresponding to the switching of the back-drivability during the follow-the-leader control. In the graphs of the follow-the-leader control shown in FIG. 19A to FIG. 19C, in the same manner as described above with reference to FIG. 17, the horizontal axis represents the displacement $z_b$ of the robot base 140, and the vertical axis represents the bending angle $\theta$. Further, also in FIG. 19A to FIG. 19C, in the same manner as described above with reference to FIG. 17, "Leader" indicates the most distal curvable portion 110-*e* illustrated in FIG. 16. Further, in FIG. 19A to FIG. 19C, "1st follower" indicates the first follower curvable portion 110-(*e*-1) illustrated in FIG. 16, and "2nd follower" indicates the second follower curvable portion 110-(*e*-2) illustrated in FIG. 16. In other words, in each of FIG. 19A to FIG. 19C, the bending angle command issued to the most distal curvable portion 110-$e$ by the operator is indicated by the dotted line, and the bending angle commands issued by the first follower curvable portion 110-($e$-1) and the second follower curvable portion 110-($e$-2) are indicated by the solid line and the broken line, respectively. Further, in each of FIG. 19A to FIG. 19C, $1_2$ represents the length of the first follower curvable portion 110-($e$-1), and 11 represents the length of the second follower curvable portion 110-($e$-2).

FIG. 19A shows a state in which, when the control system is switched to the high back-drivability drive control unit ($K_{BKD}$) 252 at a displacement A of the robot base 140, the bending angles of the most distal curvable portion and the first and second follower curvable portions are back-driven toward AB, AB', and AB", respectively. In this case, it suffices that the bending angle of the first follower curvable portion 110-($e$-1) is automatically generated so as to become CD at a displacement C of the robot base 140. Here, the displacement C of the robot base 140 is determined so that a distance AC becomes the length $1_2$ of the first follower curvable portion 110-($e$-1). Now, three algorithms are conceivable for the bending angle of the second follower curvable portion 110-($e$-2).

First, in the first algorithm shown in FIG. 19A, it suffices that the bending angle of the second follower curvable portion 110-($e$-2) is automatically generated so as to become CD" at the displacement C of the robot base 140. Here, the bending angle CD" is the same as the bending angle AB', indicating that the bending angle CD" follows the bending angle of the curvable portion that is one place ahead. It suffices that the bending angle is then automatically generated so as to become FE at a displacement F of the robot base 140. Here, the displacement F of the robot base 140 is determined so that the distance CF becomes the length 11 of the second follower curvable portion 110-($e$-2). In addition, the bending angle FE is the same as the bending angle AB, indicating that the bending angle FE follows the bending angle of the most distal curvable portion through the bending angle of the curvable portion that is one place ahead.

Subsequently, in the second algorithm shown in FIG. 19B, it suffices that the bending angle of the second follower curvable portion 110-($e$-2) is automatically generated so as to become FE at the displacement F of the robot base 140. The bending angle FE is the same as the bending angle AB, indicating that the bending angle FE directly follows the bending angle of the most distal curvable portion.

Subsequently, in the third algorithm shown in FIG. 19C, it suffices that the bending angle of the second follower curvable portion 110-($e$-2) is automatically generated so as to become CD" at the displacement C of the robot base 140. Here, the bending angle CD" is the same as the bending angle AB", indicating that the bending angle of the second follower curvable portion 110-($e$-2) is not to be changed while the robot base 140 is advanced along the length $1_2$ of the curvable portion that is one place ahead. It suffices that the bending angle is then automatically generated so as to become the bending angle FE at the displacement F of the robot base 140.

In this section, the description has been made through use of the actual length $1_n$ of the curvable portion, but the virtual length $1_{nv}$ that is shorter than the actual length of the curvable portion may be used.

3) Simulation

A simulation is performed through use of the control system designed in the previous chapter and the finite element model derived by Equation (42). The second follower curvable portion 110-($e$-2) uses the first algorithm for the follow-the-leader control shown in FIG. 19A to obtain the bending angle. Here, the number of curvable portions 110 of the continuum robot 100-3 is set to 3, and a length $1_3$ of the most distal curvable portion and the length $1_2$ and the length $1_1$ of the first and second follower curvable portions are expressed by Equation (47), respectively.

$$1_3=0.021, 1_2=0.02, 1_1=0.159 \qquad (47)$$

In addition, the second follower curvable portion at 0.02 m from the distal end thereof is set to be as stiff as the most distal curvable portion and the first follower curvable portion. In view of this, the length used for the second follower curvable portion in the first algorithm shown in FIG. 19A is set to a length $1_{1v}$ expressed by Equation (48), which is shorter than the actual length.

$$1_{1v}=0.02 \qquad (48)$$

FIG. 20A to FIG. 20F are diagrams for showing the response characteristics of a simulation in the third embodiment of the present disclosure. Specifically, in each of FIG. 20A to FIG. 20F, a shape of the continuum robot 100-3 exhibited in accordance with the advancing of the robot base 140 is indicated by the thick solid line, and side walls of a path are indicated by the thin solid lines.

Figures 20A, 20B, 20C, 20D, 20E, 20F:
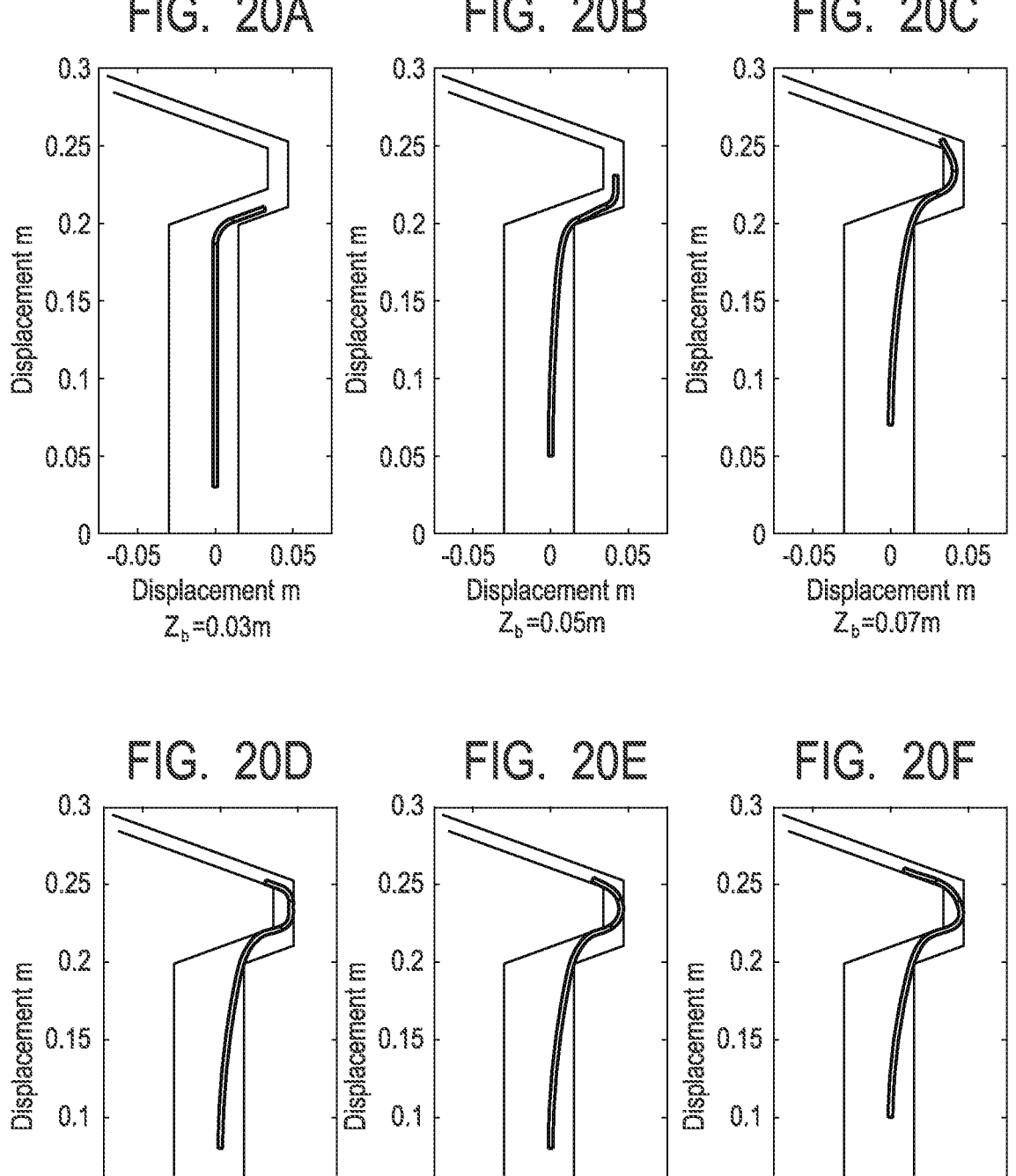
FIG. 20A, FIG. 20B, FIG. 20C, FIG. 20D, FIG. 20E, and FIG. 20F are graphs for showing response characteristics of a simulation in the third embodiment of the present disclosure.

In FIG. 20A, the operator has issued a command to the most distal curvable portion for the bending angle thereof, and the bending angle of the first follower curvable portion has been generated and controlled by the follow-up control unit (FTL) 330.

In FIG. 20B, the operator has returned the bending angle of the most distal curvable portion to 0 degrees to cause the most distal curvable portion to follow the path. The bending angle of the second follower curvable portion has been generated by the follow-up control unit (FTL) 330 subsequently to that of the first follower curvable portion, each of the follower curvable portions following the bending angle of the distal curvable portion that is one place ahead.

In FIG. 20C, the operator has started an action command for changing the bending angle of the most distal curvable portion so as to direct the most distal curvable portion toward a left side in a traveling direction.

In FIG. 20D, the operator has manipulated the bending angle of the most distal curvable portion to cause the most distal curvable portion to follow the path with the first and second follower curvable portions each following the bending angle of the further distal curvable portion. However, it is understood that, due to the bending angle of the first follower curvable portion being 0 degrees, the first follower curvable portion has been pressed against the side wall on the right side, thereby adversely causing large-curvature deformation on a base-end side of the curvable portion. This imposes a large load on a structure of the continuum robot 100-3, and hence the operator switches the control system to the high back-drivability drive control unit ($K_{BKD}$) 252.

FIG. 20E shows the shape exhibited through the switching to the high back-drivability drive control unit ($K_{BKD}$) 252. It is understood that the first follower curvable portion has a curvature becoming almost constant over an entire section thereof. This reduces the load imposed on the structure of the continuum robot 100-3. After that, when the operator performs switching to the low back-drivability drive control unit ($K_{POS}$) 251 again, the follow-the-leader control can be resumed with the shape due to the back-driving being set as an initial attitude.

FIG. 20F shows the shape exhibited when the follow-the-leader control has been resumed. The first and second follower curvable portions each follow the further distal curvable portion.

Figure 21A:
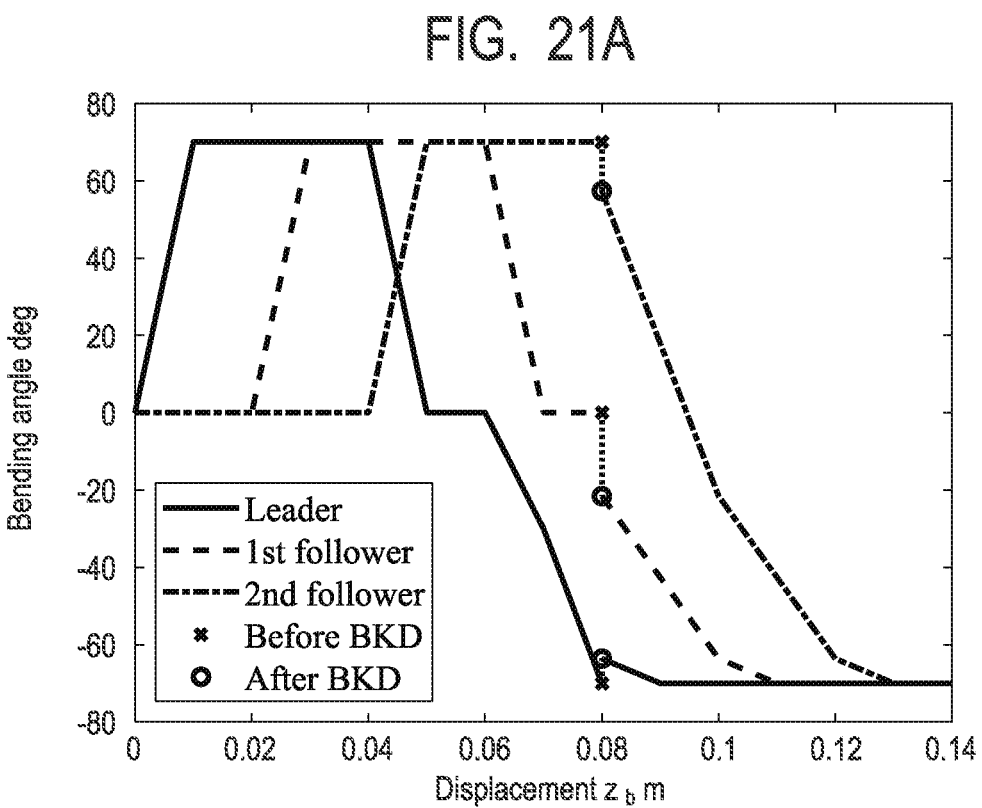
FIG. 21A and FIG. 21B are graphs for showing response characteristics of the simulation in the third embodiment of the present disclosure.
Figure 21B:
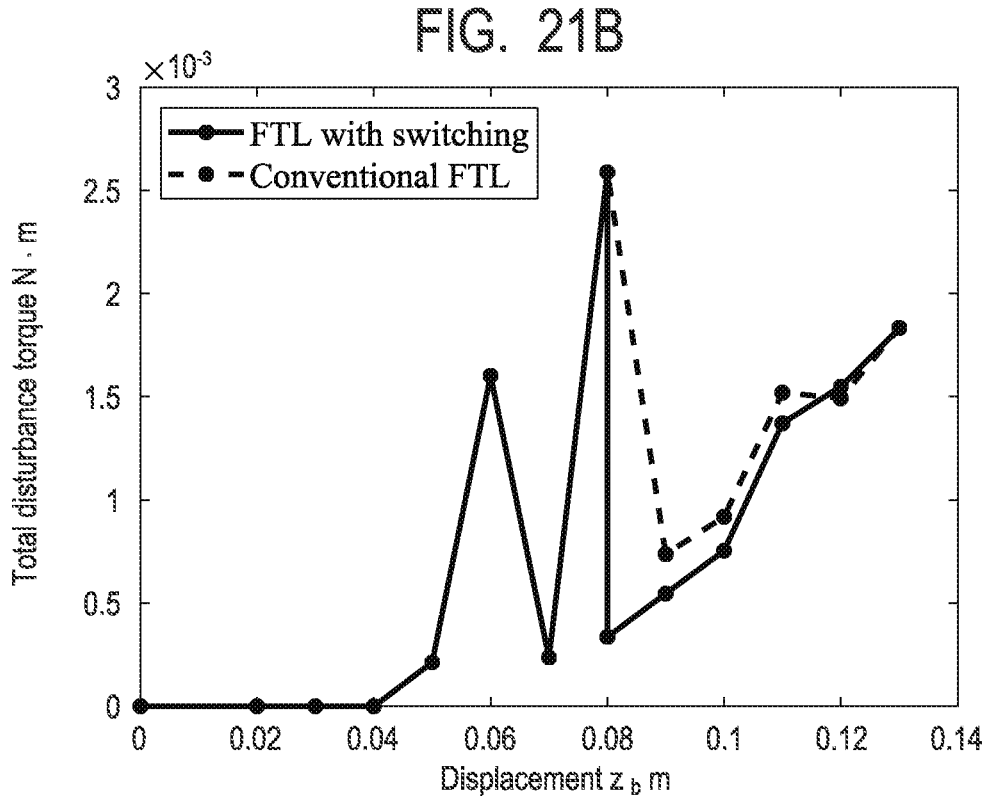

FIG. 21A and FIG. 21B are graphs for showing the response characteristics of the simulation in the third embodiment of the present disclosure. Specifically, in FIG. 21A, the horizontal axis represents the position of the robot base 140, and the bending angle of each curvable portion in the follow-the-leader control is shown. Meanwhile, in FIG. 21B, the horizontal axis represents the position of the robot base 140, and a response of a root mean square of each nodal force vector is shown. Here, the root mean square of the nodal force vector corresponds to a disturbance torque applied from the side wall.

In FIG. 21A, the bending angles of the most distal curvable portion and the first and second follower curvable portions are indicated by the solid line, the broken line, and the one-dot chain line, respectively. At a start of the control, the follow-the-leader control using the low back-drivability drive control unit ($K_{POS}$) 251 is performed. When the control system is switched to the high back-drivability drive control unit ($K_{BKD}$) 252 at a displacement $z_b$ of 0.08 m of the robot base 140, each curvable portion is back-driven to change to a curve shape that is difficult to receive an external force from the side wall. In particular, it is understood that the bending angle of the first follower curvable portion greatly changes from 0 degrees to –22 degrees. Then, the switching is performed to the low back-drivability drive control unit ($K_{POS}$) 251 again, and the bending angle of the most distal curvable portion is manipulated to –70 degrees by the operator. It is understood that the first and second follower curvable portions follow the bending angles of the further distal curvable portions over the length $l_2$ and the length $l_{1v}$, respectively.

In FIG. 21B, a response of the nodal force vector due to the follow-the-leader control involving the switching of the control system described in this embodiment is indicated by the solid line, and as a comparative example, a response due to the follow-the-leader control using only the low back-drivability drive control unit ($K_{POS}$) 251 is indicated by the broken line. In the case of this embodiment, it is understood that the disturbance torque is greatly reduced when the control system is switched to the high back-drivability drive control unit ($K_{BKD}$) 252 at the displacement $z_b$ of 0.08 m of the robot base 140 and the shape of the continuum robot 100-3 follows the path. It is understood that, when the switching is performed to the low back-drivability drive control unit ($K_{POS}$) 251 again and the traveling of the robot base 140 is resumed, at a displacement $z_b$ of 0.12 m of the robot base 140, the disturbance torque caused by the follow-the-leader control using only the low back-drivability drive control unit ($K_{POS}$) 251 given as the comparative example is slightly exceeded, but as a whole, the follow-the-leader control is continued while the disturbance torque is suppressed.

In the third embodiment as well, in the same manner as in the first embodiment, when there are a plurality of drive control units having different back-drivability as the drive control units for curving the curvable portion, switching therebetween can be appropriately performed with a reduced burden on the operator.

In addition, in the control system 10-3 for a continuum robot according to the third embodiment, the most distal curvable portion and each of the follower curvable portions are provided with the drive control mechanisms (most distal drive control mechanism ($K_{SWL}$) 310 and follow-up drive control mechanism ($K_{SWF}$) 320) each including the low back-drivability drive control unit ($K_{POS}$) 251 and the high back-drivability drive control unit ($K_{BKD}$) 252. Further, the follow-up control unit (FTL) 330 outputs the bending angle $ref_{\theta F}$ of the follower curvable portion to the kinematics computing unit (Kinematics) 230 based on the bending angle $ref_{\theta L}$ of the distal curvable portion input to the kinematics computing unit (Kinematics) 230 and the displacement $z_b$ of the robot base 140 input from the input unit 213. According to such a configuration, it is possible to achieve the follow-the-leader control involving the switching of the back-drivability.

Fourth Embodiment

Next, a fourth embodiment of the present disclosure is described. In the following description of the fourth embodiment, description of matters common to the first to third embodiments described above is omitted, and matters different from those of the first to third embodiments described above are described.

In the above-mentioned third embodiment, the control system that switches between the low back-drivability drive control unit ($K_{POS}$) 251 and the high back-drivability drive control unit ($K_{BKD}$) 252 during the follow-the-leader control has been designed, and the algorithms for the follow-up control unit (FTL) 330 have been described. In that case, the third embodiment has been directed to the control over the advancing of the robot base 140. At a time of the advancing in the follow-the-leader control, it suffices that the most distal curvable portion is given the target bending angle by the operator and each follower curvable portion is given the bending angle of the further distal curvable portion that is propagated to each curvable portion. Here, the target bending angles of all the curvable portions including the most distal curvable portion at the displacements of the robot base 140 at the time of the advancing can be stored in a storage unit of the follow-up control unit (FTL) 330. Through use thereof, when the robot base 140 is reversed, the continuum robot can be reversed along the path by reading out the target bending angle of each curvable portion of the robot base 140 relative to the displacement of the robot base 140 from the storage unit without the operator giving a curve command. In view of this, in this embodiment, an algorithm for the follow-up control unit (FTL) 330 that takes into consideration the reversing of the robot base 140 when the control system is switched at the time of the advancing of the robot base 140 is described.

Figure 22A:
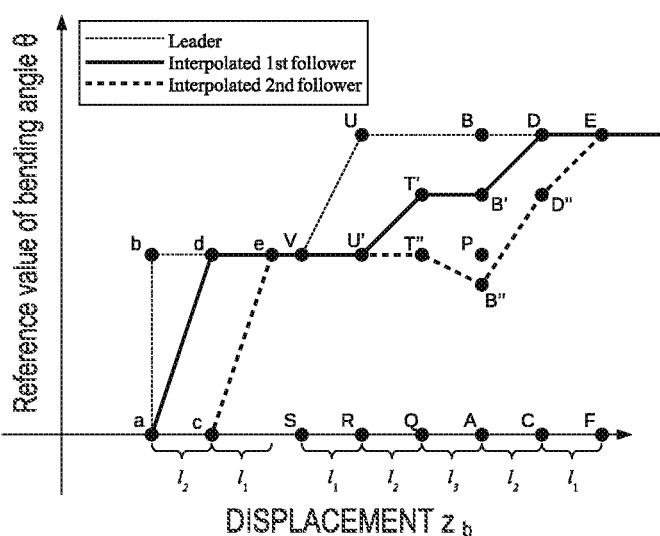
FIG. 22A, FIG. 22B, and FIG. 22C are graphs for showing a fourth embodiment of the present disclosure and showing an example of the follow-the-leader control for the continuum robot illustrated in FIG. 16.
Figure 22B:
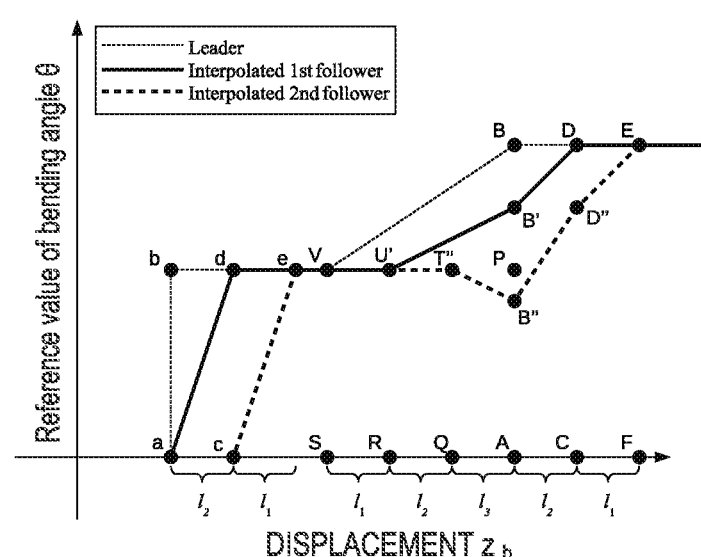
Figure 22C:
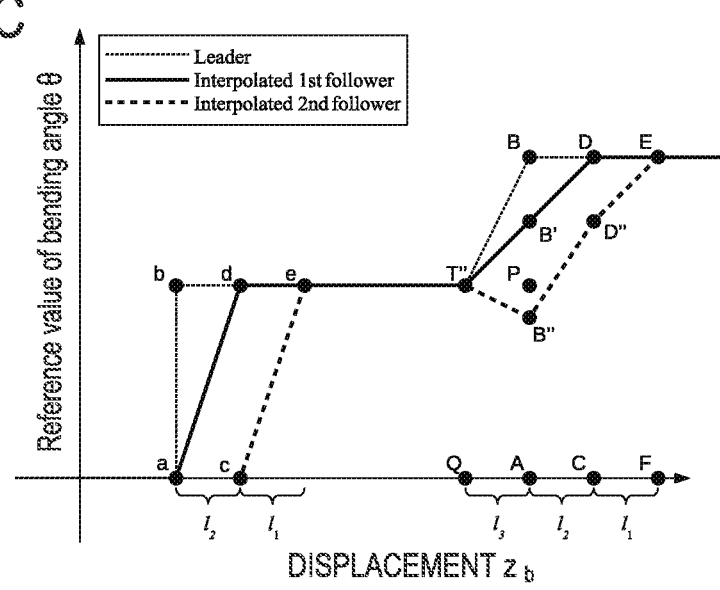

FIG. 22A to FIG. 22C are graphs for showing the fourth embodiment of the present disclosure and showing an example of the follow-the-leader control of the continuum robot 100-3 illustrated in FIG. 16. Specifically, FIG. 22A to FIG. 22C are graphs for showing three algorithms for the follow-up control unit (FTL) 330 with respect to the changing of the control mode during the follow-the-leader control. In FIG. 22A to FIG. 22C, the first algorithm in the third embodiment shown in FIG. 19A is shown as an algorithm for the advancing, but the second algorithm shown in FIG. 19B or the third algorithm shown in FIG. 19C may be used.

In the graphs of the follow-the-leader control shown in FIG. 22A to FIG. 22C, in the same manner as described above with reference to FIG. 19A to FIG. 19C, the horizontal axis represents the displacement $z_b$ of the robot base 140, and the vertical axis represents the bending angle $\theta$. Further, in FIG. 22A to FIG. 22C, in the same manner as described above with reference to FIG. 19A to FIG. 19C, "Leader" indicates the most distal curvable portion 110-$e$ illustrated in FIG. 16. Further, in FIG. 22A to FIG. 22C, "1st follower" indicates the first follower curvable portion 110-(*e*-1) illustrated in FIG. 16, and "2nd follower" indicates the second follower curvable portion 110-(*e*-2) illustrated in FIG. 16. In other words, in each of FIG. 22A to FIG. 22C, the bending angle command issued to the most distal curvable portion 110-*e* by the operator is indicated by the dotted line, and the bending angle commands issued by the first follower curvable portion 110-(*e*-1) and the second follower curvable portion 110-(*e*-2) are indicated by the solid line and the broken line, respectively. Further, in each of FIG. 22A to FIG. 22C, $l_3$ represents the length of the most distal curvable portion 110-*e*, $l_2$ represents the length of the first follower curvable portion 110-(*e*-1), and 11 represents the length of the second follower curvable portion 110-(*e*-2).

As in the third embodiment illustrated in FIG. 19A to FIG. 19C, FIG. 22A to FIG. 22C also show a state in which, when the control system is switched to the high back-drivability drive control unit ($K_{BKD}$) 252 at a displacement A of the robot base 140, the bending angles of the most distal curvable portion and the first and second follower curvable portions are back-driven toward AB, AB', and AB", respectively.

In the reversing of the robot base 140, it suffices that the bending angle of the second follower curvable portion 110-(*e*-2) is automatically generated so as to become QT" at a displacement Q of the robot base 140. Here, the displacement Q of the robot base 140 is determined so that a distance AQ becomes the length $l_3$ of the most distal curvable portion 110-*e*. Now, three algorithms are conceivable for the bending angle of the first follower curvable portion 110-(*e*-1).

First, in the first algorithm shown in FIG. 22A, it suffices that the bending angle of the first follower curvable portion 110-(*e*-1) is automatically generated so as to become QT' at the displacement Q of the robot base 140. Here, the bending angle QT' is the same as the bending angle AB'. It suffices that the bending angle of the first follower curvable portion 110-(*e*-1) is then automatically generated so as to become RU' at a displacement R of the robot base 140. Here, the displacement R of the robot base 140 is determined so that a distance RQ becomes the length $l_2$ of the first follower curvable portion 110-(*e*-1). In addition, the bending angle RU' is the same as the bending angle ab. Next, it suffices that the bending angle of the most distal curvable portion 110-*e* is automatically generated so as to become RU at the displacement R of the robot base 140. Here, the bending angle RU is the same as the bending angle AB. It suffices that the bending angle is then automatically generated so as to become SV at a displacement S of the robot base 140. Here, the displacement S of the robot base 140 is determined so that the distance SR becomes the length 11 of the second follower curvable portion 110-(*e*-2). In addition, the bending angle SV is the same as the bending angle ab. Through such generation, it is possible to generate target bending angles that cause the robot base 140 to appear to have been advanced from the displacement S thereof by the follow-the-leader control while curving in an order of the most distal curvable portion and the first and second follower curvable portions.

Next, in the second algorithm shown in FIG. 22B, a point U and a point T' that are supposed to be passing points of the most distal curvable portion and the first follower curvable portion, respectively, are omitted from the first algorithm shown in FIG. 22A. Through this omission, target bending angles at which the most distal curvable portion and the first follower curvable portion directly change to a point V and a point U', respectively, at a time of reversing are generated.

Next, in the third algorithm shown in FIG. 22C, target bending angles at which all the curvable portions directly change to the bending angle QT" at the displacement Q of the robot base 140 are generated.

The fourth embodiment also produces the same effects as those of the above-mentioned third embodiment.

Fifth Embodiment

Next, a fifth embodiment of the present disclosure is described. In the following description of the fifth embodiment, description of matters common to the first to fourth embodiments described above is omitted, and matters different from those of the first to fourth embodiments described above are described.

In each of the first to fourth embodiments described above, the control system has been designed for the continuum robot 100 to be driven in the x-z plane. In the fifth embodiment, a control system is designed for the continuum robot 100 capable of three-dimensional drive.

Figure 23:
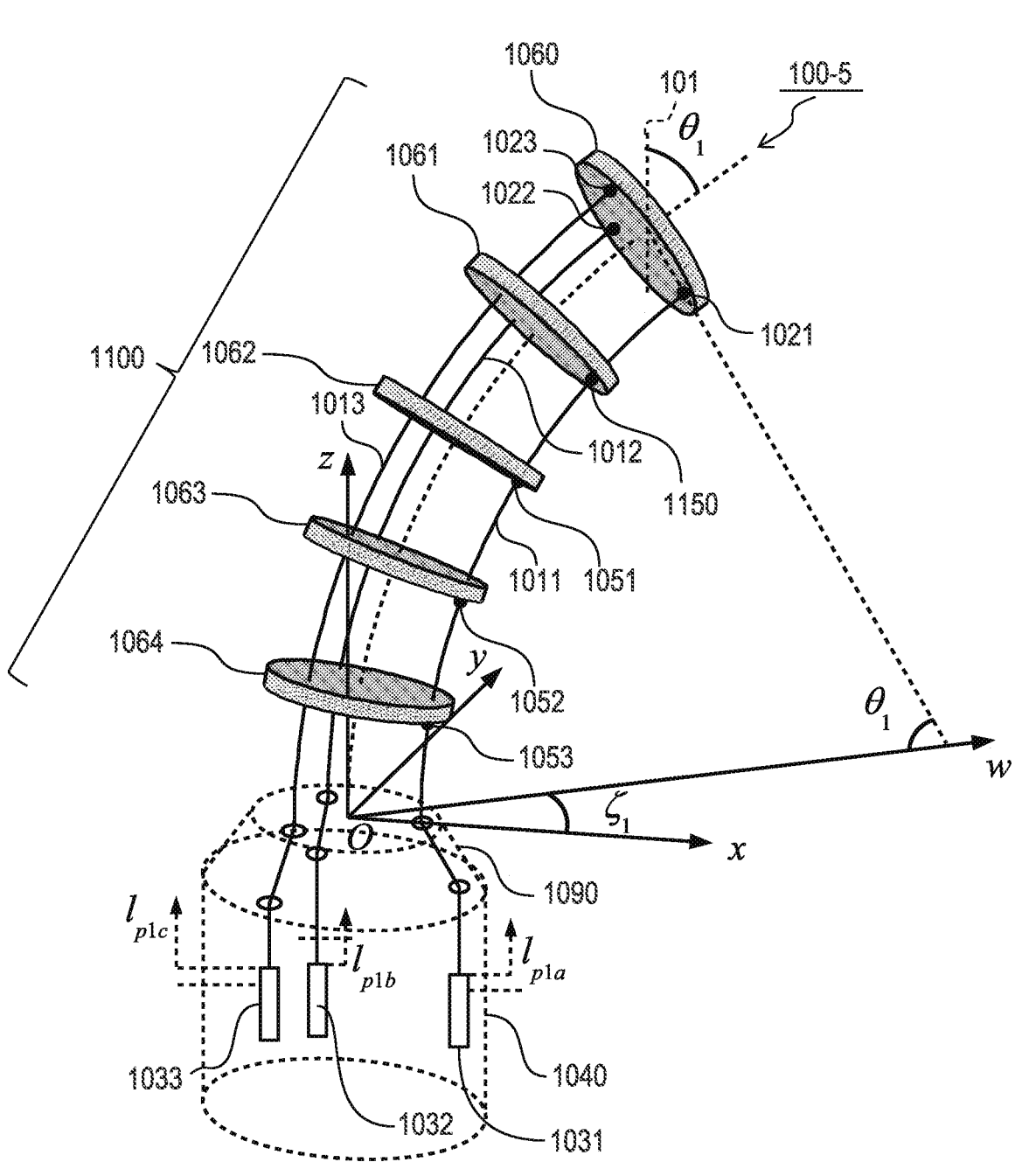
FIG. 23 is a view for illustrating an example of a schematic configuration of a continuum robot in a fifth embodiment of the present disclosure.

FIG. 23 is a diagram for illustrating an example of a schematic configuration of the continuum robot 100 in the fifth embodiment of the present disclosure. The continuum robot 100 illustrated in FIG. 23 is hereinafter referred to as "continuum robot 100-5."

In the continuum robot 100-5 illustrated in FIG. 23, wires 1011 to 1013 are connected to fixing portions 1021 to 1023 at a distal end 1060 of a curvable portion 1100. Further, wire gripping pipes 1031 to 1033 are connected to proximal ends of the wires 1011 to 1013. In the same manner as in the first embodiment, in a robot base 1040, a wire gripping mechanism (not shown in FIG. 23) and an actuator (not shown in FIG. 23) are installed for each of the wires 1011 to 1013. In this case, the wire gripping mechanisms are connected to the actuators through wire gripping mechanism bases (not shown in FIG. 23), and are capable of moving up and down. The wire gripping pipes 1031 to 1033 are connected to the wire gripping mechanisms, and are pushed or pulled by the actuator to control the attitude. The continuum robot 100-5 also includes wire guides 1061 to 1064 that are members for guiding the wires 1011 to 1013. In addition to a method of discretely arranging a plurality of members, a continuum member having a bellows shape or a mesh shape may be used as the wire guide. The wire guides 1061 to 1064 are fixed to the wire 1011 at fixing portions 1050 to 1053. Further, a spacing between the wires 1011 to 1013 and a spacing between the wire gripping pipes 1031 to 1033 may be different from each other. At that time, a diameter conversion unit 1190 may be connected to the robot base 1040. Further, in FIG. 23, a central axis of the continuum robot 100-5 is indicated by the broken line.

In this embodiment, a mechanism formed of the wires 1011 to 1013 and the wire guides 1061 to 1064 is referred to as "curvable portion 1100 being a continuum portion." Further, it is assumed that an actuator unit formed of a rotation motor and a rotation-linear motion conversion mechanism is used as the actuator (not shown). It is also assumed that the wire gripping mechanism has a function of detecting the tensile force of the wire. To that end, the above-mentioned wire gripping mechanism base is provided between the wire gripping mechanism and the actuator, and is connected to the actuator, and a spring is used to connect the wire gripping mechanism base and the wire gripping mechanism to each other. At this time, it is preferred to provide a linear guide or use a parallel spring as the spring so that the wire gripping mechanism is displaced only in the z-axis direction. Then, the tensile force of the wire can be detected by measuring the displacement of the spring.

Definitions of reference symbols to be used in this embodiment are described below.

$l_d$: Length of the central axis of the curvable portion 1100

$\theta_n$: Bending angle of the distal end of the curvable portion 1100 with respect to the reference axis 101

$\zeta_n$: Turning angle of the distal end of the curvable portion 1100 with respect to the reference axis (x-axis)

$\theta_{IK}$: Bending angle of the distal end of the curvable portion 1100 obtained by the inverse kinematics computing unit (IK) 270

$\zeta_{IK}$: Turning angle of the distal end of the curvable portion 1100 obtained by the inverse kinematics computing unit (IK) 270

$\rho_n$: Curvature radius of the curvable portion 1100.

Further, in this embodiment, the wires 1011 to 1013 are referred to as an "a" wire, a "b" wire, and a "c" wire counterclockwise in an x-y plane, and drive displacements (drive amounts) of the "a" to "c" wires 1011 to 1013 are set as $l_{p1a}$, $l_{p1b}$, and $l_{p1c}$.

Figure 24:
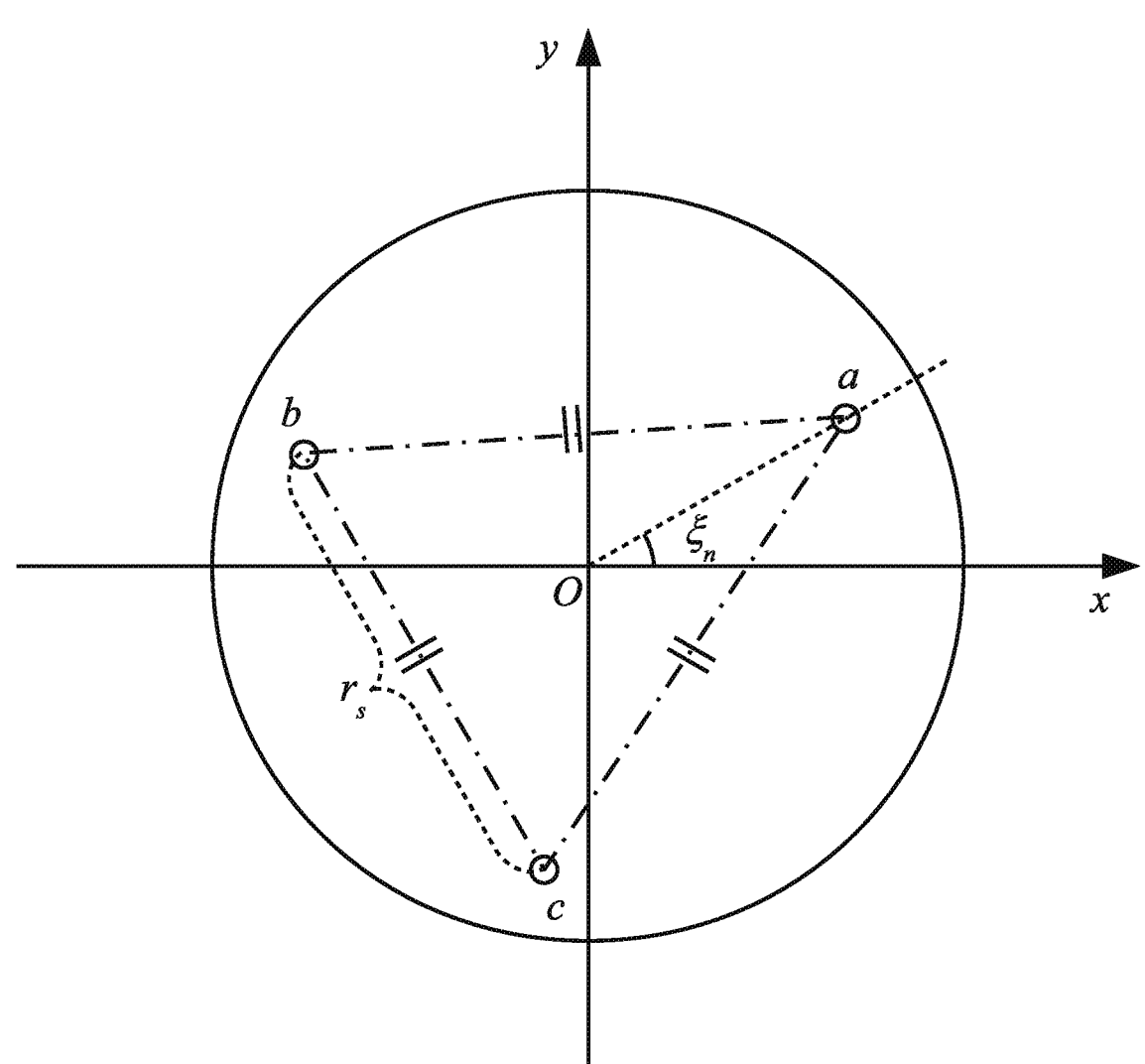
FIG. 24 is a graph for showing an example of arrangement of wires of the continuum robot in the fifth embodiment of the present disclosure.

FIG. 24 is a graph for showing an example of arrangement of the wires in the continuum robot 100 in the fifth embodiment of the present disclosure. As shown in FIG. 24, the "a" wire 1011 to "c" wire 1013 are arranged at vertices of a regular triangle each side of which has a length of $r_s$, and a phase angle $\xi_n$ is an angle by which the arrangement of the wires is determined. A value 0 is set as $\xi_1$ in this embodiment.

Further, in this embodiment, the following premises are assumed, and a kinematics of the continuum robot 100-5 is derived.

[1] In each curvable portion 1100, the wire is deformed at a constant curvature.

[2] Torsional deformation of the wire is not taken into consideration.

[3] The wire is not deformed in the longitudinal direction.

[4] The friction between the wire guide and the wire is not taken into consideration.

The drive displacement $l_{p1a}$ of the "a" wire, the drive displacement $l_{p1b}$ of the "b" wire, and drive displacement $l_{p1c}$ of the "c" wire that are used for setting the bending angle $\theta_1$ and the turning angle $\zeta_1$ of the distal end of the curvable portion 1100 are accordingly expressed by Equation (49).

$$l_{p1a} = -\frac{r_s}{\sqrt{3}} \cos(\zeta_1 - \xi_1)\theta_1 \tag{49}$$

$$l_{p1b} = -\frac{r_s}{\sqrt{3}} \cos\left(\frac{2\pi}{3} - \zeta_1 + \xi_1\right)\theta_1$$

$$l_{p1c} = -\frac{r_s}{\sqrt{3}} \cos\left(\frac{4\pi}{3} - \zeta_1 + \xi_1\right)\theta_1$$

In this embodiment, in the same manner as in the first embodiment, the expansion or contraction of the wire is not taken into consideration, and hence target displacements $ref_{za}$, $ref_{zb}$, and $ref_{zc}$ of the wire gripping mechanisms in the "a" wire 1011 to "c" wire 1013 are expressed by Equation (50).

$$ref_{za}=l_{p1a}, \, ref_{zb}=l_{p1b}, \, ref_{zc}=l_{p1c} \tag{50}$$

Further, an inverse kinematics computation to be performed by the inverse kinematics computing unit (IK) 270 is expressed by Equation (51).

$$z_{ND} = \frac{z_{t2c} - z_{t2a}}{z_{t2c} - z_{t2b}} \tag{51}$$

In Equation (51), when $z_{t2c} \neq z_{t2b}$, regarding the displacements of the wire gripping mechanisms, Equation (52) is obtained.

$$\zeta_{IK} = \tan^{-1}\left\{\frac{1}{\frac{2}{\sqrt{3}}(z_{ND} - 0.5)}\right\} + \xi \tag{52}$$

$$\theta_{IK} = -\frac{z_{t2c} - z_{t2b}}{r_s \sin(\zeta_{inc} - \xi)}$$

$$l_d = \frac{r_s}{\sqrt{3}} \cos(\theta_{inc} - \xi) + l_0 - z_{t2a}$$

In Equation (51), when $z_{t2c} \neq z_{t2b}$, regarding the displacements of the wire gripping mechanisms, Equation (53) is obtained.

$$\zeta_{IK} = \xi \tag{53}$$

$$\theta_{IK} = \frac{-2}{\sqrt{3}\,r_s}(z_{t2c} - z_{t2a})$$

$$l_d = \frac{r_s}{\sqrt{3}} \cos(\theta_{inc} - \xi) + l_0 - z_{t2a}$$

In Equation (51), when $z_{t2c}=z_{t2b}=z_{t2c}$ regarding the displacements of the wire gripping mechanisms, Equation (54) is obtained.

$$\zeta_{IK}=\xi$$

$$\theta_{IK}=0$$

$$l_d=z_{t2a} \tag{54}$$

In this embodiment, distributed control in which the switching control in the first embodiment and the second embodiment described above is applied to the "a" wire, the "b" wire, and the "c" wire independently of each other is performed.

Figure 25:
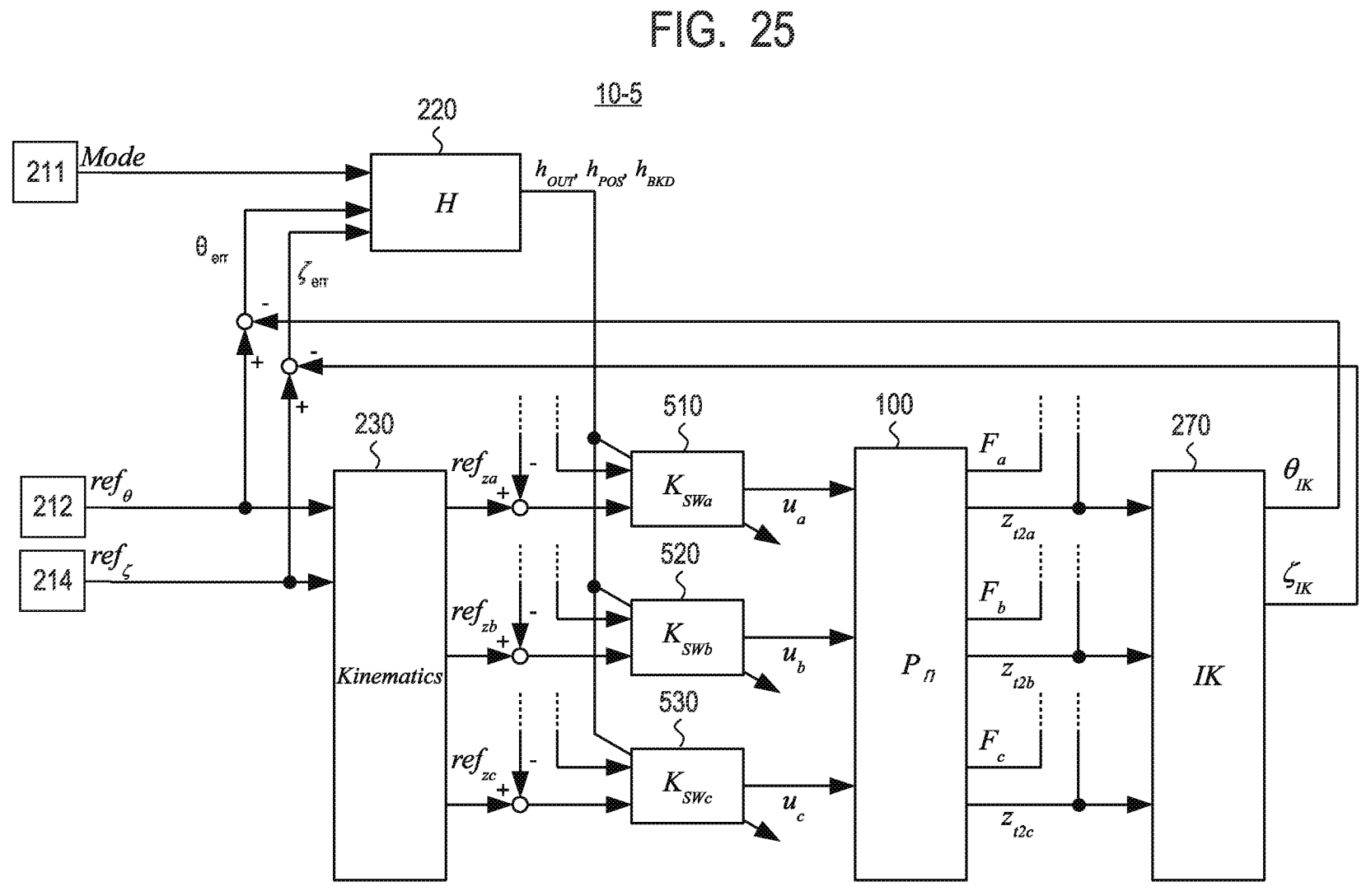

FIG. 25 is a diagram for illustrating an example of a schematic configuration of the control system 10 for a continuum robot according to the fifth embodiment of the present disclosure. The control system 10 for a continuum robot illustrated in FIG. 25 is hereinafter referred to as "control system 10-5 for a continuum robot." In FIG. 25, the same components as those illustrated in FIG. 1, FIG. 12A, FIG. 12B, and FIG. 18 are denoted by the same reference symbols, and detailed description thereof is omitted.

The control system 10-5 for a continuum robot includes, as the same components as those of FIG. 1, the continuum robot ($P_n$) 100, the input units 211 and 212, the switching control unit (H) 220, the kinematics computing unit (Kinematics) 230, and the inverse kinematics computing unit (IK) 270. It is assumed here that the continuum robot ($P_n$) 100 illustrated in FIG. 25 is the continuum robot 100-5 capable of three-dimensional drive illustrated in FIG. 23. In addition, the control system 10-5 for a continuum robot includes an input unit 214, an "a" wire drive control mechanism ($K_{SWa}$) 510, a "b" wire drive control mechanism ($K_{SWb}$) 520, and a "c" wire drive control mechanism ($K_{SWc}$) 530.

In the same manner as in the first embodiment, the input unit 211 inputs the mode signal indicating the drive control unit to be selected to the switching control unit (H) 220. The input unit 212 inputs the target command value ref$_\theta$ of the bending angle of the curvable portion 1100 with respect to the reference axis 101 to the kinematics computing unit (Kinematics) 230 and the like. The input unit 214 inputs a target command value ref$_\zeta$ of the turning angle of the curvable portion 1100 with respect to the reference axis ("x" axis) to the kinematics computing unit (Kinematics) 230 and the like.

The "a" wire drive control mechanism (K$_{SWa}$) 510 includes the blocking units 241 and 242, the low back-drivability drive control unit (K$_{POS}$) 251, the high back-drivability drive control unit (K$_{BKD}$) 252, and the selection unit 260 that are illustrated in FIG. 1. The "a" wire drive control mechanism (K$_{SWa}$) 510 is a component unit that controls drive of the "a" wire 1011.

The "b" wire drive control mechanism (K$_{SWb}$) 520 includes the blocking units 241 and 242, the low back-drivability drive control unit (K$_{POS}$) 251, the high back-drivability drive control unit (K$_{BKD}$) 252, and the selection unit 260 that are illustrated in FIG. 1. The "b" wire drive control mechanism (K$_{SWb}$) 520 is a component unit that controls drive of the "b" wire 1012.

The "c" wire drive control mechanism (K$_{SWc}$) 530 includes the blocking units 241 and 242, the low back-drivability drive control unit (K$_{POS}$) 251, the high back-drivability drive control unit (K$_{BKD}$) 252, and the selection unit 260 that are illustrated in FIG. 1. The "c" wire drive control mechanism (K$_{SWc}$) 530 is a component unit that controls drive of the "c" wire 1013.

The "a" wire drive control mechanism (K$_{SWa}$) 510, the "b" wire drive control mechanism (K$_{SWb}$) 520, and the "c" wire drive control mechanism (K$_{SWc}$) 530 that are illustrated in FIG. 25 may be separately designed, or may be the same control system. In FIG. 25, a feedback loop is omitted.

The target displacements ref$_{za}$, ref$_{zb}$, and ref$_{zc}$ of the respective wire gripping mechanisms output from the kinematics computing unit (Kinematics) 230 are obtained by substituting the target command value ref$_\theta$ of the bending angle and the target command value ref$_\zeta$ of the turning angle into the bending angle $\theta_1$ and the turning angle $\zeta_1$ of Equation (49).

The inverse kinematics computing unit (IK) 270 uses Equation (51) to Equation (54) to obtain the bending angle $\theta_{IK}$ and the turning angle $\zeta_{IK}$ from the displacements $z_{t2a}$, $z_{t2b}$, and $z_{t2c}$ of the wire gripping mechanism.

Then, the difference $\theta_{err}$ between the target command value ref$_\theta$ of the bending angle input to the kinematics computing unit (Kinematics) 230 and the bending angle $\theta_{IK}$ output from the inverse kinematics computing unit (IK) 270, which is expressed by Equation (55), is input to the switching control unit (H) 220. In addition, a difference $\zeta_{err}$ between the target command value ref$_\zeta$ of the turning angle input to the kinematics computing unit (Kinematics) 230 and the turning angle $\zeta_{IK}$ output from the inverse kinematics computing unit (IK) 270, which is expressed by Equation (56), is input to the switching control unit (H) 220.

$$\theta_{err} = \theta - \theta_{IK} \qquad (55)$$

$$\zeta_{err} = \text{ref}_\zeta - \zeta_{IK} \qquad (56)$$

In the switching from the high back-drivability drive control unit (K$_{BKD}$) 252 to the low back-drivability drive control unit (K$_{POS}$) 251, first, the mode signal indicating the low back-drivability drive control unit (K$_{POS}$) 251 is input from the input unit 211. In this case, the switching control unit (H) 220 performs this switching when the above-mentioned difference $\theta_{err}$ between the bending angles is equal to or smaller than a threshold value set in advance and the above-mentioned difference $\zeta_{err}$ between the turning angles is equal to or smaller than a threshold value set in advance.

Meanwhile, in the switching from the low back-drivability drive control unit (K$_{POS}$) 251 to the high back-drivability drive control unit (K$_{BKD}$) 252, the switching control unit (H) 220 performs this switching irrespective of the value of the above-mentioned difference $\theta_{err}$ between the bending angles and the value of the above-mentioned difference $\zeta_{err}$ between the turning angles. That is, when the mode signal indicating the high back-drivability drive control unit (K$_{BKD}$) 252 is input from the input unit 211, the switching control unit (H) 220 performs the switching.

In the fifth embodiment as well, in the same manner as in the first embodiment, when there are a plurality of drive control units having different back-drivability as the drive control units for curving the curvable portion, switching therebetween can be appropriately performed with a reduced burden on the operator.

The continuum robot 100-5 in the fifth embodiment includes the curvable portion 1100 configured to be curvable when the plurality of wires 1011 to 1013 are driven and the plurality of actuators (not shown) being the plurality of drive units that drive the plurality of wires 1011 to 1013, respectively. Further, in the control system 10 for a continuum robot according to the fifth embodiment, the drive control mechanisms ("a" wire drive control mechanism (K$_{SWa}$) 510, "b" wire drive control mechanism (K$_{SWb}$) 520, and "c" wire drive control mechanism (K$_{SWc}$) 530) including the low back-drivability drive control unit (K$_{POS}$) 251 and the high back-drivability drive control unit (K$_{BKD}$) 252 are provided for each of the plurality of the wires 1011 to 1013. Further, in the case in which the mode signal indicating the low back-drivability drive control unit (K$_{POS}$) 251 has been input from the input unit 211 while the drive control is being performed by the high back-drivability drive control unit (K$_{BKD}$) 252, the switching control unit (H) 220 performs control to switch from the high back-drivability drive control unit (K$_{BKD}$) 252 to the low back-drivability drive control unit (K$_{POS}$) 251 when the above-mentioned difference $\theta_{err}$ between the bending angles is equal to or smaller than the threshold value and the above-mentioned difference $\zeta_{err}$ between the turning angles is equal to or smaller than the threshold value.

According to the configuration of the control system 10-5 for a continuum robot, a rapid follow-up to the target value at the time of the switching is suppressed, and the prevention of damage to the continuum robot itself and a fragile target object can be achieved.

Further, in the case in which the mode signal indicating the high back-drivability drive control unit (K$_{BKD}$) 252 has been input from the input unit 211 while the drive control is being performed by the low back-drivability drive control unit (K$_{POS}$) 251, the switching control unit (H) 220 performs control to switch from the low back-drivability drive control unit (K$_{POS}$) 251 to the high back-drivability drive control unit (K$_{BKD}$) 252 irrespective of the value of the above-mentioned difference $\theta_{err}$ between the bending angles and the value of the above-mentioned difference $\zeta_{err}$ between the turning angles.

Sixth Embodiment

Next, a sixth embodiment of the present disclosure is described. In the following description of the sixth embodiment, description of matters common to the first to fifth embodiments described above is omitted, and matters different from those of the first to fifth embodiments described above are described.

In the sixth embodiment, the follow-the-leader control involving the switching of the control system is performed on the continuum robot 100 including a plurality of curvable portions and having a capability of three-dimensional drive.

Figure 26:
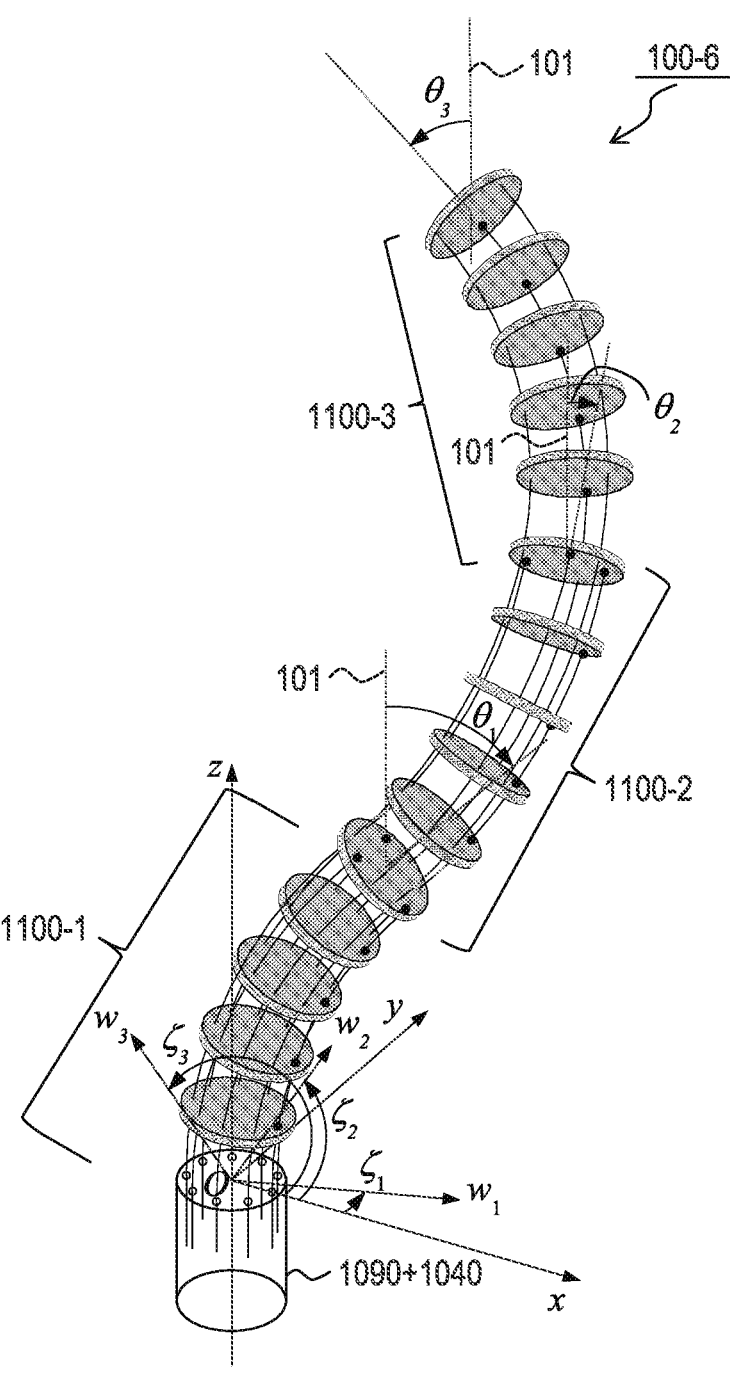
FIG. 26 is a view for illustrating an example of a schematic configuration of a continuum robot in a sixth embodiment of the present disclosure.

FIG. 26 is a diagram for illustrating an example of a schematic configuration of the continuum robot 100 in the sixth embodiment of the present disclosure. The continuum robot 100 illustrated in FIG. 26 is hereinafter referred to as "continuum robot 100-6." In FIG. 26, three curvable portions 1100-1 to 1100-3 are illustrated. Further, in FIG. 26, the same components as those illustrated in FIG. 23 are denoted by the same reference symbols, and detailed description thereof is omitted.

Here, drive displacements of the "a" wire to "c" wire that drive the n-th curvable portion 1100-n are set as $l_{pna}$, $l_{pnb}$, and $l_{pnc}$. Then, a relationship between the drive displacements $l_{pna}$, $l_{pnb}$, and $l_{pnc}$ of the "a" wire to "c" wire and the bending angle $\theta_n$ and turning angle $\zeta_n$ at a distal end of the n-th curvable portion 1100-n is obtained. The number of curvable portions 1100 is set as "e", and the phase angle $\xi_n$ of the wires that drive the n-th curvable portion 1100-n is expressed by Equation (57).

$$\xi_n = \frac{120}{e} n \qquad (57)$$

The drive displacements $l_{pna}$, $l_{pnb}$, and $l_{pnc}$ of the "a" wire to "c" wire of the n-th curvable portion 1100-n are accordingly expressed by Equation (58).

$$l_{pna} = -\frac{r_s}{\sqrt{3}} \cos{(\zeta_n - \xi_n)} \theta_n \qquad (58)$$

$$l_{pnb} = -\frac{r_s}{\sqrt{3}} \cos{\left(\frac{2\pi}{3} - \zeta_n + \xi_n\right)} \theta_n$$

$$l_{pnc} = -\frac{r_s}{\sqrt{3}} \cos{\left(\frac{4\pi}{3} - \zeta_n + \xi_n\right)} \theta_n$$

In this embodiment as well, in the same manner as in the fifth embodiment, the expansion or contraction of the wire is not taken into consideration, and hence target-displacements $\mathrm{ref}_{zna}$, $\mathrm{ref}_{znb}$ and $\mathrm{ref}_{znc}$ of the wire gripping mechanisms in the "a" wire to "c" wire of the n-th curvable portion 1100-n are expressed by Equation (59).

$$\mathrm{ref}_{zna} = l_{pna}, \ \mathrm{ref}_{znb} = l_{pnb}, \ \mathrm{ref}_{znc} = l_{pnc} \qquad (59)$$

Through use thereof, the wires are each driven by the switching control system in the same manner as in the fifth embodiment described above.

Figure 27:
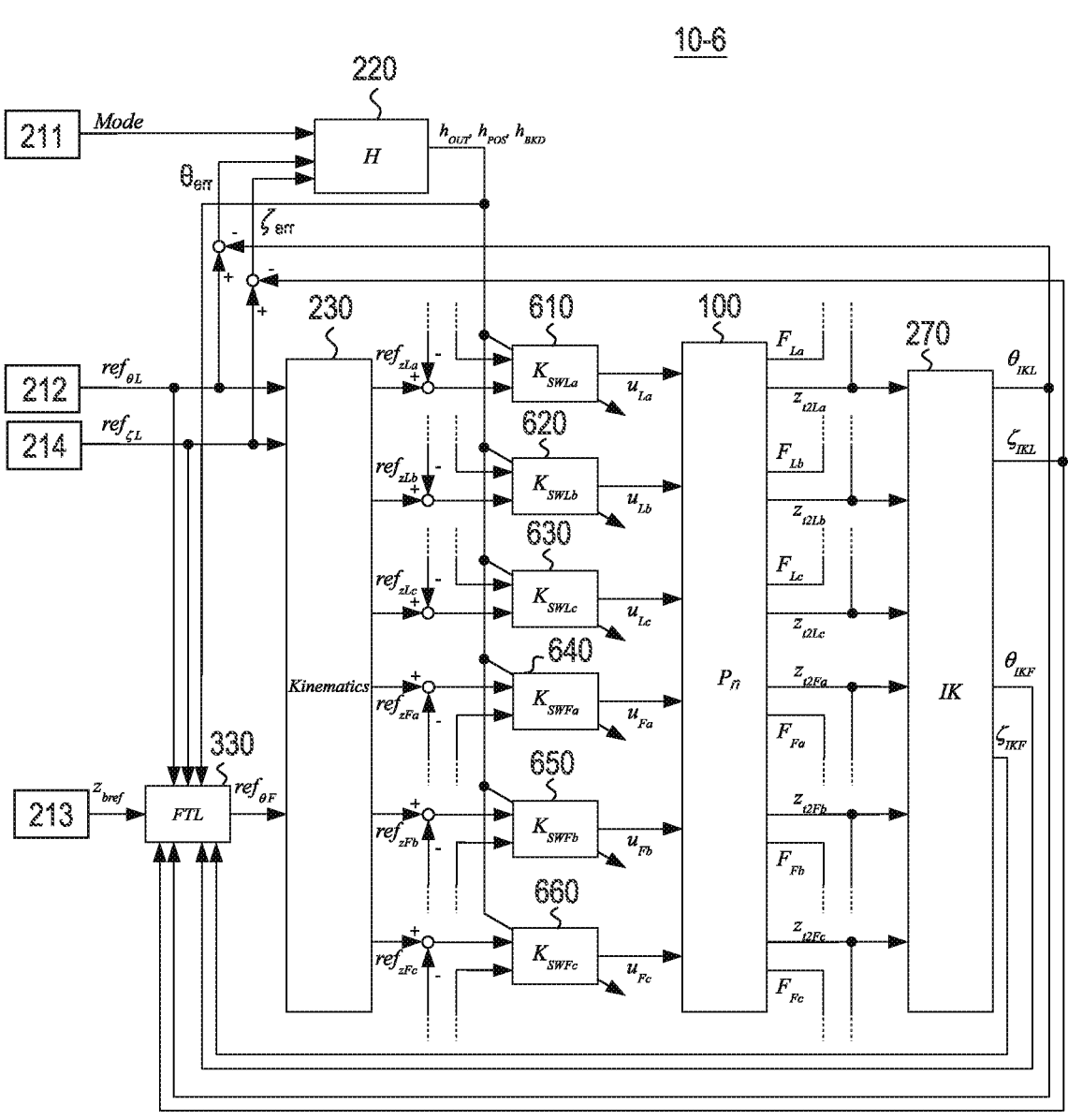
FIG. 27 is a diagram for illustrating an example of a schematic configuration of a control system for a continuum robot according to the sixth embodiment of the present disclosure.

FIG. 27 is a diagram for illustrating an example of a schematic configuration of the control system 10 for a continuum robot according to the sixth embodiment of the present disclosure. The control system 10 for a continuum robot illustrated in FIG. 27 is hereinafter referred to as "control system 10-6 for a continuum robot." In FIG. 27, the same components as those illustrated in FIG. 1, FIG. 12A, FIG. 12B, FIG. 18, and FIG. 25 are denoted by the same reference symbols, and detailed description thereof is omitted.

The control system 10-6 for a continuum robot includes, as the same components as those of FIG. 1, the continuum robot ($P_n$) 100, the input units 211 and 212, the switching control unit (H) 220, the kinematics computing unit (Kinematics) 230, and the inverse kinematics computing unit (IK) 270. It is assumed here that the continuum robot ($P_n$) 100 illustrated in FIG. 27 is the continuum robot 100-6 including the plurality of curvable portions and having a capability of three-dimensional drive illustrated in FIG. 26. The control system 10-6 for a continuum robot further includes the input units 213 and 214, a most distal "a" wire drive control mechanism ($K_{SWLa}$) 610, a most distal "b" wire drive control mechanism ($K_{SWLb}$) 620, a most distal "c" wire drive control mechanism ($K_{SWLc}$) 630, a follower "a" wire drive control mechanism ($K_{SWFa}$) 640, a follower "b" wire drive control mechanism ($K_{SWFb}$) 650, and a follower "c" wire drive control mechanism ($K_{SWFc}$) 660.

In the same manner as in the first embodiment, the input unit 211 inputs the mode signal indicating the drive control unit to be selected to the switching control unit (H) 220. The input unit 212 inputs the target command value $\mathrm{ref}_{\theta L}$ of the bending angle of the most distal curvable portion with respect to the reference axis 101 to the kinematics computing unit (Kinematics) 230 and the like. The input unit 214 inputs a target command value $\mathrm{ref}_{\zeta l}$ of the turning angle of the most distal curvable portion with respect to the reference axis (x-axis) to the kinematics computing unit (Kinematics) 230 and the like. The input unit 213 inputs the target displacement $z_{bref}$ of the robot base 1040 to the follow-up control unit (FTL) 330.

The most distal "a" wire drive control mechanism ($K_{SWLa}$) 610 includes the blocking units 241 and 242, the low back-drivability drive control unit ($K_{POS}$) 251, the high back-drivability drive control unit ($K_{BKD}$) 252, and the selection unit 260 that are illustrated in FIG. 1. The most distal "a" wire drive control mechanism ($K_{SWLa}$) 610 is a component unit that controls drive of the "a" wire in the most distal curvable portion.

The most distal "b" wire drive control mechanism ($K_{SWLb}$) 620 includes the blocking units 241 and 242, the low back-drivability drive control unit ($K_{POS}$) 251, the high back-drivability drive control unit ($K_{BKD}$) 252, and the selection unit 260 that are illustrated in FIG. 1. The most distal "b" wire drive control mechanism ($K_{SWLb}$) 620 is a component unit that controls drive of the "b" wire in the most distal curvable portion.

The most distal "c" wire drive control mechanism ($K_{SWLc}$) 630 includes the blocking units 241 and 242, the low back-drivability drive control unit ($K_{POS}$) 251, the high back-drivability drive control unit ($K_{BKD}$) 252, and the selection unit 260 that are illustrated in FIG. 1. The most distal "c" wire drive control mechanism ($K_{SWLc}$) 630 is a component unit that controls drive of the "c" wire in the most distal curvable portion.

The follower "a" wire drive control mechanism ($K_{SWFa}$) 640 includes the blocking units 241 and 242, the low back-drivability drive control unit ($K_{POS}$) 251, the high back-drivability drive control unit ($K_{BKD}$) 252, and the selection unit 260 that are illustrated in FIG. 1. The follower "a" wire drive control mechanism ($K_{SWFa}$) 640 is a component unit that controls drive of the "a" wire in the follower curvable portion.

The follower "b" wire drive control mechanism ($K_{SWFb}$) 650 includes the blocking units 241 and 242, the low back-drivability drive control unit ($K_{POS}$) 251, the high back-drivability drive control unit ($K_{BKD}$) 252, and the selection unit 260 that are illustrated in FIG. 1. The follower "b" wire drive control mechanism ($K_{SWFb}$) 650 is a component unit that controls drive of the "b" wire in the follower curvable portion.

The follower "c" wire drive control mechanism ($K_{SWFc}$) 660 includes the blocking units 241 and 242, the low back-drivability drive control unit ($K_{POS}$) 251, the high back-drivability drive control unit ($K_{BKD}$) 252, and the selection unit 260 that are illustrated in FIG. 1. The follower "c" wire drive control mechanism ($K_{SWFc}$) 660 is a component unit that controls drive of the "c" wire in the follower curvable portion.

The most distal "a" wire drive control mechanism ($K_{SWLa}$) 610 to the follower "c" wire drive control mechanism ($K_{SWFc}$) 660 may be separately designed, or may be the same control system. In FIG. 27, a feedback loop is omitted.

Target displacements $ref_{zLa}$, $ref_{zLb}$, and $ref_{zLc}$ of the respective wire gripping mechanisms that drive the most distal curvable portion output from the kinematics computing unit (Kinematics) 230 are obtained by substituting the target command value $ref_{\theta L}$ of the bending angle of the most distal curvable portion and the target command value $ref_{\zeta L}$ of the turning angle into the bending angle $\theta_n$ and the turning angle $\zeta_n$ of Equation (58).

Displacements $z_{t2La}$, $z_{t2Lb}$, and $z_{t2Lc}$ to be input to the inverse kinematics computing unit (IK) 270 are displacements of the wire gripping mechanisms relative to the "a" wire, the "b" wire, and the "c" wire of the most distal curvable portion, respectively.

Further, signal names and block names relating to the follower curvable portion are only required to be read with the subscript "L" being substituted by "F", and also in FIG. 27, the follower curvable portion is representatively indicated by the subscript "F". When there are a plurality of follower curvable portions, the same block structures may be arranged in parallel.

The inverse kinematics computing unit (IK) 270 can use Equation (51) to Equation (54) to obtain the bending angle $\theta_{IKL}$ of and the turning angle $\zeta_{IKL}$ of the most distal curvable portion and the bending angle $\theta_{IKF}$ of and the turning angle $\zeta_{IKF}$ of the follower curvable portion. Here, the follow-up control unit (FTL) 330 uses the algorithm described in the third embodiment described above to obtain the target angle of the follower curvable portion in a turning direction in addition to a curve direction in the same manner as in the curve direction.

Further, in the case in which the mode signal indicating the low back-drivability drive control unit ($K_{POS}$) 251 has been input from the input unit 211 while the drive control is being performed by the high back-drivability drive control unit ($K_{BKD}$) 252, the switching control unit (H) 220 performs control to switch from the high back-drivability drive control unit ($K_{BKD}$) 252 to the low back-drivability drive control unit ($K_{POS}$) 251 when the difference $\theta_{err}$ between the bending angles illustrated in FIG. 27 is equal to or smaller than the threshold value and the difference $\zeta_{err}$ between the turning angles illustrated in FIG. 27 is equal to or smaller than the threshold value. As a result, a rapid follow-up to the target value at the time of the switching is suppressed, and the prevention of damage to the continuum robot itself and a fragile target object can be achieved.

Further, in the case in which the mode signal indicating the high back-drivability drive control unit ($K_{BKD}$) 252 has been input from the input unit 211 while the drive control is being performed by the low back-drivability drive control unit ($K_{POS}$) 251, the switching control unit (H) 220 performs control to switch from the low back-drivability drive control unit ($K_{POS}$) 251 to the high back-drivability drive control unit ($K_{BKD}$) 252 irrespective of the value of the difference $\theta_{err}$ between the bending angles and the value of the difference $\zeta_{err}$ between the turning angles illustrated in FIG. 27.

Seventh Embodiment

Next, a seventh embodiment of the present disclosure is described. In the following description of the seventh embodiment, description of matters common to the first to sixth embodiments described above is omitted, and matters different from those of the first to sixth embodiments described above are described.

In each of the first to sixth embodiments described above, the operator monitors the generated force F and switches the control system by changing the mode signal to be input from the input unit 211 depending on whether or not the value of the generated force F has fallen out of the predetermined range (±2 N). However, in order to, for example, further reduce the burden on the operator, in the seventh embodiment, a mode in which the above-mentioned manipulations of the operator are automated and performed by the control system 10 for a continuum robot is employed. In the seventh embodiment, it is possible to employ, for example, a mode in which the continuum robot ($P_n$) 100 illustrated in FIG. 3C detects the generated force F and the control system 10 for a continuum robot generates a mode signal from the input unit 211 based on the result of detecting the generated force F. An application example of the seventh embodiment is described below.

First, a case in which automation processing in the seventh embodiment is applied to each of the first to fourth embodiments is described. The continuum robot ($P_n$) 100 illustrated in FIG. 3C detects the generated force F being a force applied to the wire. Further, in a case in which a force within the predetermined range (within ±2 N) has been detected as the result of detecting the generated force F by the continuum robot ($P_n$) 100 illustrated in FIG. 3C while the drive control is being performed by the high back-drivability drive control unit ($K_{BKD}$) 252, the switching control unit (H) 220 performs control to switch from the high back-drivability drive control unit ($K_{BKD}$) 252 to the low back-drivability drive control unit ($K_{POS}$) 251 when the above-mentioned difference $\theta_{err}$ between the bending angles of the curvable portion 110 is equal to or smaller than the threshold value. Further, in a case in which a force that falls out of the predetermined range (±2 N) has been detected as the result of detecting the generated force F by the continuum robot ($P_n$) 100 illustrated in FIG. 3C while the drive control is being performed by the low back-drivability drive control unit ($K_{POS}$) 251, the switching control unit (H) 220 performs control to switch from the low back-drivability drive control unit ($K_{POS}$) 251 to the high back-drivability drive control unit ($K_{BKD}$) 252.

Subsequently, a case in which the automation processing in the seventh embodiment is applied to each of the fifth and sixth embodiments is described. The continuum robot ($P_n$) 100 illustrated in FIG. 3C detects the generated force F being a force applied to the wire. Further, in a case in which a force within the predetermined range (within ±2 N) has been detected as the result of detecting the generated force F by the continuum robot ($P_n$) 100 illustrated in FIG. 3C while the drive control is being performed by the high back-drivability drive control unit ($K_{BKD}$) 252, the switching control unit (H) 220 performs control to switch from the high back-drivability drive control unit ($K_{BKD}$) 252 to the low back-drivability drive control unit ($K_{POS}$) 251 when the above-mentioned difference $\theta_{err}$ between the bending angles of the curvable portion 1100 is equal to or smaller than the threshold value and the above-mentioned difference $\zeta_{err}$ between the turning angles of the curvable portion 1100 is equal to or smaller than the threshold value. Further, in a case in which a force that falls out of the predetermined range (±2 N) has been detected as the result of detecting the generated force F by the continuum robot ($P_n$) 100 illustrated in FIG. 3C while the drive control is being performed by the low back-drivability drive control unit ($K_{POS}$) 251, the switching control unit (H) 220 performs control to switch from the low back-drivability drive control unit ($K_{POS}$) 251 to the high back-drivability drive control unit ($K_{BKD}$) 252.

The switching from the high back-drivability drive control unit ($K_{BKD}$) 252 to the low back-drivability drive control unit ($K_{POS}$) 251 is performed under a constraint that a difference between the angle obtained by the inverse kinematics computing unit (IK) 270 and the target command value of the angle is equal to or smaller than the threshold value, but may be performed under a constraint that the operator manipulates the target command value and a difference corresponding to the manipulation is equal to or smaller than the threshold value. In addition, the manipulation may be automated. Specifically, for example, a functional block in which the mode signal, the angle obtained by the inverse kinematics computing unit (IK) 270, and the signal $h_{OUT}$ are input and an auxiliary target command is output is added. This auxiliary target command is added to the target command. When the switching from the high back-drivability drive control unit ($K_{BKD}$) 252 to the low back-drivability drive control unit ($K_{POS}$) 251 is commanded, the functional block outputs the auxiliary target command, and when the switching is completed, the functional block stops outputting the auxiliary target command. The auxiliary target command is set as a feedback loop that follows the angle obtained by the inverse kinematics computing unit (IK) 270, and is desired to be fed back with as low a gain as possible.

Other Embodiments

The present disclosure can also be achieved by processing in which a program for implementing one or more functions of the above-mentioned embodiments is supplied to a system or an apparatus via a network or storage medium, and one or more processors in a computer of the system or the apparatus read out and execute the program. Further, the processing can be achieved by a circuit (for example, ASIC) that implements one or more functions. The program and a computer-readable storage medium having the program stored thereon are encompassed in the present disclosure.

All the embodiments of the present disclosure described above merely describe embodied examples for carrying out the present disclosure. Therefore, the technical scope of the present disclosure should not be read as restrictive by the embodiments described above. Specifically, the present disclosure can be carried out in various forms without departing from the technical ideas or main features of the present disclosure.

The present disclosure is not limited to the embodiments described above, and various changes and modifications can be made without departing from the spirit and scope of the present disclosure. The following claims are appended hereto in order to make the scope of the present disclosure public.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A control system for a continuum robot including a curvable portion configured to be curvable when a wire is driven and a drive unit that drives the wire, the control system comprising:

a kinematics computing unit configured to perform a kinematics computation for calculating a drive amount of the wire from a bending angle of the curvable portion with respect to a reference axis;

a first drive control unit configured to control the drive amount of the wire being driven by the drive unit based on a result of the kinematics computation;

a second drive control unit with which the drive unit is more easily driven in a reverse direction than in a case of drive control performed by the first drive control unit when the curvable portion is subjected to an external force, the second drive control unit being configured to control the drive amount of the wire being driven by the drive unit based on the result of the kinematics computation; and a switching control unit configured to perform control to switch between the first drive control unit and the second drive control unit in accordance with a mode signal indicating a drive control unit to be selected or a result of detecting a force applied to the wire, wherein a drive control by the second drive control unit includes a control to compensate an error between a target value and a detected value of a displacement of the wire and a control to compensate an error between a target value and a detected value of a force applied to the wire, and wherein the target value of the force applied to the wire is calculated based on the error between the target value and the detected value of the displacement of the wire.

2. A control system for a continuum robot including a curvable portion configured to be curvable when a wire is driven and a drive unit that drives the wire, the control system comprising:

a kinematics computing unit configured to perform a kinematics computation for calculating a drive amount of the wire from a bending angle of the curvable portion with respect to a reference axis;

a first drive control unit configured to control the drive amount of the wire being driven by the drive unit based on a result of the kinematics computation;

a second drive control unit with which the drive unit is more easily driven in a reverse direction than in a case of drive control performed by the first drive control unit when the curvable portion is subjected to an external force, the second drive control unit being configured to control the drive amount of the wire being driven by the drive unit based on the result of the kinematics computation;

a switching control unit configured to perform control to switch between the first drive control unit and the second drive control unit in accordance with a mode signal indicating a drive control unit to be selected or a result of detecting a force applied to the wire; and an inverse kinematics computing unit configured to perform an inverse kinematics computation for calculating the bending angle of the curvable portion from the drive amount of the wire, the inverse kinematics computation being a computation reverse to the kinematics computation, wherein the switching control unit is configured to perform, in a case in which a signal indicating the first drive control unit has been input as the mode signal while the drive control is being performed by the second drive control unit, control to switch from the second drive control unit to the first drive control unit when a difference between the bending angle of the curvable portion input to the kinematics computing unit and the bending angle of the curvable portion output from the inverse kinematics computing unit is equal to or smaller than a threshold value.

3. A control system for a continuum robot including a curvable portion configured to be curvable when a wire is driven and a drive unit that drives the wire, the control system comprising:

a kinematics computing unit configured to perform a kinematics computation for calculating a drive amount of the wire from a bending angle of the curvable portion with respect to a reference axis;

a first drive control unit configured to control the drive amount of the wire being driven by the drive unit based on a result of the kinematics computation;

a second drive control unit with which the drive unit is more easily driven in a reverse direction than in a case of drive control performed by the first drive control unit when the curvable portion is subjected to an external force, the second drive control unit being configured to control the drive amount of the wire being driven by the drive unit based on the result of the kinematics computation;

a switching control unit configured to perform control to switch between the first drive control unit and the second drive control unit in accordance with a mode signal indicating a drive control unit to be selected or a result of detecting a force applied to the wire; and an inverse kinematics computing unit configured to perform an inverse kinematics computation for calculating the bending angle of the curvable portion from the drive amount of the wire, the inverse kinematics computation being a computation reverse to the kinematics computation, wherein the switching control unit is configured to perform, in a case in which a force within a predetermined range has been detected as the result of detecting the force applied to the wire while the drive control is being performed by the second drive control unit, control to switch from the second drive control unit to the first drive control unit when a difference between the bending angle of the curvable portion input to the kinematics computing unit and the bending angle of the curvable portion output from the inverse kinematics computing unit is equal to or smaller than a threshold value.

4. A control system for a continuum robot including a curvable portion configured to be curvable when a wire is driven and a drive unit that drives the wire, the control system comprising:

a kinematics computing unit configured to perform a kinematics computation for calculating a drive amount of the wire from a bending angle of the curvable portion with respect to a reference axis;

a first drive control unit configured to control the drive amount of the wire being driven by the drive unit based on a result of the kinematics computation;

a second drive control unit with which the drive unit is more easily driven in a reverse direction than in a case of drive control performed by the first drive control unit when the curvable portion is subjected to an external force, the second drive control unit being configured to control the drive amount of the wire being driven by the drive unit based on the result of the kinematics computation; and a switching control unit configured to perform control to switch between the first drive control unit and the second drive control unit in accordance with a mode signal indicating a drive control unit to be selected or a result of detecting a force applied to the wire, wherein the kinematics computing unit is configured to perform the kinematics computation for calculating the drive amount of the wire from the bending angle of the curvable portion and a turning angle of the curvable portion with respect to the reference axis, wherein the control system further comprises an inverse kinematics computing unit configured to perform an inverse kinematics computation for calculating the bending angle of the curvable portion and the turning angle of the curvable portion from the drive amount of the wire, the inverse kinematics computation being a computation reverse to the kinematics computation, and wherein the switching control unit is configured to perform, in a case in which a signal indicating the first drive control unit has been input as the mode signal while the drive control is being performed by the second drive control unit, control to switch from the second drive control unit to the first drive control unit when a difference between the bending angle of the curvable portion input to the kinematics computing unit and the bending angle of the curvable portion output from the inverse kinematics computing unit is equal to or smaller than a threshold value and a difference between the turning angle of the curvable portion input to the kinematics computing unit and the turning angle of the curvable portion output from the inverse kinematics computing unit is equal to or smaller than a threshold value.

5. A control system for a continuum robot including a curvable portion configured to be curvable when a wire is driven and a drive unit that drives the wire, the control system comprising:

a kinematics computing unit configured to perform a kinematics computation for calculating a drive amount of the wire from a bending angle of the curvable portion with respect to a reference axis;

a first drive control unit configured to control the drive amount of the wire being driven by the drive unit based on a result of the kinematics computation;

a second drive control unit with which the drive unit is more easily driven in a reverse direction than in a case of drive control performed by the first drive control unit when the curvable portion is subjected to an external force, the second drive control unit being configured to control the drive amount of the wire being driven by the drive unit based on the result of the kinematics computation; and a switching control unit configured to perform control to switch between the first drive control unit and the second drive control unit in accordance with a mode signal indicating a drive control unit to be selected or a result of detecting a force applied to the wire, wherein the kinematics computing unit is configured to perform the kinematics computation for calculating the drive amount of the wire from the bending angle of the curvable portion and a turning angle of the curvable portion with respect to the reference axis, wherein the control system further comprises an inverse kinematics computing unit configured to perform an inverse kinematics computation for calculating the bending angle of the curvable portion and the turning angle of the curvable portion from the drive amount of the wire, the inverse kinematics computation being a computation reverse to the kinematics computation, and wherein the switching control unit is configured to perform, in a case in which a force within a predetermined range has been detected as the result of detecting the force applied to the wire while the drive control is being performed by the second drive control unit, control to switch from the second drive control unit to the first drive control unit when a difference between the bending angle of the curvable portion input to the kinematics computing unit and the bending angle of the curvable portion output from the inverse kinematics computing unit is equal to or smaller than a threshold value and a difference between the turning angle of the curvable portion input to the kinematics computing unit and the turning angle of the curvable portion output from the inverse kinematics computing unit is equal to or smaller than a threshold value.

6. The control system for a continuum robot according to claim 1, wherein the switching control unit is configured to perform, in a case in which a signal indicating the second drive control unit has been input as the mode signal while the drive control is being performed by the first drive control unit, control to switch from the first drive control unit to the second drive control unit.

7. The control system for a continuum robot according to claim 1, wherein the switching control unit is configured to perform, in a case in which a force that falls out of a predetermined range has been detected as the result of detecting the force applied to the wire while the drive control is being performed by the first drive control unit, control to switch from the first drive control unit to the second drive control unit.

8. The control system for a continuum robot according to claim 1, wherein the second drive control unit has a function of compensating for an error between a target value of a force to be applied to the wire and a detected value of a force applied to the wire.

9. The control system for a continuum robot according to claim 1, further comprising a selection unit configured to select output of the first drive control unit or output of the second drive control unit based on the control of the switching control unit.

10. The control system for a continuum robot according to claim 9, wherein the selection unit has a function of continuously interpolating the output of the first drive control unit and the output of the second drive control unit when output of the drive control unit to be selected is switched between the output of the first drive control unit and the output of the second drive control unit.

11. The control system for a continuum robot according to claim 1, wherein the continuum robot further includes a base, and includes, as a plurality of the curvable portions, a distal curvable portion at a distal position from the base and a follower curvable portion between the base and the distal curvable portion, and wherein the distal curvable portion and the follower curvable portion are each provided with a drive control mechanism including the first drive control unit and the second drive control unit.

12. The control system for a continuum robot according to claim 11, further comprising a follow-up control unit configured to output the bending angle of the follower curvable portion to the kinematics computing unit based on the bending angle of the distal curvable portion input to the kinematics computing unit and a target displacement of the base.

13. The control system for a continuum robot according to claim 1, wherein the continuum robot includes a curvable portion configured to be curvable when a plurality of the wires are driven and a plurality of the drive units that respectively drive the plurality of the wires, and wherein the plurality of the wires are each provided with a drive control mechanism including the first drive control unit and the second drive control unit.

14. A control method for a continuum robot including a curvable portion configured to be curvable when a wire is driven and a drive unit that drives the wire, the control method comprising:

a kinematics computing step of performing, by a kinematics computing unit, a kinematics computation for calculating a drive amount of the wire from a bending angle of the curvable portion with respect to a reference axis;

a first drive control step of controlling, by a first drive control unit, the drive amount of the wire being driven by the drive unit based on a result of the kinematics computation;

a second drive control step of controlling, by a second drive control unit with which the drive unit is more easily driven in a reverse direction than in a case of drive control performed by the first drive control unit when the curvable portion is subjected to an external force, the drive amount of the wire being driven by the drive unit based on the result of the kinematics computation; and a switching control step of performing control to switch between the first drive control unit and the second drive control unit in accordance with a mode signal indicating a drive control unit to be selected or a result of detecting a force applied to the wire, wherein a drive control by the second drive control unit includes a control to compensate an error between a target value and a detected value of a displacement of the wire and a control to compensate an error between a target value and a detected value of a force applied to the wire, and wherein the target value of the force applied to the wire is calculated based on the error between the target value and the detected value of the displacement of the wire.

* * * * *